US009257053B2

(12) United States Patent
Rassool et al.

(10) Patent No.: US 9,257,053 B2
(45) Date of Patent: Feb. 9, 2016

(54) SYSTEM AND METHOD FOR PROVIDING AUDIO FOR A REQUESTED NOTE USING A RENDER CACHE

(75) Inventors: Reza Rassool, Stevenson Ranch, CA (US); Darren Warner, Thousand Oak, CA (US); Matt Serletic, Malibu Hills, CA (US)

(73) Assignee: ZYA, INC., Calabasas, CA (US)

( * ) Notice: Subject to any disclaimer, the term of this patent is extended or adjusted under 35 U.S.C. 154(b) by 1138 days.

(21) Appl. No.: 13/194,806

(22) Filed: Jul. 29, 2011

(65) Prior Publication Data

US 2012/0297958 A1 Nov. 29, 2012

Related U.S. Application Data

(63) Continuation-in-part of application No. 12/791,792, filed on Jun. 1, 2010, now abandoned, and a continuation-in-part of application No. 12/791,798, filed on Jun. 1, 2010, now Pat. No. 8,338,686, and a continuation-in-part of application No. 12/791,803, filed on Jun. 1, 2010, and a continuation-in-part of application No. 12/791,807, filed on Jun. 1, 2010, now Pat. No. 8,492,634.

(60) Provisional application No. 61/182,982, filed on Jun. 1, 2009, provisional application No. 61/246,238, filed on Sep. 28, 2009, provisional application No. 61/248,238, filed on Oct. 2, 2009, provisional application No. 61/266,472, filed on Dec. 3, 2009.

(51) Int. Cl.

| | |
|---|---|
| *A63H 5/00* | (2006.01) |
| *G04B 13/00* | (2006.01) |
| *G10H 7/00* | (2006.01) |
| *G09B 15/00* | (2006.01) |
| *G06F 3/0481* | (2013.01) |
| *G10H 1/00* | (2006.01) |
| *G09B 15/04* | (2006.01) |

(52) U.S. Cl.
CPC .............. *G09B 15/00* (2013.01); *G06F 3/0481* (2013.01); *G09B 15/04* (2013.01); *G10H 1/0025* (2013.01); *G10H 2210/125* (2013.01); *G10H 2220/111* (2013.01); *G10H 2220/126* (2013.01); *G10H 2230/015* (2013.01); *G10H 2230/021* (2013.01); *G10H 2240/075* (2013.01)

(58) Field of Classification Search
CPC .......... G06F 17/30194; G06F 11/1464; G06F 12/0246; G06F 17/30309; G06F 17/30613; G06F 21/00; G06F 21/561; G06F 21/60; G06F 3/013; G06F 9/544; H04L 1/0045; G10G 1/00

See application file for complete search history.

(56) References Cited

U.S. PATENT DOCUMENTS

| | | |
|---|---|---|
| 4,508,002 A | 4/1985 | Hall et al. |
| 5,350,880 A | 9/1994 | Sato |

(Continued)

OTHER PUBLICATIONS

WIPO; International Preliminary Report on Patentability for corresponding PCT/US2012/048880 issued Feb. 4, 2014, 6 pages.

(Continued)

*Primary Examiner* — Jeffrey Donels
(74) *Attorney, Agent, or Firm* — Loeb & Loeb LLP

(57) ABSTRACT

A method for providing audio data corresponding to a requested musical note is disclosed, the method comprising: (a) providing a render cache having a plurality of cache entries, each of the cache entries corresponding to a different note; (b) receiving a request for a first note from a client; (c) identifying a first cache entry corresponding to the first note; (d) determining that a first audio segment corresponding to the first cache entry is not available; (e) identifying a second audio segment corresponding to a near-hit cache entry in the render cache; and (f) processing the second audio segment into a third audio segment that is substantially similar to the first audio segment.

34 Claims, 51 Drawing Sheets

(56) References Cited

U.S. PATENT DOCUMENTS

| | | |
|---|---|---|
| 5,663,517 A | 9/1997 | Oppenheim |
| 5,955,691 A | 9/1999 | Suzuki et al. |
| 6,172,679 B1 | 1/2001 | Lim |
| 6,495,747 B2 | 12/2002 | Shimaya et al. |
| 6,504,090 B2 | 1/2003 | Tsai et al. |
| 6,972,363 B2 | 12/2005 | Georges et al. |
| 7,026,539 B2 | 4/2006 | Pennock et al. |
| 7,179,981 B2 | 2/2007 | Gayama |
| 7,259,316 B2 | 8/2007 | Kusumoto |
| RE40,543 E | 10/2008 | Aoki et al. |
| 7,516,232 B2 | 4/2009 | Barrett et al. |
| 7,667,125 B2 | 2/2010 | Taub et al. |
| 7,667,126 B2 | 2/2010 | Shi |
| 7,705,231 B2 | 4/2010 | Morris et al. |
| 7,772,480 B2 | 8/2010 | Brennan |
| 7,812,241 B2 | 10/2010 | Ellis |
| 7,849,420 B1 | 12/2010 | Amidon et al. |
| 7,902,446 B2 | 3/2011 | Humphrey |
| 7,985,917 B2 | 7/2011 | Morris et al. |
| 8,026,436 B2 | 9/2011 | Hufford |
| 8,338,686 B2 | 12/2012 | Mann et al. |
| 2003/0014135 A1 | 1/2003 | Moulios |
| 2003/0110923 A1 | 6/2003 | Miyamoto |
| 2003/0128825 A1 | 7/2003 | Loudermilk |
| 2005/0144284 A1 | 6/2005 | Ludwig et al. |
| 2005/0256595 A1 | 11/2005 | Aiso et al. |
| 2006/0074649 A1 | 4/2006 | Pachet et al. |
| 2006/0075884 A1 | 4/2006 | Streitenberger et al. |
| 2006/0084218 A1 | 4/2006 | Lee et al. |
| 2006/0085182 A1 | 4/2006 | Eves et al. |
| 2006/0230909 A1 | 10/2006 | Song et al. |
| 2006/0230910 A1 | 10/2006 | Song et al. |
| 2007/0061729 A1 | 3/2007 | Terada |
| 2007/0245090 A1 | 10/2007 | King et al. |
| 2007/0289432 A1 | 12/2007 | Basu et al. |
| 2008/0013757 A1 | 1/2008 | Carrier |
| 2008/0229917 A1 | 9/2008 | Devalapalli et al. |
| 2008/0250315 A1 | 10/2008 | Eronen et al. |
| 2008/0289478 A1 | 11/2008 | Vella |
| 2008/0314228 A1 | 12/2008 | Dreyfuss et al. |
| 2009/0038467 A1 | 2/2009 | Brennan |
| 2009/0038468 A1 | 2/2009 | Brennan |
| 2009/0052471 A1 | 2/2009 | Pasqualino et al. |
| 2009/0064851 A1 | 3/2009 | Morris et al. |
| 2009/0067641 A1 | 3/2009 | Lengeling et al. |
| 2009/0132075 A1 | 5/2009 | Barry |
| 2009/0141910 A1 | 6/2009 | Mercs et al. |
| 2009/0217805 A1 | 9/2009 | Lee et al. |
| 2009/0304207 A1 | 12/2009 | Cooper |
| 2010/0018382 A1 | 1/2010 | Feeney et al. |
| 2010/0095829 A1 | 4/2010 | Edwards |
| 2010/0192755 A1 | 8/2010 | Morris et al. |
| 2010/0198760 A1 | 8/2010 | Maddage et al. |
| 2010/0300268 A1 | 12/2010 | Applewhite et al. |
| 2010/0300269 A1 | 12/2010 | Applewhite |
| 2010/0307320 A1 | 12/2010 | Hoeberechts et al. |
| 2010/0309153 A1 | 12/2010 | Terada |
| 2010/0313736 A1 | 12/2010 | Lenz |
| 2011/0009989 A1 | 1/2011 | Terada et al. |
| 2011/0009990 A1 | 1/2011 | Terada et al. |
| 2011/0011245 A1 | 1/2011 | Adam et al. |
| 2011/0013786 A1 | 1/2011 | Odom et al. |
| 2011/0058691 A1 | 3/2011 | Okabayashi |
| 2011/0120288 A1 | 5/2011 | Bignell et al. |
| 2011/0175915 A1 | 7/2011 | Gehring |
| 2011/0179940 A1 | 7/2011 | Humphrey |
| 2011/0179941 A1 | 7/2011 | Humphrey |
| 2011/0179942 A1 | 7/2011 | Humphrey |
| 2011/0228956 A1 | 9/2011 | Aiso et al. |
| 2011/0232461 A1 | 9/2011 | Taub et al. |
| 2011/0251842 A1 | 10/2011 | Cook et al. |
| 2011/0252949 A1 | 10/2011 | Lengeling |
| 2012/0020498 A1 | 1/2012 | Fujita et al. |
| 2012/0023406 A1 | 1/2012 | Fujita et al. |
| 2012/0027230 A1 | 2/2012 | Okabayashi |
| 2012/0059491 A1 | 3/2012 | Carroll |
| 2012/0132057 A1 | 5/2012 | Kristensen |
| 2012/0180618 A1 | 7/2012 | Rutledge et al. |
| 2012/0237038 A1 | 9/2012 | Hagiwara et al. |
| 2013/0123960 A1 | 5/2013 | Green |
| 2013/0233157 A1 | 9/2013 | Lengeling |

OTHER PUBLICATIONS

WIPO; International Preliminary Report on Patentability for corresponding PCT/US2012/048883 issued Feb. 4, 2014, 11 pages.

Sibelius S Reference [online]. Sibelius Software 2007 [Retrieved online Jul. 15, 2010]. Retrieved from internet: <URL: http://hub.sibelius.com/download/documentation/pdfs/sibeliuss-reference-en.pdf>.

International Search Report and Written Opinion from PCT/US2010/036951, filed Jun. 1, 2010.

International Search Report and Written Opinion of the International Searching Authority for corresponding Application No. PCT/US2012/048883 dated Dec. 6, 2012.

International Search Report and Written Opinion dated Dec. 6, 2012 for PCT/US2012/048880.

Larry Polansky, "Morphological Metrics", Journal of New Music Research, vol. 25, pp. 289-368, 1996.

Logic Pro 8 User Manual.2007, Viewed online at http://manuals.info.apple.com/en_US/Logic_Pro_8_User_Manual.pdf.

Pro Tools 7.4: Reference Guide, 2007, Digidesign pp. 5-6, 26-29, 72, 89, 96-99, 112, 114, 117-118,189, 218, 228, 317, 321-324, 343-344, 350-351, 359, 368-369, 372, 377, 403, 405, 437-438, 468, 534, 536, 557-558, 576-577, 683 http://akmedia.digidesign.com/support/docs/Pro_Tools_74_Reference_Guide_41784.PDF.

RC-50 Loop Station: Owner's Manual, 2005, BOSS pp. 42, 58-59 http://www.bossus.com/backstage/product_manuals/?group=2.

European Patent Office, "Supplementary European Search Report and Written Opinion," issued in application No. EP12831958.8, dated Mar. 31, 2015, 5 pages.

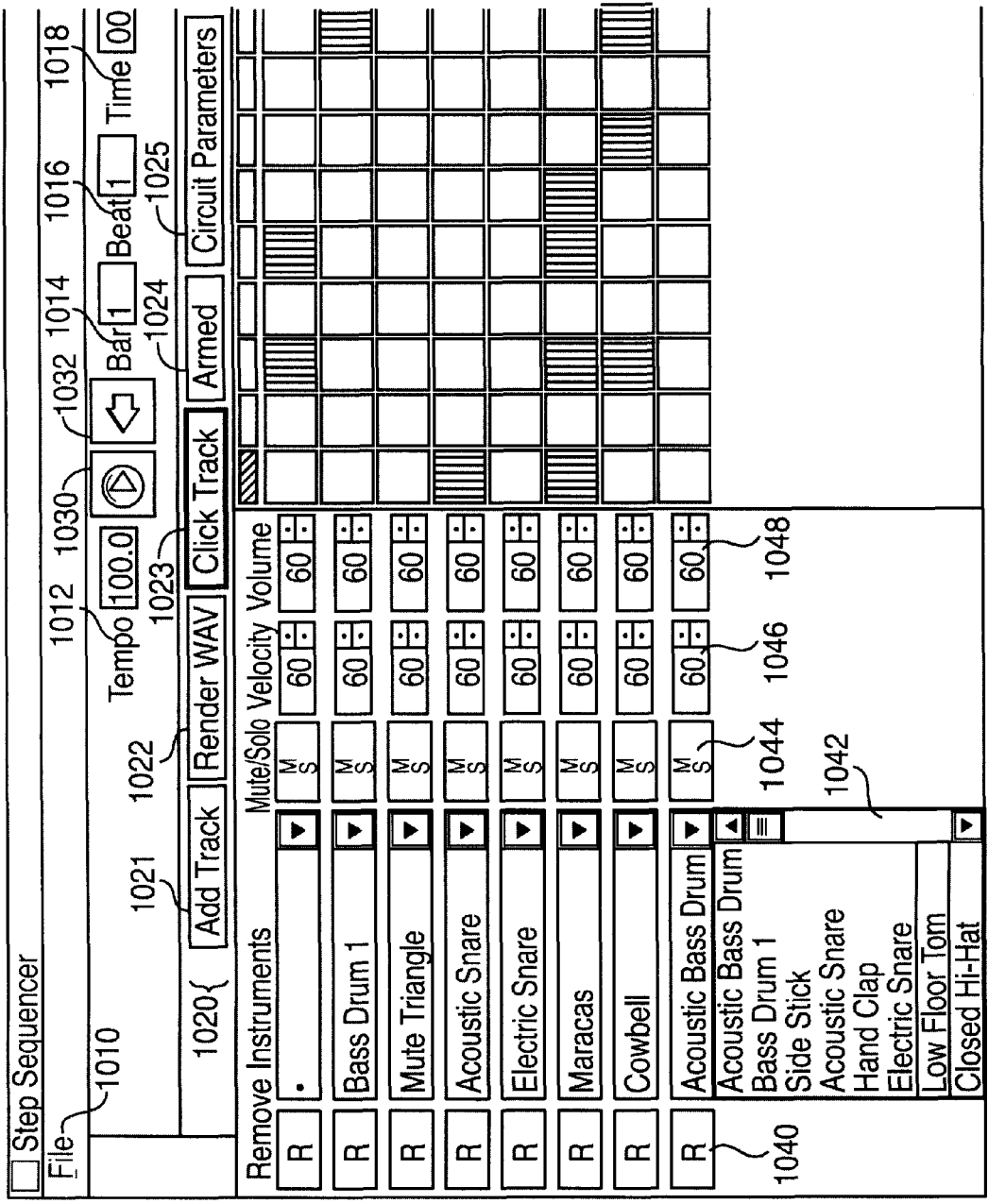

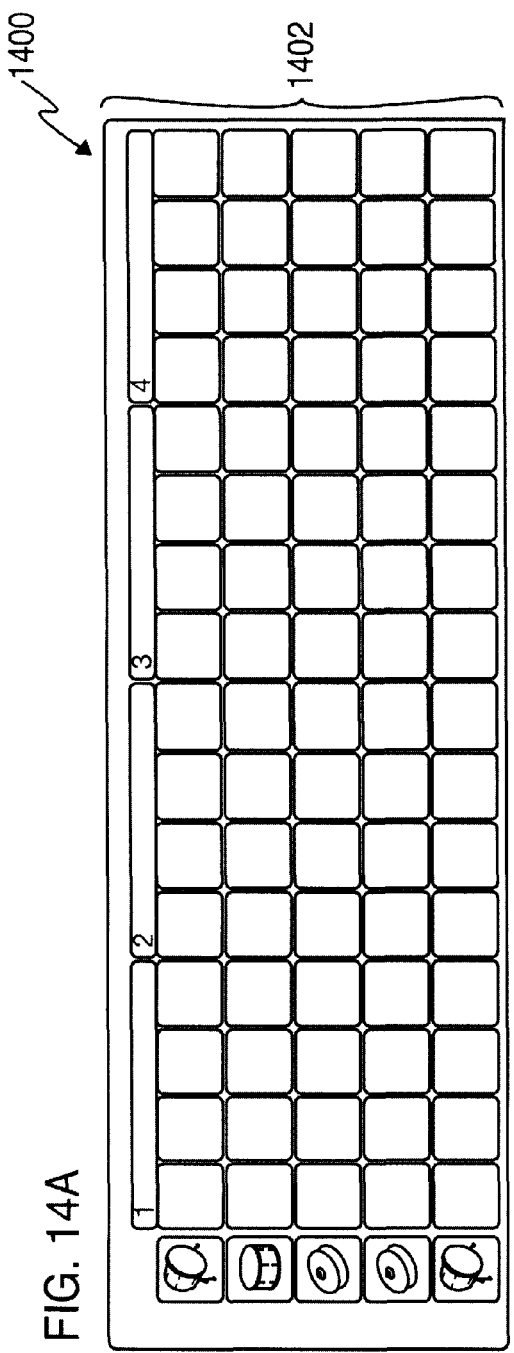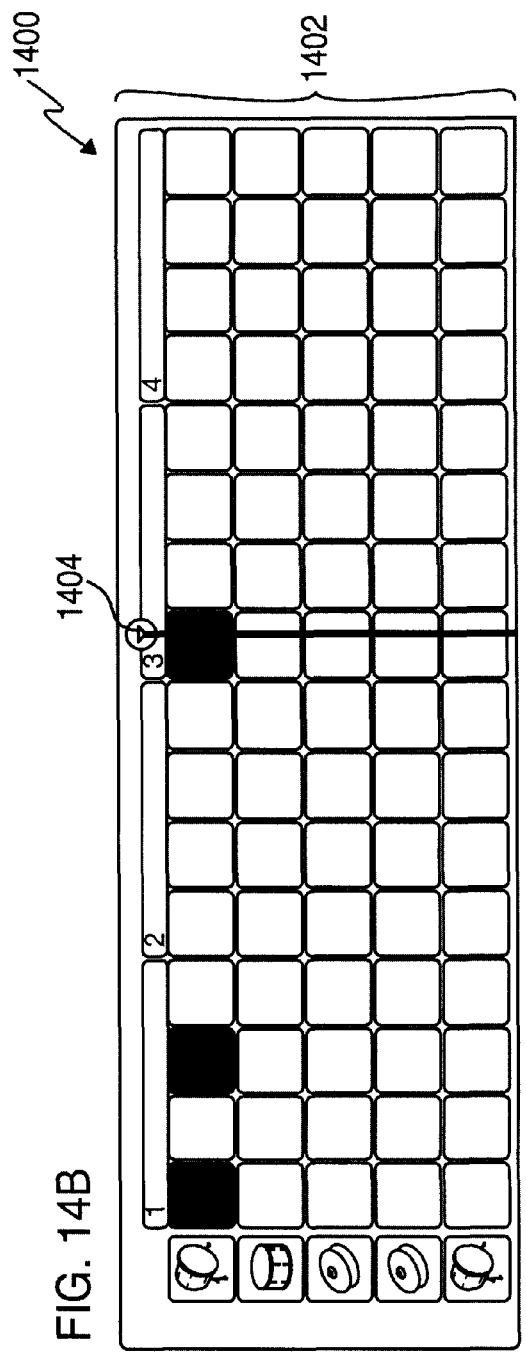
FIG. 14A
FIG. 14B

Fig. 16A

| 1st/2nd | C | C#/Db | D | D#/Eb | E | F | F#/Gb | G | G#/Ab | A | A#/Bb | B |
|---|---|---|---|---|---|---|---|---|---|---|---|---|
| C | 0 | 0 | 1.25 | 0 | 0 | 0 | 0 | 0 | 0 | 0 | 0 | 0 |
| C#/Db | 0 | 0 | 0 | 0 | 0 | 0 | 0 | 0 | 0 | 0 | 0 | 0 |
| D | 1.5 | 0 | 0 | 0 | 0.75 | 0 | 0 | 0 | 0 | 0 | 0 | 0 |
| D#/Eb | 0 | 0 | 0 | 0 | 0 | 0 | 0 | 0 | 0 | 0 | 0 | 0 |
| E | 0 | 0 | 0.75 | 0 | 0.75 | 0 | 0 | 0 | 0 | 0 | 0 | 0 |
| F | 0 | 0 | 0 | 0 | 0 | 0 | 0 | 0 | 0 | 0 | 0 | 0 |
| F#/Gb | 0 | 0 | 0 | 0 | 0 | 0 | 0 | 0 | 0 | 0 | 0 | 0 |
| G | 0 | 0 | 0 | 0 | 0 | 0 | 0 | 0 | 0 | 0 | 0 | 0 |
| G#/Ab | 0 | 0 | 0 | 0 | 0 | 0 | 0 | 0 | 0 | 0 | 0 | 0 |
| A | 0 | 0 | 0 | 0 | 0 | 0 | 0 | 0 | 0 | 0 | 0 | 0 |
| A#/Bb | 0 | 0 | 0 | 0 | 0 | 0 | 0 | 0 | 0 | 0 | 0 | 0 |
| B | 0 | 0 | 0 | 0 | 0 | 0 | 0 | 0 | 0 | 0 | 0 | 0 |

| Major | | | | | | | | | | | | |
|---|---|---|---|---|---|---|---|---|---|---|---|---|
| 1st/2nd | C | C# | D | D# | E | F | F# | G | G# | A | A# | B |
| C | 1.39 | -2 | 1.15 | -2 | -1.37 | -1.64 | -2 | 0.28 | -2 | -1.66 | -2 | 0.67 |
| C# | -2 | -2 | -2 | -2 | -2 | -2 | -2 | -2 | -2 | -2 | -2 | -2 |
| D | 0.08 | -2 | -0.84 | -2 | 0.91 | -1.59 | -2 | -1.47 | -2 | -1.42 | -2 | -1.71 |
| D# | -2 | -2 | -2 | -2 | -2 | -2 | -2 | -2 | -2 | -2 | -2 | -2 |
| E | -1.47 | -2 | 0.47 | -2 | -0.74 | 0.67 | -2 | -1.25 | -2 | -1.56 | -2 | -1.52 |
| F | -1.25 | -2 | -1.71 | -2 | -0.23 | -1.52 | -2 | -0.08 | -2 | -1.66 | -2 | -1.78 |
| F# | -2 | -2 | -2 | -2 | -1.42 | -2 | -2 | -1.42 | -2 | -2 | -2 | -2 |
| G | -0.93 | -2 | -0.93 | -2 | -1.47 | -0.38 | -2 | 2 | -2 | 0.47 | -2 | -1.1 |
| G# | -2 | -2 | -2 | -2 | -2 | -2 | -2 | -2 | -2 | -2 | -2 | -2 |
| A | -1.47 | -2 | -1.64 | -2 | -1.25 | -1.73 | -2 | -0.08 | -2 | -1.03 | -2 | -0.62 |
| A# | -2 | -2 | -2 | -2 | -2 | -2 | -2 | -2 | -2 | -2 | -2 | -2 |
| B | 0.91 | -2 | -1.64 | -2 | -1.68 | -1.66 | -2 | -1.64 | -2 | -0.5 | -2 | -1.32 |

Fig. 16B

| Minor | 1st/2nd C | C# | D | D# | E | F | F# | G | G# | A | A# | B |
|---|---|---|---|---|---|---|---|---|---|---|---|---|
| C | 0.67 | -2 | 0.91 | -1.47 | -2 | -1.56 | -2 | 0.28 | -1.73 | -2 | -0.62 | -0.23 |
| C# | -2 | -2 | -2 | -2 | -2 | -2 | -2 | -2 | -2 | -2 | -2 | -2 |
| D | 0.28 | -2 | -1.25 | 1.15 | -2 | -1.56 | -2 | -1.59 | -1.68 | -2 | -1.71 | -2 |
| D# | -1.52 | -2 | 0.47 | -0.23 | -2 | 0.67 | -2 | -1.32 | -1.71 | -2 | -1.1 | -2 |
| E | -2 | -2 | -2 | -2 | -2 | -1.37 | -2 | -2 | -2 | -2 | -2 | -2 |
| F | -1.18 | -2 | -1.71 | -0.08 | -2 | -0.93 | -2 | 0.91 | -1.64 | -2 | -1.66 | -2 |
| F# | -2 | -2 | -2 | -2 | -2 | 0.67 | -2 | -2 | -2 | -2 | -2 | -2 |
| G | -0.93 | -2 | -1.25 | -1.42 | -2 | -1.71 | -2 | 1.61 | 0.47 | -1.47 | -1.56 | -1.18 |
| G# | -1.64 | -2 | -1.78 | -1.47 | -2 | -2 | -2 | -0.5 | -1.59 | -2 | -0.74 | -2 |
| A | -2 | -2 | -2 | -2 | -2 | -1.42 | -2 | -1.42 | -2 | -2 | -1.37 | -2 |
| A# | 0.08 | -2 | -1.59 | -1.56 | -2 | -2 | -2 | -1.47 | -1.18 | -1.37 | -1.37 | -2 |
| B | -0.5 | -2 | -2 | -2 | -2 | -2 | -2 | -2 | -2 | -2 | -0.5 | -2 |

Fig. 16C

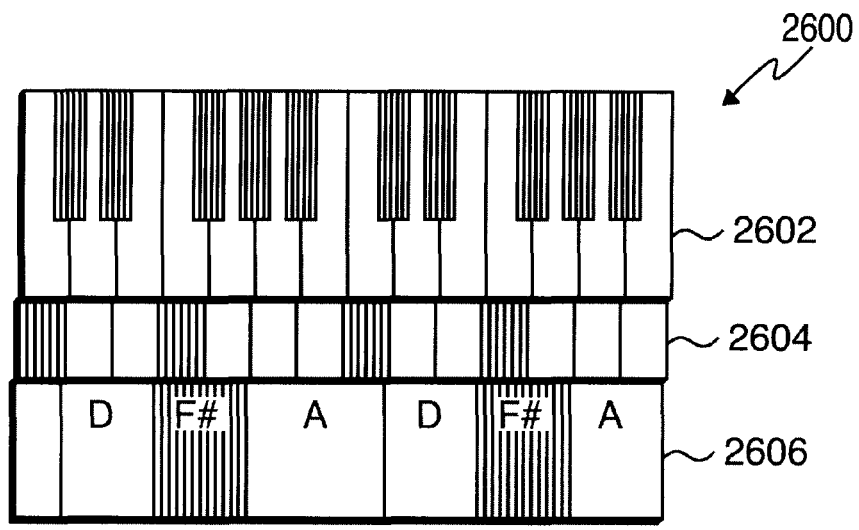
FIG. 26
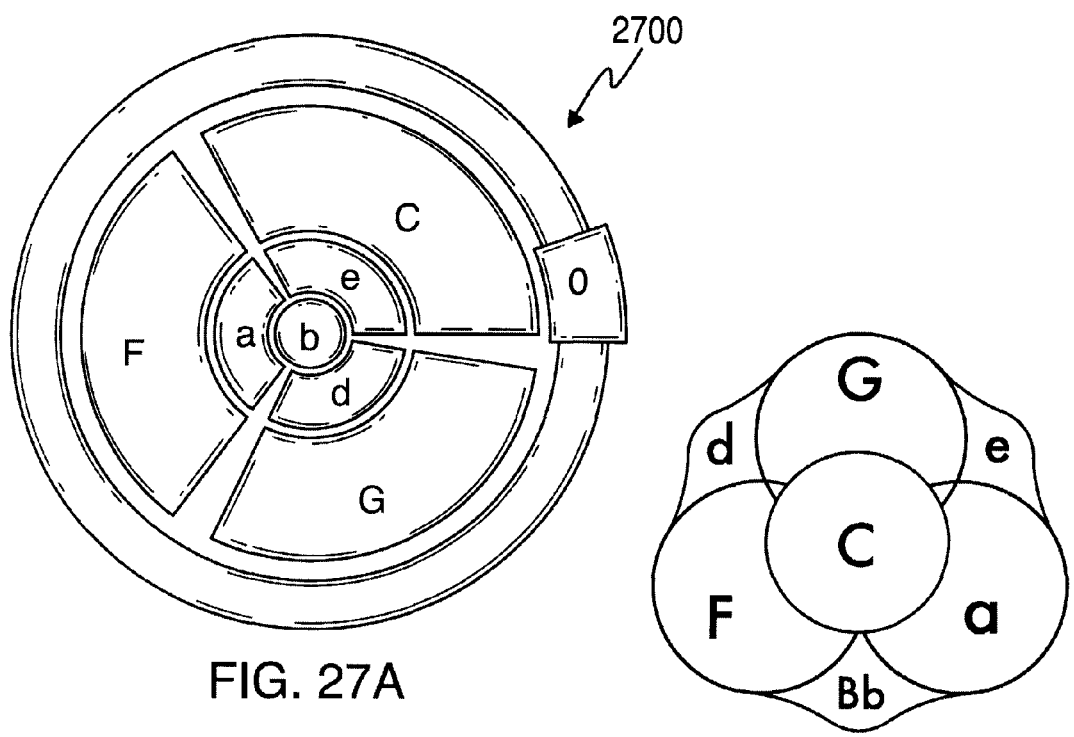
FIG. 27A
FIG. 27B

SYSTEM AND METHOD FOR PROVIDING AUDIO FOR A REQUESTED NOTE USING A RENDER CACHE

This application is a continuation-in-part of U.S. patent application Ser. No. 12/791,792, filed Jun. 1, 2010; a continuation-in-part of U.S. patent application Ser. No. 12/791,798, filed Jun. 1, 2010; a continuation-in-part of U.S. patent application Ser. No. 12/791,803, filed Jun. 1, 2010; and a continuation-in-part of U.S. patent application Ser. No. 12/791,807, filed Jun. 1, 2010. Each of U.S. patent application Ser. Nos. 12/791,792; 12/791,798; 12/791,803 and 12/791,807 claim priority to U.S. Provisional Patent Application No. 61/182,982, filed Jun. 1, 2009, U.S. Provisional Patent Application No. 61/248,238, filed Oct. 2, 2009; and U.S. Provisional Patent Application No. 61/266,472, filed Dec. 3, 2009.

TECHNICAL FIELD

The present invention relates generally to the creation of music, and more particularly to a system and method for providing audio for a requested note using a render cache

BACKGROUND

Music is a reputably well-known form of human self-expression. However, a person's firsthand appreciation for this artistic endeavor may be derived in different manners. Often, the person can more easily enjoy music by listening to the creations of others rather than generating it by himself or herself. For many people, the ability to hear and recognize an appealing musical composition is innate, while the ability to manually create a proper collection of notes remains out of reach. A person's ability to create new music may be inhibited by the time, money, and/or skill necessary to learn an instrument well-enough to accurately reproduce a tune at will. For most people, their own imaginations may be the source of new music, but their ability to hum or chant this same tune limits the extent to which their tunes can be formally retained and recreated for the enjoyment of others.

Recording a session musician's performance can also be a laborious process. Multiple takes of the same material are recorded and painstakingly scrutinized until a single take can be assembled with all of the imperfections ironed out. A good take often requires a talented artist under the direction of another to adjust his or her performance accordingly. In the case of an amateur recording, the best take is often the result of serendipity and consequently cannot be repeated. More often than not, amateur performers produce takes with both good and bad portions. The recording process would be much easier and more fun if a song could be constructed without having to meticulously analyze every portion of every take. Thus, it is with respect to these considerations and others that the present invention has been made.

Moreover, the music that a person desires to create may be complex. For example, an envisioned tune can have more than one instrument, which may be played concurrently with other instruments in a potential arrangement. This complexity further adds to the time, skill, and/or money required for a lone person to generate a desired combination of sounds. The physical configuration of most musical instruments also requires a person's full physical attention to manually generate notes, further requiring additional personnel to play the additional parts of a desired tune. Additionally, extra review and management may then be necessary to ensure proper interaction of the various involved instruments and elements of a desired tune.

Even for people who already enjoy creating their own music, those listeners may lack the type of expertise that enables proper composition and music creation. As a result, the music created may contain notes that are not within the same musical key or chord. In most musical styles, the presence of off-key or off-chord notes, often referred to as "inharmonious" notes, causes the music to be unpleasing and jarring. Accordingly, because of their lack of experience and training, music listeners often create music that sounds undesirable and unprofessional.

For some people, artistic inspiration is not bound by the same time and location limitations that are typically associated with the generation and recording of new music. For example, a person may not be in a production studio with a playable instrument at hand when an idea for a new tune materializes. After the moment of inspiration passes, the person may not be able to recall the complete extent of the original tune, resulting in a loss of artistic effort. Moreover, the person may become frustrated with the time and effort applied in recreating no more than an inferior and incomplete version of his or her initial musical revelation.

Professional music composing and editing software tools are currently generally available. However, these tools project an intimidating barrier to entry for a novice user. Such complex user interfaces can soon sap the enthusiasm of any beginner who dares venture their way on an artistic whim. Being tethered to a suite of pro-audio servers also cramps the style of the mobile creative, wanting to craft a tune on the move.

What is needed is a system and method of music creation that can easily interface with a user's most basic ability, yet enable the creation of music that is as complex as the user's imagination and expectations. There is also an associated need to facilitate the creation of music free from notes that are inharmonious. In addition, there is a need in the art for a music authoring system that can generate a musical compilation track by aggregating portions of multiple takes based on automated selection criteria. It is also desirable that such a system further be implemented in a manner that is not limited by the location of a user when inspiration occurs, thereby enabling capture of the first utterances of a new musical composition.

There is an associated need in the art for a system and method that can create a compilation track from multiple takes by automatically evaluating the quality of previously recorded tracks and selecting the best of the previously recorded tracks, recorded via an electronic authoring system.

It is also desirable to implement a system and method for music creation that is based in the cloud whereby processing-intensive functions are implemented by a server remote from a client device. However, because digital music creation relies on vast amounts of data, such configurations are generally limited by at several factors. For the provider, processing, storing and serving such large amounts of data may be overwhelming unless the central processor is extremely powerful and thus expensive from a cost and latency point-of view. Given current costs for storing and sending data, the transmission of data from a rendering server to a client can quickly become cost prohibitive and may also add undesirable latency. From the client perspective, bandwidth limitations may also lead to significant latency issues, which detract from the user experience. Thus, there is also a need in the art for a system that can address and overcome these drawbacks.

BRIEF DESCRIPTION OF THE DRAWINGS

Non-limiting and non-exhaustive embodiments are described in reference to the following drawings. In the drawings, like reference numerals refer to like parts through all the various figures unless otherwise specified.

For a better understanding of the present disclosure, a reference will be made to the following detailed description, which is to be read in association with the accompanying drawings, wherein:

FIGS. 10, 10A and 10B together form an illustration of one potential user interface for generating musical tracks within a continuously looping recording session;

FIGS. 14A, 14B and 14C together illustrate one potential user interface for creating a rhythm track at three separate periods of time;

FIG. 16A illustrates an interval profile matrix that may be used to better determine key signature.

FIGS. 16B and 16C illustrate Minor and Minor Key Interval Profile Matrices, respectively, that are used in association with the interval profile matrix to provide a preferred key signature determination.

FIG. 26 illustrates one exemplary embodiment of a super keyboard;

FIGS. 27A-B illustrate two exemplary embodiments of a chord wheel;

DETAILED DESCRIPTION

Figure 1A:
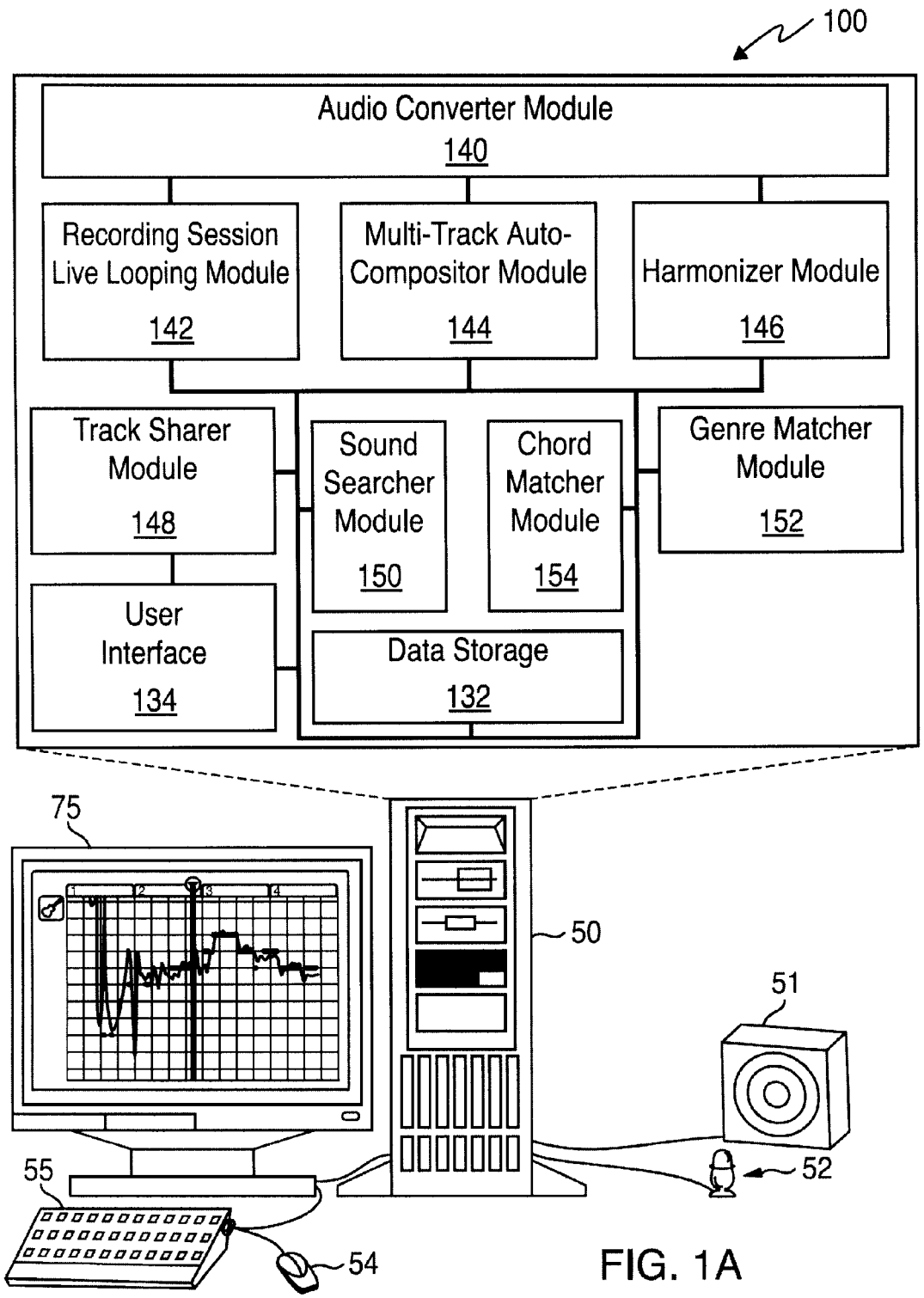
FIGS. 1A, 1B, and 1C illustrate several embodiments of a system in which aspects of the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

DEFINITIONS

Throughout the specification and claims, the following terms take the meanings explicitly associated herein, unless the context clearly dictates otherwise. The phrase "in one embodiment" as used herein does not necessarily refer to the same embodiment, although it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and includes plural references. The meaning of "in" includes "in" and "on."

As used herein the term "musical input," refers to any signal input that contains musical and/or control information transmitted over any of a variety of mediums, including, but not limited to air, microphones, line-in mechanisms, or the like. Musical inputs are not limited to signal input frequencies which might be heard by a human ear, and may include other frequencies outside of that which may be heard by the human ear, or in a form not readily heard by the human ear. Moreover, the use of the term "musical" is not intended to convey an inherent requirement for a beat, rhythm, or the like. Thus, for example, a musical input, may include various inputs such as a tapping, including a single tap, clicking, human inputs (such as voice (e.g do, re, mi), percussive inputs (e.g. ka, cha, da-da), or the like) as well as indirect inputs through an instrument or other amplitude and/or frequency generation mechanism via a transport including, but not limited to, a microphone input, a Line-In input, a MIDI input, a file having signal information useable to convey a musical input, or other inputs that enable a transported signal to be converted into music.

As used herein, the term "musical key" is a group of musical notes that are harmonious. Keys are usually major or minor. Musicians frequently speak of a musical composition as being "in the key of" C major, for instance, which implies a piece of music harmonically centered on the note C and making use of a major scale whose first note, or tonic, is C. A major scale is an eight note progression consisting of the perfect and major semitones (e.g. C D E F G A B or do re mi fa so la ti). With respect to a piano, for instance, middle-C (sometimes called "C4") has a frequency of 261.626 Hz, while D4 is 293.665 Hz; E4 is 329.628 Hz; F4 is 349.228 Hz; G4 is 391.995 Hz; A4 is 440.000 Hz; and B4 is 493.883 Hz. While the same notes on other musical instruments will play at the same frequencies, it is also understood that some instruments naturally play in one key or another.

As used herein, the term "inharmonious note" is a note that is not in a correct musical key or chord, where the correct musical key and the correct chord are the musical key or chord currently being played by another musician or musical source.

As used herein, the term "blue note" is a note that is not in a correct musical key or chord, but which is allowed to be played without transformation.

As used herein, the term "note of accompaniment musical input" is a note played by an accompanying musician that is associated with a note played in a corresponding lead melody.

General Description of the Invention

The following briefly describes various embodiments in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, various embodiments are directed toward generating a multi-track recording by looping through a set of previously recorded audio tracks and receiving a new audible input for each added audio track. In one embodiment, each of the audio tracks in the multi-track recording may be generated from an audible vocal input from an end-user. Each new audible input may be provided after the current recording is repeatedly played back, or looped, one or more times. This recording sequence, separated by loop periods during which no new track input is received may permit a user to listen to the current recording thoroughly, continuously, and without a time-related pressure of an immediately required additional input. The looped playback, independent from a loop in which an additional track is input, may also permit other actions to be performed, such as modifying a previous track or changing parameters of the recording system.

Further, at least one of the audio tracks in the multi-track recording may comprise one or more musical instrument sounds generated based on one or more different sounds provided in the audible input. Various forms of processing may be performed on the received audible input to create the audio track, including aligning and adjusting of the timing of the audible input, frequency recognition and adjustment, converting the audible input to a timbre associated with a musical instrument, adding known aural cues associated with the musical instrument, and the like. Further, each of these processes may be performed in real-time, permitting almost instantaneous playback of a generated audio track and enabling another audible input to be immediately and subsequently received for processing and overlay as an audio track onto one or more previously recorded tracks in a multi-track recording.

In one embodiment, the looped or repeated portion of the multi-track recording may comprise a single bar of music. The length of this bar may be determined by a tempo and a time signature associated with the track. In another embodiment, the number of bars, or looping point for playback of the multi-track recording, may be dynamic. That is, the repetition of a first audio track in the multi-track recording may occur at a different time than that of a second audio track in the multi-track recording. The adjustment of this dynamic looping point, for example, may be automatically determined based on the length of an audible input for subsequent tracks.

Various embodiments are also directed toward automatically producing a single, "best" take that is derived from a collection of takes. In one embodiment, multiple takes of a performance are recorded during one or more sessions onto a multi-track recorder. Each take is automatically partitioned into segments. The quality of each partition of each of the multiple takes is scored, based on selectable criteria, and a track is automatically constructed from the best quality segments of each take. In one embodiment, a best segment is defined by the segment having a highest score from within a plurality of segment scores.

Various embodiments are also further directed toward protecting a musician from playing an inharmonious note. In one embodiment, the notes of an accompaniment musical instrument are received as well as from a lead musical instrument. The notes from the accompaniment musical instrument are then modified based on the key, chord, and/or timing of the lead. In one embodiment, a virtual instrument, where the input keys of the instrument dynamically map onto safe notes, may be provided. Thus, if a player of the virtual instrument is accompanying a melody, the virtual instrument may identify safe notes that comprise notes that are either for the current chord of the melody being accompanied or in the musical key of the melody.

Device Architecture

Figure 1B:
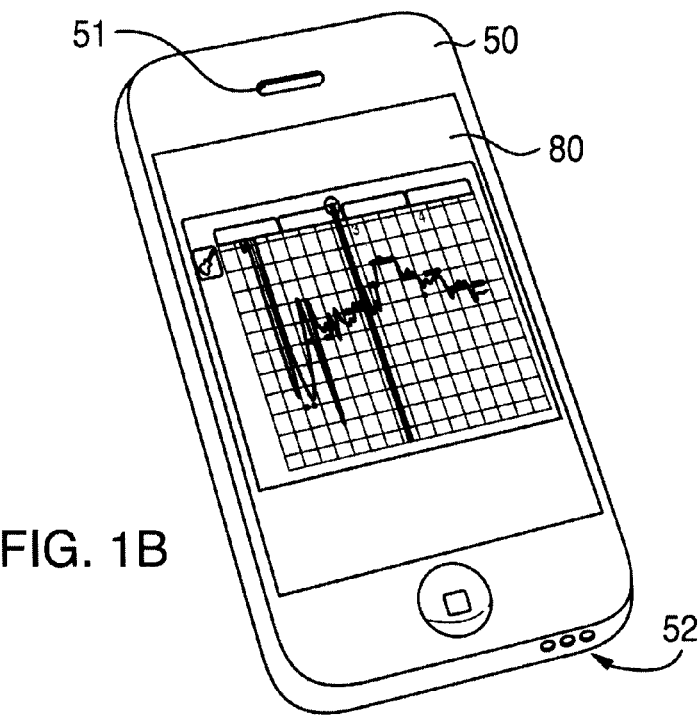
Figure 1C:
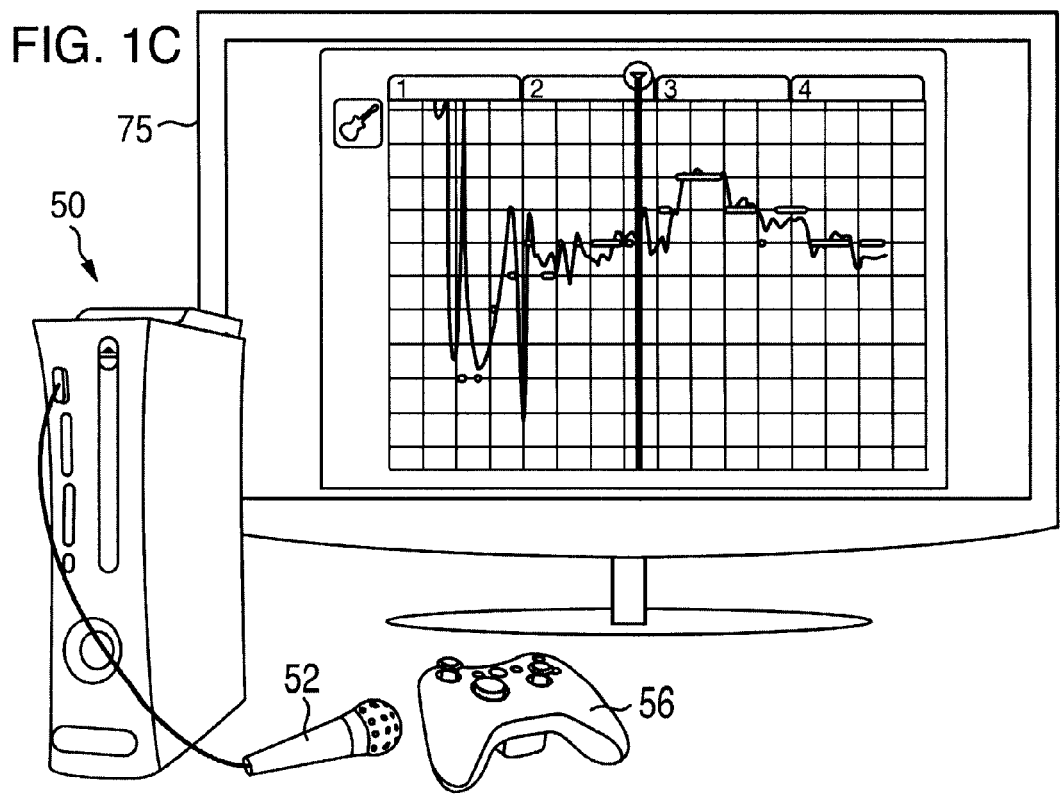

FIG. 1 shows one embodiment of system 100 that may be deployed on a variety of devices 50, which may be, for illustrative purposes, any multi-purpose computer (FIG. 1A), hand-held computing device (FIG. 1B) and/or dedicated gaming system (FIG. 1C). The system 100 may be deployed either as an application installed on the device. Alternatively, the system may be operated within an http browser environment, which may optionally utilize web-plug in technology to expand the functionality of the browser to enable functionality associated with system 100. Device 50 may include many more or less components than those shown in FIG. 29. However, it should be understood by those of ordinary skill in the art that certain components are not necessary to operate system 100, while others, such as processor, microphone, video display, and audio speaker are important, if not necessary to practice aspects of the present invention.

Figure 29:
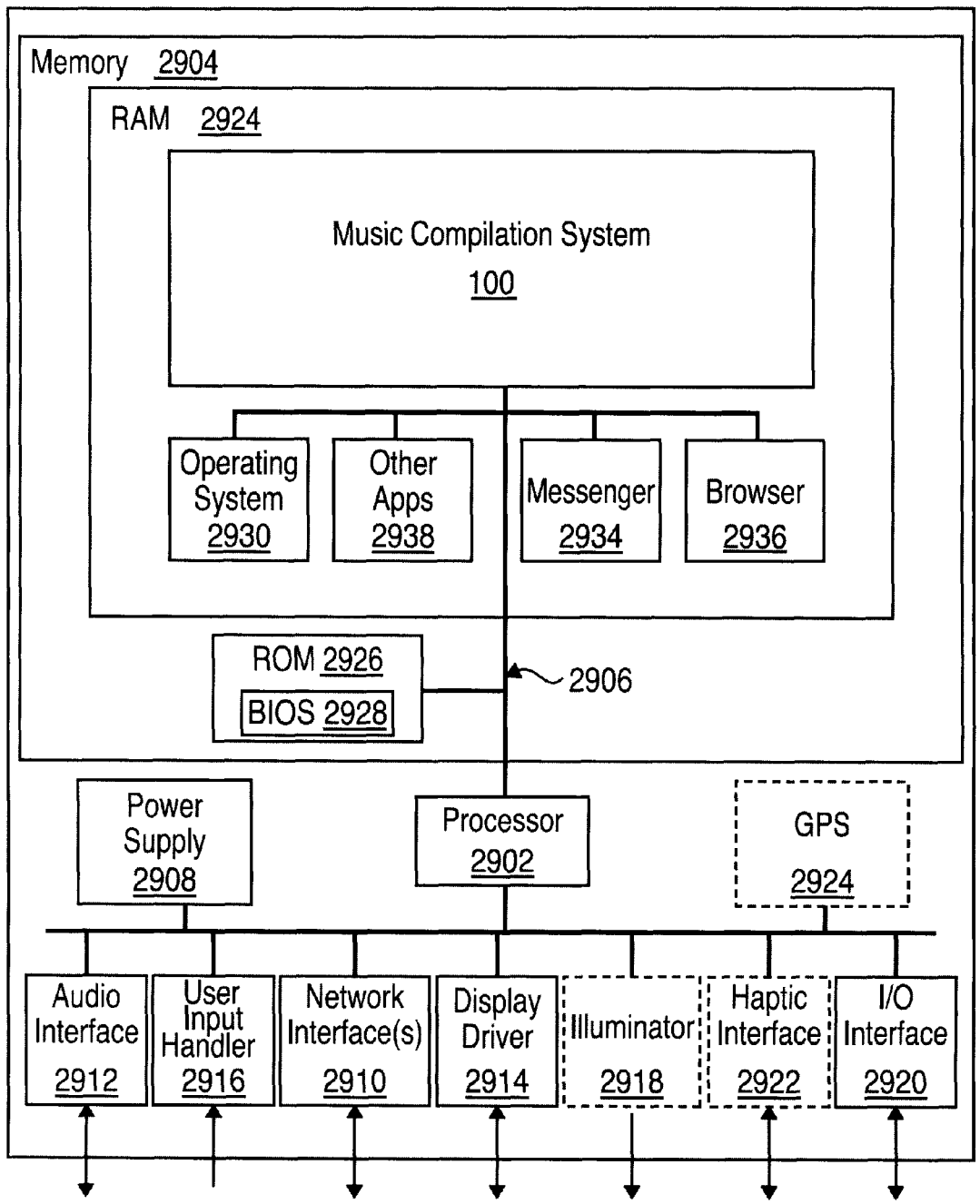
FIG. 29 illustrates a block diagram of a device that supports the processes discussed herein.

As shown in FIG. 29, device 50 includes a processor 2902, which may be a CPU, in communication with a mass memory 2904 via a bus 2906. As would be understood by those of ordinary skill in the art having the present specification, drawings and claims before them, processor 2902 could also comprise one or more general processors, digital signal processors, other specialized processors and/or ASICs, alone or in combination with one another. Device 50 also includes a power supply 2908, one or more network interfaces 2910, an audio interface 2912, a display driver 2914, a user input handler 2916, an illuminator 2918, an input/output interface 2920, an optional haptic interface 2922, and an optional global positioning systems (GPS) receiver 2924. Device 50 may also include a camera (not shown), enabling video to be acquired and/or associated with a particular multi-track recording. Video from the camera, or other source, may also further be provided to an online social network and/or an online music community. Device 50 may also optionally communicate with a base station (not shown), or directly with another computing device. Other computing device, such as the base station, may include additional audio-related components, such as a professional audio processor, generator, amplifier, speaker, XLR connectors and/or power supply.

Continuing with FIG. 29, power supply 2908 may comprise a rechargeable or non-rechargeable battery or may be provided by an external power source, such as an AC adapter or a powered docking cradle that could also supplement and/or recharge the battery. Network interface 2910 includes circuitry for coupling device 50 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Accordingly, network interface 2910 may include as a transceiver, transceiving device, or network interface card (NIC).

Audio interface 2912 (FIG. 29) is arranged to produce and receive audio signals such as the sound of a human voice. For example, as shown most clearly in FIGS. 1A and 1B, audio interface 2912 may be coupled to a speaker 51 and/or microphone 52 to enable music output and input into the system 100. Display driver 2914 (FIG. 29) is arranged to produce video signals to drive various types of displays. For example, display driver 2914 may drive video monitor display 75, shown in FIG. 1A, which may be a liquid crystal, gas plasma, or light emitting diode (LED) based-display, or any other type of display that may be used with a computing device. As shown in FIG. 1B, display driver 2914 may alternatively drive a hand-held, touch sensitive screen 80, which would also be arranged to receive input from an object such as a stylus or a digit from a human hand via user input handler 2916 (see FIG. 31). Keypad 55 may comprise any input device (e.g. keyboard, game controller, track-ball and/or mouse) arranged to receive input from a user. For example, keypad 55 may include one or more push buttons, numeric dials, and/or keys. Keypad 55 may also include command buttons that are associated with selecting and sending images.

Device 50 also comprises input/output interlace 2920 for communicating with external devices, such as a headset, a speaker 51, or other input or output devices. Input/output interface 2920 may utilize one or more communication technologies, such as USB, infrared, Bluetooth™, or the like. The optional haptic interface 2922 is arranged to provide tactile feedback to a user of device 50. For example, in an embodiment, such as that shown in FIG. 1B, where the device 50 is a mobile or handheld device, the optional haptic interlace 2922 may be employed to vibrate the device in a particular way such as, for example, when another user of a computing device is calling.

Optional GPS transceiver 2924 may determine the physical coordinates of device 100 on the surface of the Earth, which typically outputs a location as latitude and longitude values. GPS transceiver 2924 can also employ other geo-positioning mechanisms, including, but not limited to, triangulation, assisted GPS (AGPS), E-OTD, CI, SAI, ETA, BSS or the like, to further determine the physical location of device 50 on the surface of the Earth. In one embodiment, however, mobile device may, through other components, provide other information that may be employed to determine a physical location of the device, including for example, a MAC address, IP address, or the like.

As shown in FIG. 29, mass memory 2904 includes a RAM 2924, a ROM 2926, and other storage means. Mass memory 2904 illustrates an example of computer readable storage media for storage of information such as computer readable instructions, data structures, program modules, or other data. Mass memory 2904 stores a basic input/output system ("BIOS") 2928 for controlling low-level operation of device 50. The mass memory also stores an operating system 2930 for controlling the operation of device 50. It will be appreciated that this component may include a general purpose operating system such as a version of MAC OS, WINDOWS, UNIX, LINUX, or a specialized operating system such as, for example, Xbox 360 system software, Wii IOS, Windows Mobile™, iOS, Android, webOS, QNX, or the Symbian® operating systems. The operating system may include, or interface with, a Java virtual machine module that enables control of hardware components and/or operating system operations via Java application programs. The operating system may also include a secure virtual container, also generally referred to as a "sandbox," that enables secure execution of applications, for example, Flash and Unity.

One or more data storage modules 132 may be stored in memory 2904 of device 50. As would be understood by those of ordinary skill in the art having the present specification, drawings and claims before them, a portion of the information stored in data storage modules 132 may also be stored on a disk drive or other storage medium associated with device 50. These data storage modules 132 may store multiple track recordings, MIDI files, WAV files, samples of audio data, and a variety of other data and/or data formats or input melody data in any of the formats discussed above. Data storage modules 132 may also store information that describes various capabilities of system 100, which may be sent to other devices, for instance as part of a header during a communication, upon request or in response to certain events, or the like. Moreover, data storage modules 132 may also be employed to store social networking information including address books, buddy lists, aliases, user profile information, or the like.

Device 50 may store and selectively execute a number of different applications, including applications for use in accordance with system 100. For example, application for use in accordance with system 100 may include Audio Converter Module 140, Recording Session Live Looping (RSLL) Module 142, Multiple Take Auto-Compositor (MTAC) Module 144, Harmonizer Module 146, Track Sharer Module 148, Sound Searcher Module 150, Genre Matcher Module 152, and Chord Matcher Module 154. The functions of these applications are described in more detail below.

The applications on device 50 may also include a messenger 134 and browser 136. Messenger 132 may be configured to initiate and manage a messaging session using any of a variety of messaging communications including, but not limited to email, Short Message Service (SMS), Instant Message (IM), Multimedia Message Service (MMS), internet relay chat (IRC), mIRC, RSS feeds, and/or the like. For example, in one embodiment, messenger 243 may be configured as an IM messaging application, such as AOL Instant Messenger, Yahoo! Messenger, .NET Messenger Server, ICQ, or the like. In another embodiment, messenger 132 may be a client application that is configured to integrate and employ a variety of messaging protocols. In one embodiment, messenger 132 may interact with browser 134 for managing messages. Browser 134 may include virtually any application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), Hyper Text Markup Language (HTML), eXtensible Markup Language (XML), and the like, to display and send a message. However, any of a variety of other web-based languages, including Python, Java, and third party web plug-ins, may be employed.

Device 50 may also include other applications 138, such as computer executable instructions which, when executed by client device 100, transmit, receive, and/or otherwise process messages (e.g., SMS, MMS, IM, email, and/or other messages), audio, video, and enable telecommunication with another user of another client device. Other examples of application programs include calendars, search programs, email clients, IM applications, SMS applications, VoIP applications, contact managers, task managers, transcoders, database programs, word processing programs, security applications, spreadsheet programs, games, search programs, and so forth. Each of the applications described above may be embedded or, alternately, downloaded and executed on device 50.

Of course, while the various applications discussed above are shown as being implemented on device 50, in alternate embodiments, one or more portions of each of these applications may be implemented on one or more remote devices or servers, wherein inputs and outputs of each portion are passed between device 50 and the one or more remote devices or servers over one or more networks. Alternately, one or more of the applications may be packaged for execution on, or downloaded from a peripheral device.

Audio Converter

Figure 2:
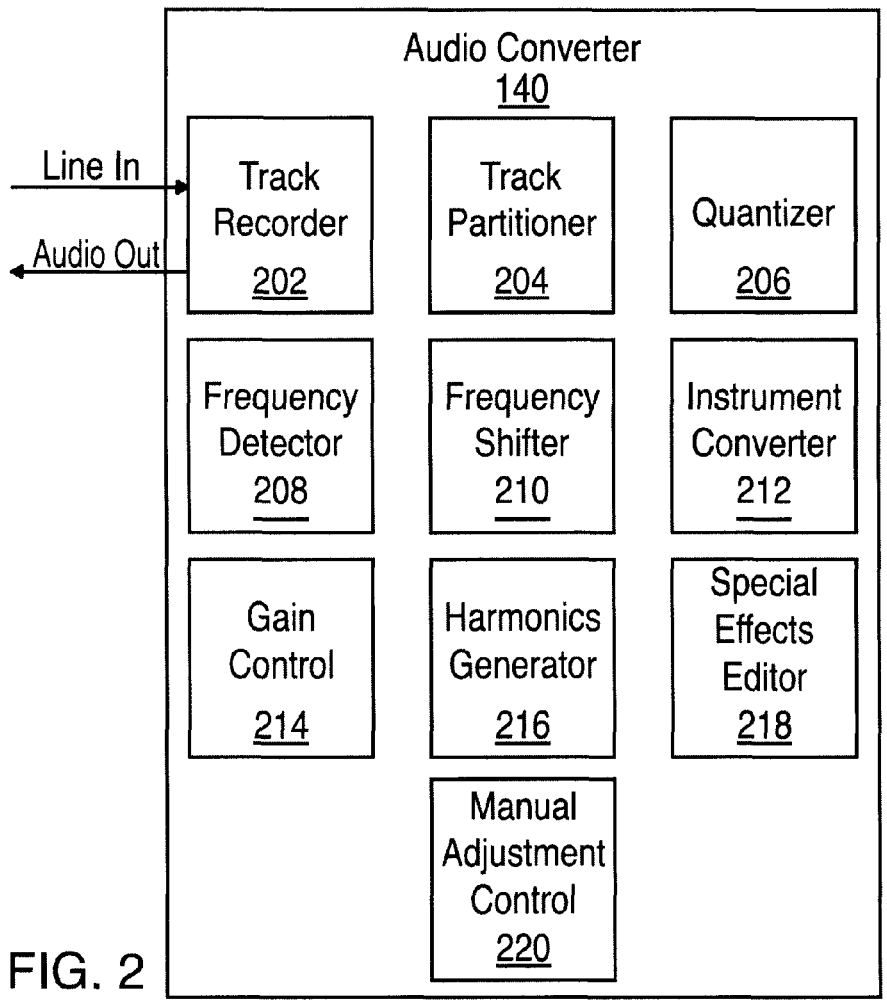
FIG. 2 is a block diagram of one embodiment of potential components of the audio converter 140 of the system of FIG. 1.

Audio converter 140 is configured to receive audio data and convert it to a more meaningful form for use within system 100. One embodiment of audio converter 140 is illustrated in FIG. 2. In this embodiment, audio converter 140 may include a variety of sub-systems including track recorder 202, track partitioner 204, quantizer 206, frequency detector 208, frequency shifter 210, instrument converter 212, gain control 214, harmonics generator 216, special effects editor 218, and manual adjustment control 220. The connections to and interconnections between the various sub-systems of audio converter 140 are not shown to avoid obscuring the present invention, however, these sub-systems would be electrically and/or logically connected as would be understood by those of ordinary skill in the art having the present specification, drawings, and claims before them.

Track recorder 202 enables a user to record at least one audio track from either vocal or a musical instrument. In one embodiment, the user may record the track without any accompaniment. However, track recorder 202 may also be configured to play audio, either automatically or upon a user's request, comprising a click track, a musical accompaniment, an initial tone against which a user can judge his/her pitch and timing, or even previously recorded audio. "Click track" refers to a periodic clicking noise (such as the periodic clicking noise made by a mechanical metronome) intended to assist the user to keep a consistent tempo. Track recorder 202 may also enable a user to set the length of time to record—as either a time limit (i.e. a number of minutes and seconds) or a number of musical bars. When used in conjunction with MTAC module 144, as discussed below, track recorder 202 may also be configured to graphically indicate a score associated with various portions of a recorded track, so as to indicate, for instance, when a user is off-key, or the like.

Figure 3:
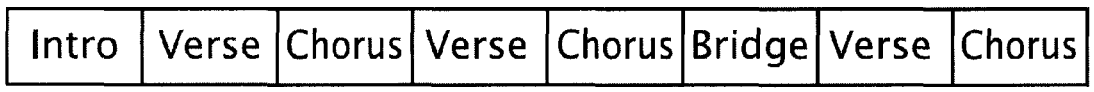
FIG. 3 illustrates one exemplary embodiment of a progression for a musical compilation.

In general, a musical compilation is comprised of multiple lyrical sections. For example, FIG. 3 illustrates one typical progression for a pop song that begins with an intro section, followed by alternating verse and chorus sections, and a bridge section prior to the final verse. Of course, although not shown, other structures such as refrains, outros, and the like, may also be used. Thus, in one embodiment, track recorder 202 may also be configured to enable a user to select the section of a song for which the recorded audio track is to be used. These sections may then be arranged in any order (either automatically (based on a determination by the genre matcher module 152) or as selected by the end user) to create a complete musical compilation.

Track partitioner 204 divides a recorded audio track into separate partitions that may then be addressed and potentially stored as individually addressable separate sound clips or files. The partitions are preferably chosen so that segments spliced end-to-end result in few or no audio artifacts. For example, let us assume that an audible input comprises the phrase "pum pa pum". In one embodiment, division of this audible input may identify and distinguish each syllable of this audible input into separate sounds, such as "pum," "pa," and "pum." However, it should be understood that this phrase can be delineated in other ways, and a single partition may include more than one syllable or word. Four partitions (numbered "1," "2," "3," and "4") each including more than one syllable are illustrated on display 75 in FIGS. 1A, 1B and 1C. As illustrated, partition "1" has a plurality of notes that may reflect the same plurality of syllables having been recorded by track recorder 202 using input from microphone 52 from a human or musical instrument source.

Figure 4:
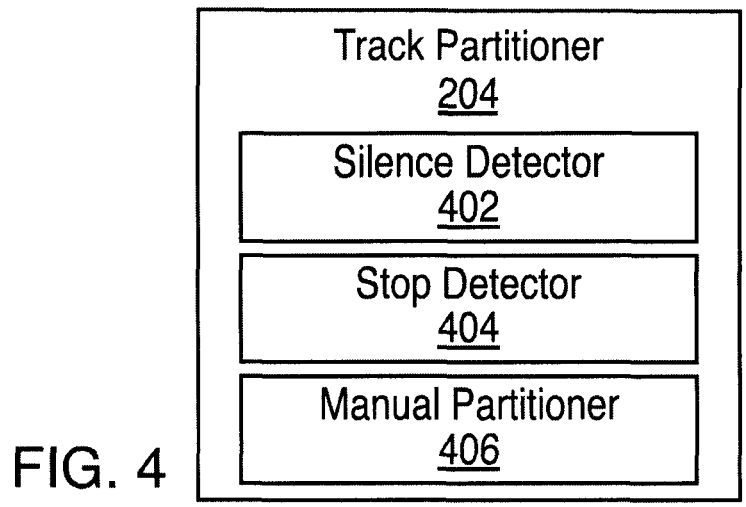
FIG. 4 is a block diagram of one embodiment of potential components of the track partitioner 204 of the system of FIG. 2.

To perform the division of an audible track into separate partitions track partitioner 204 may utilize one or more processes running on the processor 2902. In one exemplary embodiment illustrated in FIG. 4, track partitioner 204 may include silence detector 402, stop detector 404, and/or manual partitioner 406, each of which may be used to partition an audio track into N partitions aligned in time. Track partitioner 204 may use silence detector 302 to partition a track wherever silence is detected for a certain period of time. That "silence" may be defined by a volume threshold, such that when the audio volume dips below the defined threshold for a defined period of time, the location in the track is deemed silent. Both the volume threshold and the period of time may be configurable.

Stop detector 404, on the other hand, may be configured to use speech analysis, such as formant analysis, to identify vowels and consonants in the track. For example, consonants such as T, D, P, B, G, K, and nasals are delimited by stoppages of airflow in their vocalization. The location of certain vowels or consonants may then be used to detect and identify preferably partitioning points. Similar to silence detector 402, the types of vowels and consonants utilized by stop detector 404 for identifying partitioning points may be configurable. Manual partitioner 406 may also be provided to enable a user to manually delimit each partition. For example, a user may simply specify a time length for each partition causing the audio track to be divided into numerous partitions each of equal length. The user may also be permitted to identify a specific location in the audio track at which a partition is to be created. The identification may be performed graphically using a pointing device, such as a mouse or game controller, in conjunction with the type of graphical user interface illustrated in FIGS. 1A, 1B, and 1C. The identification may also be performed by pressing a button or key on user input device, such as keyboard 55, mouse 54 or game controller 56 during audible playback of the audio track by track recorder 202.

Of course, although the functions of silence detector 402, stop detector 304, and manual partitioner 406 have been described individually, it is contemplated that track partitioner 204 may use any combination of the silence detector, stop detector, and/or manual partitioner to partition or divide an audio track into segments. It would also be understood by those of ordinary skill in the art having the present specification, drawings and claims before them that other techniques to partition or divide an audio track into segments may also be used.

Quantizer 206 is configured to quantize partitions of a received audio track, which may utilize one or more processes running on the processor 2902. The process of quantization, as the term is used herein, refers to the time shifting of each previously created partition (and consequently the notes contained within the partition), as may be necessary in order to align the sounds within the partitions with a certain beat. Preferably, quantizer 206 is configured to align the beginning of each partition chronologically with a previously determined beat. For example, a meter may be provided where each bar may comprise four beats and alignment of a separate sound may occur relative to quarter-beat increments of time, thus providing sixteen time points in each four-beat bar to which a partition may be aligned. Of course, any number of increments for each bar (such as three beats for a waltz or polka effect, two beats for a swing effect, etc.) and beat may be used and, at any time during process, may be adjusted either manually by a user or automatically based on certain criteria such as a user selection of a certain style or genre of music (e.g. blues, jazz, polka, pop, rock, swing, or waltz).

In one embodiment, each partition may be automatically aligned by quantizer 206 with an available time increment to which it was most closely received at the time of recording. That is, if a sound begins between two time increments in the beat, then the playback timing of the sound will be shifted chronologically forward or backward to either one of these increments to which its initial starting time is closer. Alternately, each sound may be automatically shifted in time to each time increment that immediately precedes the relative time in which the sound was initially recorded. In yet another embodiment, each sound may be automatically shifted in time to each time increment that immediately follows the relative time in which the sound was initially recorded. A time shift, if any, for each separate sound may also be alternately or additionally influenced based on a genre selected for the multi-track recording, as further discussed below with regards to genre matcher 152. In another embodiment, each sound may also be automatically time aligned with a previously recorded track in a multi-track recording, enabling a karaoke-type effect. Moreover, the length of a separate sound may be greater than one or more time increments and time shifting of quantize 206 may be controlled to prevent separate sounds from being time shifted so that they overlap within the same audio track.

Frequency detector 208 is configured to detect and identify the pitches of the one or more separate sounds that may be contained within each partition, which may utilize one or more processes running on the processor 2902. In one embodiment, a pitch may be determined by converting each separate sound to a frequency spectrum. Preferably, this is accomplished by using a Fast Fourier transform (FFT) algorithm, such as the FFT implementation by iZotope. However, it should be understood that any FFT implementation may be used. It is also contemplated that a Discrete Fourier Transform (DFT) algorithm may also be used to obtain the frequency spectrum.

Figure 5:
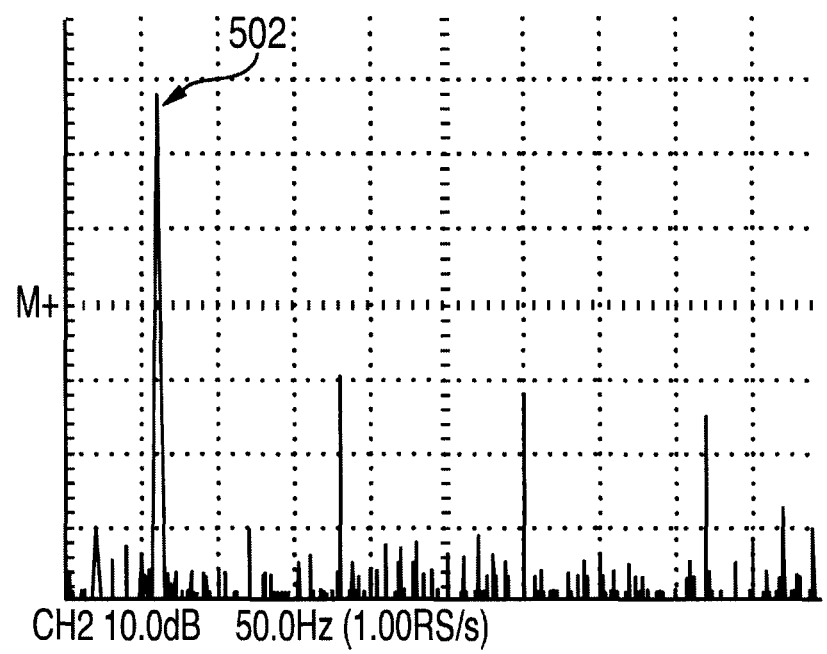
FIG. 5 is an exemplary frequency spectrum diagram illustrating the frequency distribution of an audio input having a fundamental frequency and multiple harmonics.

For illustration, FIG. 5 depicts one example of a frequency spectrum that may be produced by the output of a FFT process performed on a portion of a received audio track. As can be seen, the frequency spectrum 400 includes one major peak at a single fundamental frequency (F) 502 that corresponds to the pitch, in addition to harmonics that are excited at 2F, 3F, 4F . . . nF. The additional harmonics are present in the spectrum because, when an oscillator such as the vocal cord or a violin string is excited at a single pitch, it typically vibrates at multiple frequencies.

In some instances, the identification of a pitch may be complicated due to additional noise. For example, as shown in FIG. 5, the frequency spectrum may include noise that occurs as a result of the audio input being from a real world oscillator such as a voice or instrument, and appears as low amplitude spikes spread across the spectrum. In one embodiment, this noise may be extracted by filtering the FFT output below a certain noise threshold. Identification of the pitch may also be complicated in some instances by the presence of vibrato. Vibrato is a deliberate frequency modulation that may be applied to a performance, and is typically between 5.5 Hz and 7.5 Hz. Like with noise, vibrato may be filtered out of the FFT output by applying a band-pass filter in the frequency domain, but filtering the vibrato may be undesirable in many situations.

In addition to the frequency domain approaches discussed above, it is contemplated that the pitch of one or more sounds in a partition could also be determined using one or more time-domain approaches. For example, in one embodiment, the pitch may be determined by measuring the distance between zero crossing points of the signal. Algorithms such as AMDF (average magnitude difference function), ASMDF (Average Squared Mean Difference Function), and other similar autocorrelation algorithms may also be used.

For judgments in pitch to be most effective, the pitched content may also be grouped into notes (of constant frequency) and glisses (of steadily increasing or decreasing frequency). However—unlike instruments with frets or keys that naturally produce steady, discrete pitches—the human voice tends to slide into notes and wavers in a continuous fashion, making conversion to discrete pitches difficult. Consequently, frequency detector 208 may also preferably utilize pitch impulse detection to identify shifts or changes in pitch between separate sounds within a partition.

Figure 6:
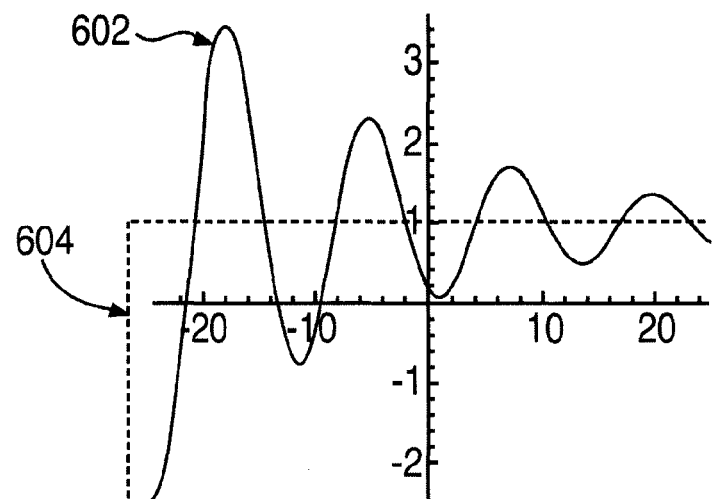
FIG. 6 is an exemplary pitch versus time plot illustrating the pitch of a human voice changing between first and second pitches and subsequently settling around the second pitch.

Pitch impulse detection is one approach of delimiting pitch events that focuses on the ballistics of the control loop formed between the singer's voice and his perception of his voice. Generally, when a singer utters a sound, the singer hears that sound a moment later. If the singer hears that the pitch is incorrect, he immediately modifies his voice toward the intended pitch. This negative feedback loop may be modeled as damped harmonic motion driven by periodic impulses. Thus, a human voice may be considered as a single oscillator: the vocal cord. One example illustration of a pitch changing and settling for a singer's voice 602 can be seen in FIG. 6. The tension in the vocal cord controls the pitch, and this change in pitch may be modeled by the response to a step function, such as step function 604 in FIG. 6. Thus, the start of the new pitch event may be determined by finding the start of the damped harmonic oscillation in pitch; and observing the successive turning points of the pitch converging to a steady value.

Figure 7:
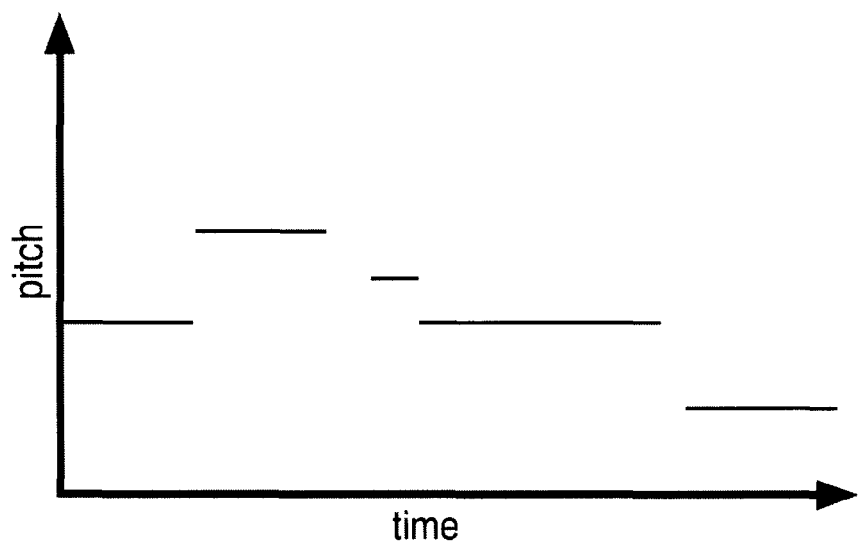
FIG. 7 is an exemplary embodiment of a morphology plotted as pitch events over time, each having a discrete duration.

After the pitch events within a partition of an audio track have been determined, they may be converted and/or stored into a morphology, which is a plot of pitch events over time. One example of a morphology (without partitioning) is depicted in FIG. 7. The morphology may therefore include information identifying the onset, duration, and pitch of each sound, or any combination or subset of these values. In one embodiment, the morphology may be in the form of MIDI data; although a morphology may refer to any representation of pitch over time, and is not limited to semitones or any particular meter. For instance, other such examples of morphologies that may be used are described in "Morphological Metrics" by Larry Polansky, *Journal of New Music Research*, volume 25, pp. 289-368, ISSN: 09929-8215, which is incorporated herein by reference.

Frequency shifter 210 may be configured to shift the frequency of the audible input, which may utilize one or more processes running on the processor 2902. For example, the frequency of one or more sounds within a partition of an audible input may be automatically raised or lowered in order to align with fundamental frequency of audible inputs or separate sounds that have been previously recorded. In one embodiment, the determination of whether to raise or lower the frequency of the audible input depends upon the closest fundamental frequency. In other words, assuming the composition was in the key of C major, if the audible frequency captured by track recorder 202 is 270.000 Hz frequency shifter 210 would shift the note down to 261.626 Hz (middle-C), whereas if the audible frequency captured by the track recorder 202 is 280.000 Hz frequency shifter 210 would shift the note up 293.665 Hz (or the D above middle-C). Even when the frequency shifter 210 primarily adjusts audible input to the closest fundamental frequency, the shifter 210 may also be further programmed to make different decisions on close calls (i.e. where the audible frequency is approximately half-way between two notes) based on the musical key, genre and/or chord. In one embodiment, the frequency shifter 210 may adjust audible inputs to other fundamental frequencies that make more musical sense based on the musical key, genre and/or chord based on controls provided by the genre matcher 260 and/or chord matcher 270, as further discussed below. Alternately or additionally the frequency shifter 210—in response to input from the instrument converter 212—may also individually shift one or more portions of one or more partitions to correspond with a predetermined set of frequencies or semitones such as those typically associated with a selected musical instrument, such as a piano, guitar or other stringed instrument, woodwind, or brass.

Instrument converter 212 may be configured to perform conversion of one or more portions of the audible input into one or more sounds that have a timbre associated with a musical instrument. For example, one or more sounds in an audible input may be converted into one or more instrument sounds of one or more different types of percussion instruments, including a snare drum, cowbell, bass drum, triangle, and the like. In one embodiment, the conversion of an audible input into one or more corresponding percussion instrument sounds may comprise adapting the timing and amplitude of one or more sounds in the audible input into a corresponding track comprising one or more sounds of the percussion instrument, the percussion instrument sound comprising a same or similar timing and amplitude as the one or more audible input sounds. For other instruments enabled to play different notes, such as a trombone or other types of brass, string, woodwind instrument or the like, the instrument conversion may further correlate one or more frequencies of audible input sounds with one or more sounds with the same or similar frequencies played by the instrument. Further, each conversion may be derived and/or limited by the physical capabilities of actually playing the corresponding physical instrument. For example, the frequencies of instrument sounds generated for an alto saxophone track may be limited by the actual frequency range of a traditional alto saxophone. In one embodiment, the generated audio track may comprise a MIDI formatted representation of the converted audible input. The data for the various instruments used by instrument converter 212 would preferably be stored in memory 2904 and may be downloaded from optical or magnetic media, removable memory, or via the network.

Gain control 214 may be configured to automatically adjust the relative volume of the audible input based on the volume of other, previously recorded tracks and may utilize one or more processes running on the processor 2902. Harmonics generator 216, may be configured to incorporate harmonics into the audio track, which may utilize one or more processes running on the processor 2902. For example, different, additional frequencies of the audible input signal may be determined and added to the generated audio track. Determining the additional frequencies may be also based on a genre from genre matcher 260 or through the use of other, predetermined parameter settings input by a user. For instance, if the selected genre were a waltz the additional frequencies may be selected from major chords harmonious to the lead music in the octave immediately below the lead, in 3/4's time with an "oom-pa-pa" beat, as follows: root 5 5
3 3' root 5 5
3 3˙

Special effects editor 218 may be configured to add various effects to the audio track, such as an echo, reverberation, and the like preferably utilizing one or more processes running on the processor 2902.

Audio Converter 140 may also include a manual adjustment control 220 to enable a user to manually alter any of the settings automatically configured by the modules discussed above. For instance, manual adjustment control 220 may enable a user to alter the frequency of an audio input, or portions thereof; enable a user to alter the onset and duration of each separate sound; increase or decrease the gain for an audio track; select a different instrument to be applied to instrument converter 212, among other options. As would be understood by those of ordinary skill in the art having the present specification, drawings and claims before them, this manual adjustment control 220 may be designed for use with one or more graphical user interfaces. One particular graphical user interface will be discussed below in association with FIGS. 13A, 13B, and 13C below.

Figure 8:
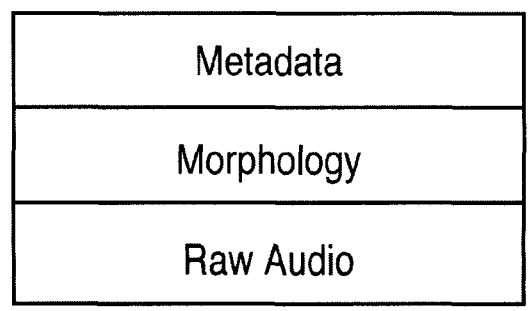
FIG. 8 is a block diagram illustrating the content of a data file in one embodiment of the invention.

FIG. 8 illustrates one embodiment of a file structure for a partition of an audio track that has been processed by audio converter 140, or otherwise downloaded, ingested, or obtained from another source. As shown, in this embodiment, the file includes metadata associated with the file, the obtained morphology data (e.g. in MIDI format), and the raw audio (e.g. in .wav format). The metadata may include information indicating a profile associated with the creator or supplier of the audio track partition. It may also include additional information regarding the audio signature of the data, such as a key, tempo, and partitions associated with the audio. The metadata may also include information regarding the potential available pitch shifts that can be applied to each note in the partition, the amount of time shifting that can be applied to each note, and the like. For example, it is understood that, for live recorded audio, there is a possibility of distortion if a pitch is shifted by more than a semitone. Accordingly, in one embodiment, a constraint may be placed on live audio to prevent shifting more than one semitone. Of course, different settings and different constraints may also be used. In another embodiment, ranges for potential pitch shifting, time shilling, etc. may also be altered or established by a creator of an audio track partition, or any individual with substantial rights in that audio track partition, such as an administrator, a collaborating party, and the like.

Recording Session Live Looping

Recording Session Live Looping (RSLL) Module 142 implements a digital audio workstation that, in conjunction with audio converter 140, enables recording of audible input, generation of separate audio tracks, and the creation of multi-track recordings. Thus, RSLL Module 142 may enable any recorded audio tracks, either spoken, chanted, or otherwise, to be combined with previously recorded tracks to create a multi-track recording. As further discussed below, RSLL Module 142 is also preferably configured to loop at least one bar of a previously recorded multi-track recording for repeated playback. This repeated playback may be executed while new audible inputs are being recorded or the RSLL Module 142 is otherwise receiving instructions for a recording session currently being conducted. As a result, RSLL module 142 allows a user to continue editing and composing musical tracks while playing and listening to previously recorded tracks. As will be understood from the discussion below, the continuous looping of previously recorded tracks also minimizes the user's perception of any latency that may result from the processes that are applied to an audio track that is being currently recorded by the user, as such processes are preferably completed.

Figure 9:
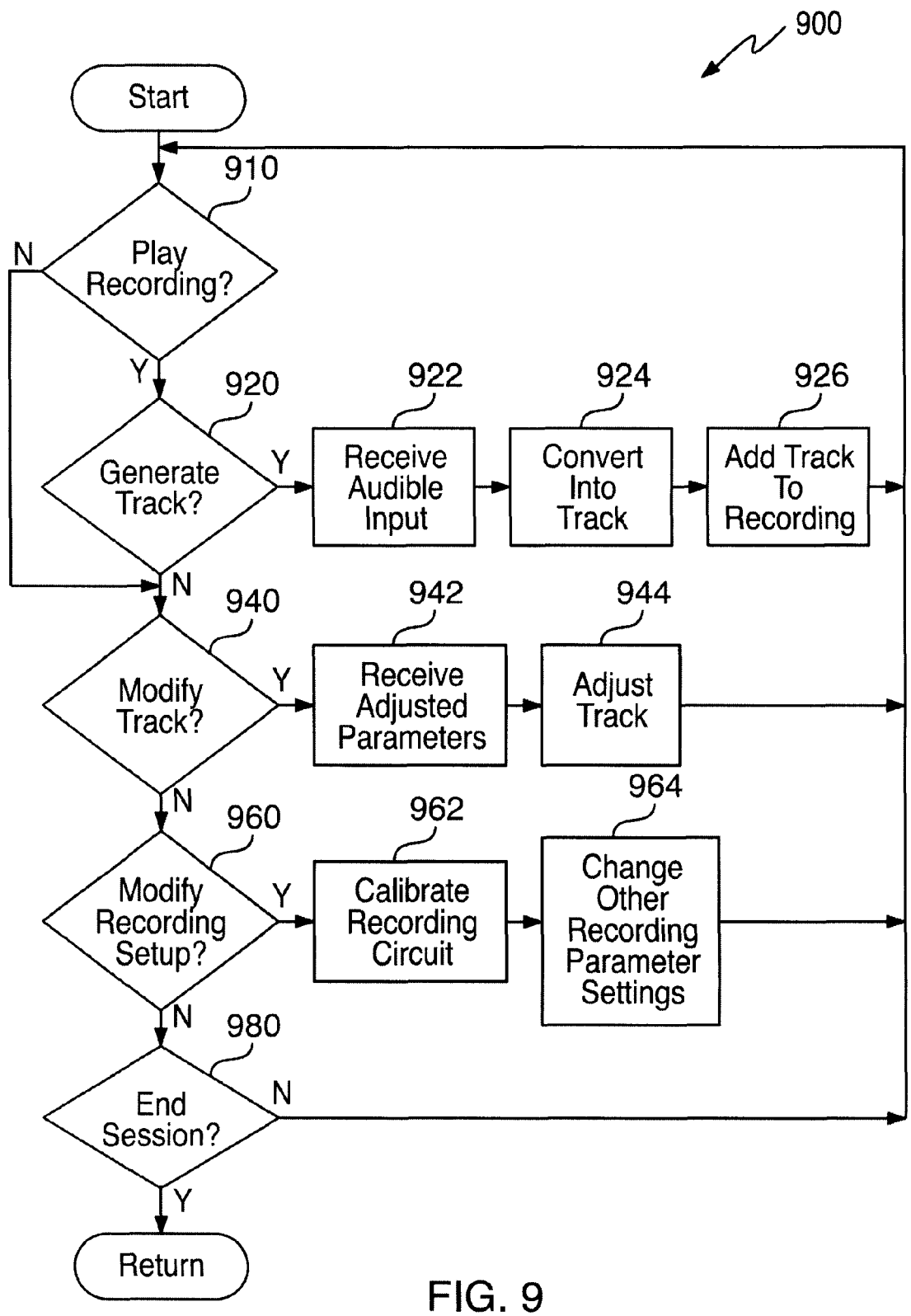
FIG. 9 is a flow chart illustrating one embodiment of a method for generating musical tracks within a continuously looping recording session.

FIG. 9 illustrates a logical flow diagram generally showing one embodiment of an overview process for creating a multi-track recording using RSLL Module 142 in conjunction with audio converter 140. Overall, the operations of FIG. 9 generally represent a recording session. Such a session may be newly created and completed each time a user employs system 100, and, for example, RSLL Module 142. Alternately, a previous session may be continued and certain elements thereof, such as a previously recorded multi-track recording or other user-specified recording parameters, may also be loaded and applied.

In either arrangement, process 900 begins, after a start block, at decision block 910, where a user determines whether a currently recorded multi-track recording is to be played back. The process of playing back the current multi-track recording, while enabling other actions to be performed, is generally referred to herein as "live looping." The content and duration of a portion of the multi-track recording currently being played back, without explicit repetition, is referred to as a "live loop." During playback, the multi-track recording may be accompanied by a click track, which generally comprises a separate audio track, not stored with the multi-track recording, that provides a series of equally spaced reference sounds or clicks that audibly indicate a speed and measure for a track for which the system is currently configured to record.

In an initial execution of process 900, an audio track may not yet have been generated. In such a state, playback of the empty multi-track recording in block 910 may be simulated and the click track may provide the only sounds played back to a user. However, in one embodiment, a user may select to mute the click track, as further discussed below with respect to block 964. Visual cues may be provided to the user during recording in conjunction with audio playback. Even when an audio track has not been recorded, and the click track is muted, indication of simulated playback and current playback position may be limited solely to those visual cues, which may include, for example, a changing display of a progress bar, pointer, or some other graphical indication (see, e.g., FIGS. 12A, 12B, and 12C).

The live looped multi-track recording played back in decision block 910 may comprise one or more audio tracks that have been previously recorded. The multi-track recording may include an overall length as well as a length which is played back as a live loop. The length of a live loop may be selected to be less than the overall length of a multi-track recording, permitting a user to separately layer different bars of the multi-track recording. The length of a live loop, relative to the overall length of a multi-track recording, may be manually selected by a user or, alternately, automatically determined based on received audible input. In at least one embodiment, the overall length of the multi-track recording and the live loop may be the same. For example, the length of the live loop and the multi-track recording may be a single bar of music.

When the multi-track recording is selected for playback at decision block 910, additional visual cues, such as a visual representation of the one or more tracks, may be provided in synch with the audio playback of a live loop comprising at least a portion of the multi-track recording played back for the user. While the multi-track recording is played, process 900 continues at decision block 920 where a determination is made by an end-user whether an audio track for the multi-track recording is to be generated. The recording may be initiated based on the receipt of an audible input, such as a vocal audible input generated by an end-user. In one embodiment, a detected amplitude of an audible input may trigger the sampling and storage of an audible input signal received in system 100. In an alternate embodiment, such a track generation may be initialized by a manual input received by system 100. Further, generating a new audio track may require both a detected audible input, such as from a microphone, and a manual indication. If a new audio track is to be generated, processing continues at block 922. If the generation of an audio track is not initiated, process 900 continues at decision block 940.

At block 922, an audible input is received by the track recorder 202 of audio converter 140 and the audible input is stored in memory 2904 in one or more data storage modules 132. As used herein, "audible" refers to a property of an input to device 50 wherein, as the input is being provided, it may concurrently, naturally, and directly be heard by at least one user without amplification or other electronic processing. In one embodiment, the length of the recorded audible input may be determined based on the remaining amount of time within a live loop when the audible input is first received. That is, the recording of an audible input may be ended after a length of time at the end of a live loop, regardless if a detectable amount of audible input is still being received. For example, if the length of the loop is one bar long at four beats per bar and receipt of the audible input is first detected or triggered at the beginning of the second beat, then three beats worth of audible input may be recorded, corresponding to the second, third, and fourth beats of the bar and, thus, those second, third, and fourth beats would be looped in the multi-track recording playback continually processed in block 910. In such an arrangement, any audible input received after the end of the single bar may be recorded and processed as a basis for another separate track for the multi-track recording. Such additional processing of the separate track may be represented as a separate iteration through at least blocks 910, 920, and 922.

In at least one alternate embodiment, the length of the looped playback may be dynamically adjusted based on the length of audible input received at block 922. That is, the audible input might automatically result in an extension of the length of the track of the multi-track recording that is currently being played in block 910. For example, if additional audible input is received after a length of a current live loop has been played back, then this longer audible input may be further recorded and maintained for derivation as the new audio track. In such an arrangement, previous tracks of the multi-track recording may be repeated within subsequent live loops in order to match the length of the received audible input. In one embodiment, the repetition of the shorter, previous multi-track recording may be performed an integral number of times. This integral number of repetitions retains the relationship, if any, between multiple bars of the shorter multi-track recording previously recorded. In such a way, the looping point of a multi-track recording and live loop may be dynamically altered.

Similarly, the length of the received track at block 922 may be shorter than the length of the currently playing live loop (i.e. receiving only one bar of audible input during the playback of a four bar long live loop). In such an arrangement, the end of the audible input may be detected when no additional audible input has been received after a predetermined time (e.g. a selected number of seconds) following the receipt and recording of an audible input of at least a threshold volume. In one embodiment, the detection of this silence may be based on the lack of input above the threshold volume of the current live loop. Alternately or additionally, the end of an audible input may be signaled by receipt of a manual signal. The associated length of this shorter audible input may be determined in terms of a number of bars with a same number of beats as the multi-track recording. In one embodiment, this number of bars is selected as a factor of the length of the current live loop. In each case, an audible input, once converted to a track at block 924, may be manually or automatically selected for repetition for a number of times sufficient to match a length of the multi-track recording currently being played back.

In block 924, the received audible input may be converted into an audio track by audio converter 140. As discussed above, the audio conversion process may include various operations including partitioning, quantization, frequency detection and shifting, instrument conversion, gain control, harmonics generation, adding special effects, and manual adjustment. The order of each of these audio conversion operations may be altered, and may, in at least one embodiment, be configured by an end-user. Also, each of these operations may be selectively applied, enabling the audible input to be converted to an audio track with as much or as minimal additional processing as required. For example, instrument conversion may not be selected, thus permitting one or more original sounds from an audible input to be substantially included in the generated audio track with its original timbre. In block 924, an echo cancellation process may be applied to filter out the audio of other tracks being played during live looping from the audio track being actively recorded. In one embodiment, this may be accomplished by identifying the audio signal being played during the live loop, determining any delay between the output audio signal and the input audio signal; filtering and delaying the output audio signal to resemble the input audio signal; and subtracting the output audio signal from the input audio signal. One preferred echo cancellation process that may be used is one implemented by iZotope, although other implementations may also be used. The processes of block 924 may be subsequently applied or removed as further discussed herein with respect to block 942. After converting the audible input into a generated audio track at block 924, process 900 continues at block 926.

At block 926, the generated audio track from block 924 may be added in real-time to a multi-track recording. This may be a multi-track already initiated or, alternately, a new multi-track with the audio track included as the first track thereof. After block 926, process 900 may begin again at decision block 910, wherein the multi-track may be played back with the most recently generated audio track included. While the operations of 922, 924, and 926 are shown as being performed in series in FIG. 9, these steps may also be performed in parallel for each received audible input, in order to further enable the real-time recording and playback of an audible input signal. During each audible input, such parallel processing may be performed, for example, for each separate sound identified from the audible input, though alternate embodiments may include other, differently sized portions of the audible input signal.

At decision block 940, a determination is made whether one or more audio tracks in the multi-track recording are to be modified. For example, an input may be received that indicates an end-user desires to modify one or more of the previously recorded audio tracks. In one embodiment, the indication may be received through a manual input. As noted above, this modification may also be performed during playback of the currently recorded multi-track recording, permitting immediate appreciation of a current state of the multi-track recording for the end-user. In one embodiment, the indication may include one or more tracks of the multi-track recording to which an adjustment is desired to be applied. These tracks may also include one or more new tracks manually added to the multi-track recording. If indication of a track modification is received, process 900 continues at block 942; otherwise, process 900 continues at decision block 960.

At block 942, the parameters of the one or more previously converted tracks are received and adjusted parameters may be input by an end-user. Parameters for modification may include any adjustments that can be done using the processes of audio converter 140, which may include among other examples, muting or soloing a track, removal of an entire track, adjusting the strike velocity of an instrument in a track, adjusting the volume level of a track, adjusting a tempo of playback of all tracks in the live loop, adding or removing separate sounds from selected time increments of a track, adjusting the length of a live loop and/or overall length of the multi-track recording. Adjusting the length of the live loop may comprise altering start and end points of the loop with respect to the overall multi-track recording and/or may also comprise adding more bars to the tracks currently being repeated in a live loop, adding and/or appending previously recorded bars of the multi-track recording with at least a subset of the tracks previously associated with these bars, or deleting bars from the multi-track recording. The addition of a new track may require various aspects of this new track to be manually input by an end-user. Also at block 942, a search may be conducted for an additional track through the use of sound searcher module 150 to facilitate an end-user's reuse of previously recorded audio tracks.

At block 944, the adjusted parameters are applied to one or more tracks indicated at decision block 940. The application may include converting the adjusted parameter into a format compatible with the adjusted one or more tracks. For example, one or more numerical parameters may be adjusted to correspond to one or more values applicable to the MIDI or other protocol format. After block 944, process 900 may begin again at decision block 910, wherein at least a portion of the multi-track recording that corresponds to the live loop may be played back with the one or more modified audio tracks included.

At decision block 960, a determination is made whether a recording setup is to be modified. For example, an input may be received that indicates if a user desires to modify one or more aspects of the recording setup. This indication may also be received through a manual input. The indication may further one or more parameter settings of a recording setup that are to be adjusted. If the end user desires to modify the recording setup process 900 continues at block 962; otherwise, process 900 continues at decision block 980.

At block 962, the recording system may be calibrated. Particularly, the recording circuit, comprising at least an audio input source, audio output source, and audio track processing components, may be calibrated to determine latency of system 100 in conjunction with device 50, preferably measured in thousandths of a second, between a playback of a sound through the audio output source and receipt of an audible input through the audio input source. For example, if a recording circuit comprises a headset and a microphone, the latency may be determined by the RSLL 142 to improve receipt and conversion of an audible input, particularly a determination of a relative timing between beats of a multi-track recording being played back and a received audible input. After calibration at block 962, if any, process 900 continues to block 964.

At block 964, other recording system parameters settings may be changed. For example, playback of the click track may be turned on or off. Also, default settings for new tracks or new multi-track recordings may be modified, such as a default tempo and a default set of conversions for an audible input for block 924 may be provided. The time signature of a current multi-track recording may also be changed at block 964. Other settings associated with a digital audio workstation may also be provided so they may be modified by an end-user as would be understood by those of ordinary skill in the art having the present specification, drawings and claims before them. After block 964, process 900 may return to decision block 910, wherein adjustments to the recording system may be applied to the subsequent recording and modification of audio tracks for a multi-track recording.

At block 980, a determination is made whether the recording session is to be ended. For example, an input indicating the end of the session may be received from a manual input. Alternately, device 50 may indicate the end of the session if, for example, data storage 132 is full. If an end-of-session indication is received, the multi-track recording may be stored and/or transmitted for additional operations. For example, a multi-track recording may be stored in data storage 132 for future retrieval, review, and modification in a new session or a continuation of the session in which the multi-track recording was initially created. The multi-track recording may also be transmitted from a device 50 to another device 50 over a network for storage in at least one remote data store associated with a user account. A transmitted multi-track recording may also be shared through a network server with an online music community or shared in a game hosted by a network server.

If the recording session is not ended, process 900 returns again to decision block 910. Such a sequence of events may represent periods in which a user is listening to a live loop while deciding which, if any, additional tracks are to be generated or other modifications, if any, are to be performed. It will be understood by those of ordinary skill in the art having the present specification, drawings and claims before them that each block of the flowchart illustration in FIG. 9 (and otherwise), and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention. Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions.

The operation of certain aspects of the invention will now be described with respect to various screen displays that may be associated with a user interface implementing audio converter 140 and RSSL module 142. The illustrated embodiments are non-limiting, non-exhaustive example user interfaces that may be employed in association with the operations of system 100. The various screen displays may include many more or less components than those shown. Furthermore, the arrangement of the components are not limited to that shown in these displays, and other arrangements are also envisioned, including the disposition of various components on different interfaces. However, the components shown are sufficient to disclose an illustrative embodiment for practicing the present invention.

Figure 10B:
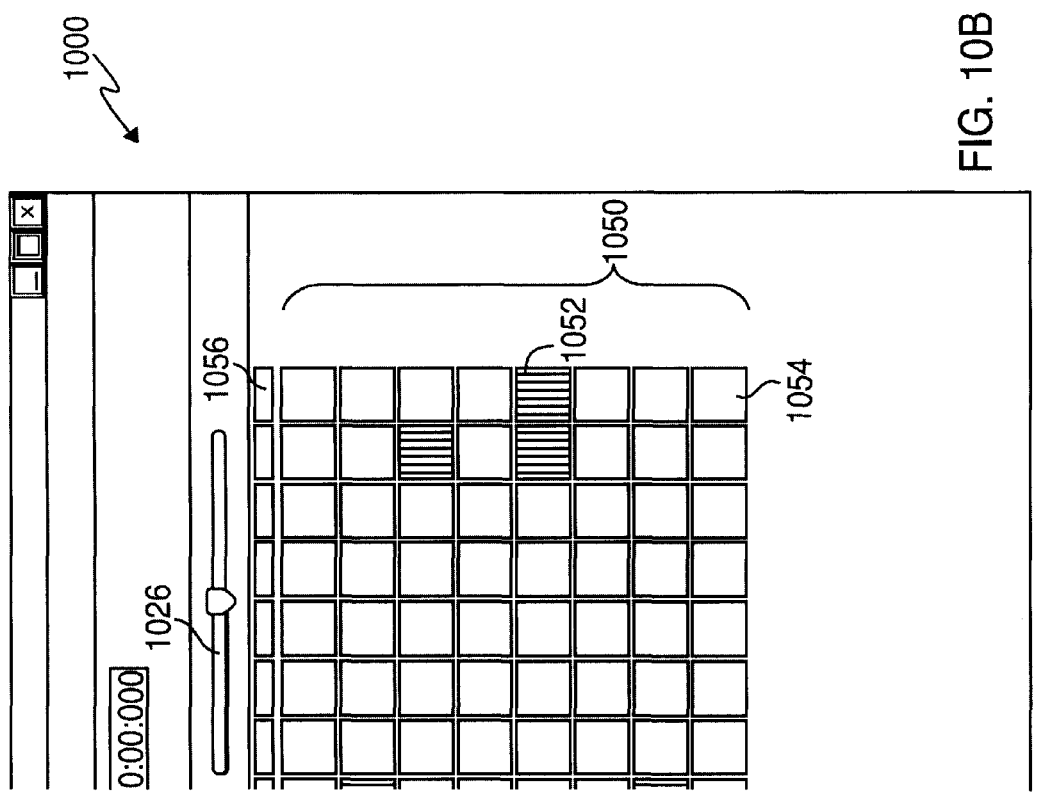

FIGS. 10, 10A, and 10B together illustrate one user interface that implements RSLL 142 and aspects of audio converter 140 to record and modify tracks of a multi-track recording. The overall display of interface 1000 may be considered a "control space". Each control displayed on interface may be operated based on a manual input from a user, such as through the use of a mouse 54, touch screen 80, pressure pad, or device arranged to respond to and convey a physical control. As shown, interface 1000 displays various aspects of a recording session and a multi-track recording generated as a part of this session. File menu 1010 includes options for creating a new multi-track recording or loading a previously recorded multi-track recording, as would be understood by those of ordinary skill in the art having the present specification, drawings and claims before them.

Tempo control 1012 displays a tempo of the multi-track recording in beats per minute. Tempo control 1012 may be directly, manually modified by a user. Bar control 1014 displays a bar number for a multi-track recording. Bar control 1014 may be configured to display a current bar number during a live loop, an overall number of bars, or alternately be used to select a certain bar number of the multi-track recording for further display in the interface 1000.

Beat control 1016 displays a beat number for a multi-track recording. Beat control 1016 may be configured to display a total number of beats for each bar, or, alternately, a current beat number during playback of the multi-track recording. Time control 1018 displays a time for the multi-track recording. This time control 1018 may be configured to display an overall time for the multi-track recording, a length of time for a currently selected live loop, an absolute or relative time during a live loop, or be used to jump to a certain absolute time of a multi-track recording. Operations of controls of interface 1000, such as controls 1012, 1014, 1016, 1018, and 1021-1026, may be changed in block 964 of FIG. 9. Controls 1020 correspond to track and recording setup adjustments further discussed with respect to blocks 942 and 962 of FIG. 9.

Add track control 1021 enables a user to manually add a track to a multi-track recording. Upon selection of control 1021, a new track is added to the multi-track recording and the interface is updated to include additional controls 1040-1054 for the added track, the operations of which are discussed as follows. Render WAV control 1022 generates and stores a WAV file from at least a portion of a multi-track recording. The portions of the multi-track recording rendered in this WAV file, as well as other storage parameters, may be further entered by a user upon selection of Render WAV control 1022. Further, other audio file formats, in addition to WAV, may also be available through a control such as control 1022.

Click track control 1023 toggles playback of the click track. Armed control 1024 toggles on and off the recording component of RSLL 142 and a device's ability to record an audible input. Armed control 1024 enables an end user to speak with other users, practice a vocal input, and create other audible sounds during a recording session without having those sounds converted into an audible input that is further processed by RSLL 142.

Figure 11:
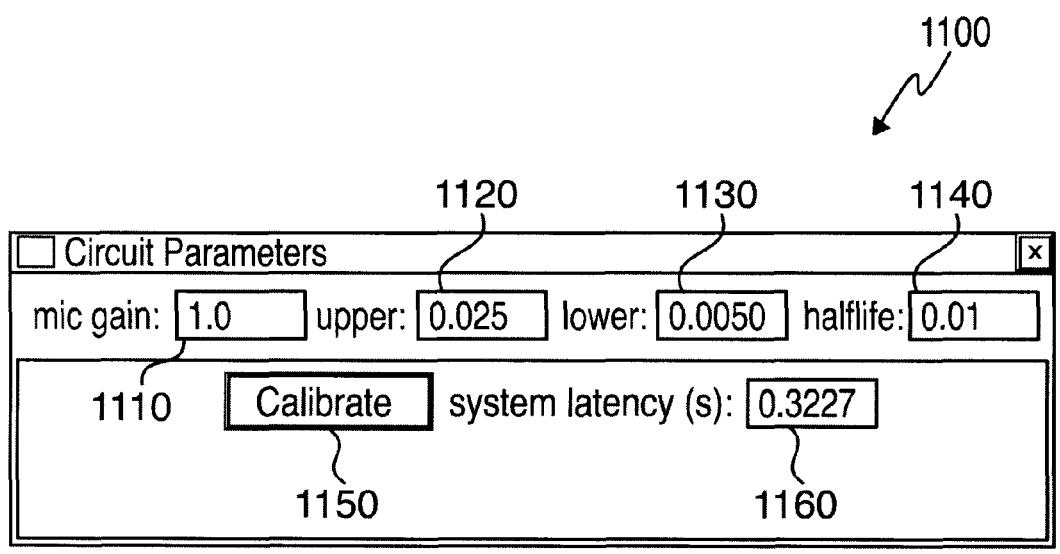
FIG. 11 is an illustration of one potential user interface for calibrating a recording session.

Circuit parameters control 1025 enables a user calibrate recording circuit parameters as is further discussed with regards to FIG. 11. Slider 1026 enables the volume of the multi-track recording playback to be controlled. Playback control 1030 enables playback of a multi-track recording. This playback is conducted in coordination with recording parameters further displayed and controlled through controls 1012-1018. For example, playback control 1030 may initiate playback of multi-track recording from positions indicated via controls 1014-1018 and at a tempo displayed in control 1012. As noted above, this control 1030 also enables recording of an additional audible input for generating another audio track for a multi-track recording. Position control 1032 may also be used to control a current playback position of a multi-track recording. For example, control 1032 may cause playback to be initiated at the absolute beginning of multi-track recording or, alternately, the beginning of a current live loop.

Grid 1050 on user interface 1000 represents the playback and timing of separate sounds within one or more tracks of a multi-track recording, wherein each row represents an individual track and each column represents a time increment. Each row may, for example, include a box for each time increment in a single bar. Alternately, each row may include enough boxes to represent time increments for an overall duration of a live loop. Boxes with a first shading or color in the grid 1050, such as box 1052, may represent a relative timing of where a sound is played back during a live loop, while other boxes, such as boxes 1054, each indicate a time increment within a track where a separate sound is not played back. A track added via manual control 1021 initially includes boxes such as box 1054. Selection of a box, such as a box 1052 or box 1054 may add or remove a sound from the track at the time increment associated with the selected box. Sounds added via manual input to a box in grid 1050 may comprise a default sound for an instrument selected for the track, or alternately, a copy of at least one sound quantized from an audible input for a track. This manual operation with grid 1050 enables an audible input to generate one or more sounds for a track, yet add copies of one or more of these sounds at manually chosen locations within the track.

A progress bar 1056 visually indicates a time increment of a current playback position of a multi-track recording. Each track in grid 1050 is associated with a set of track controls 1040, 1042, 1044, 1046, and 1048. Remove track control 1040 enables removal of a track from multi-track recording and may be configured to selectively remove a track from one or more bars of a multi-track recording.

Instrument selection control 1042 enables selection of an instrument to which sounds of an audible input are converted in the generated audio track. As illustrated in FIG. 10A, a plurality of instruments, including percussion or other types of non-percussion instruments, may be manually selected from a drop down menu. Alternatively, a default instrument or a default progression of instruments may be automatically selected or predetermined for each given audio track. When no instrument is selected, each sound in a generated audio track may substantially correspond to sounds of the original audible input, including with a timbre of the initial audible input. In one embodiment, an instrument may be selected based on training RSLL 142 to automatically convert particular sounds in an audible into associated instrument sounds based on, for example, a classification of frequency bands of each particular sound.

Mute/Solo control 1044 mutes an associated track or mutes all other tracks except for the track associated with the control 1044. Velocity control 1046 enables adjustment of an initial attack or strike strength of instrument sounds generated for a converted audio track, which may influence the peak, duration, release, and overall amplitude shape of each instrument sound generated for the associated audio track. Such velocity may be manually entered or, alternately, extracted based on properties of the audible input sounds from which one or more instrument sounds are generated. Volume control 1048 enables individual control of the playback volume of each track in the multi-track recording.

FIG. 11 illustrates one embodiment of an interface 1100 for calibrating a recording circuit. Interface 1100 may represent one example of a screen display pop-up, or the like, that may appear when control 1025 (see FIG. 10A) is selected. In one embodiment, interface 1100 comprises a microphone gain control 1110 that enables adjustment of the amplitude of a received audible input. Upper control 1120 and lower control 1130 and half-life control 1140 provide additional control and validation for identifying a received signal as being an audible input for further processing by system 100. Calibrate circuit initiates a predetermined click track and may direct a user to replicate the click track in an audible input signal. In an alternate embodiment, the click track for calibration may be directly received as an audible input by audio input devices such as a microphone, without requiring a user to audibly replicate the click track. Based on relative timing differences between the generation of sounds in the click track and the receipt of sounds in the audible input, a system latency 1160 may be determined. This latency value may be further employed by RSLL 142 to improve quantization of an audible input and the detected relative timing between the playback of a multi-track recording and an audible input received for subsequent derivation of an additional audio track to be added to the multi-track recording.

Thus, as illustrated, interfaces 1000 and 1100 present users with a control space that is welcoming and non-threatening, powerful, and consistent, yet intuitive to learn, which is particularly important for a lay user who is not a professional musician or otherwise familiar with digital audio authoring tools.

Figure 12A:
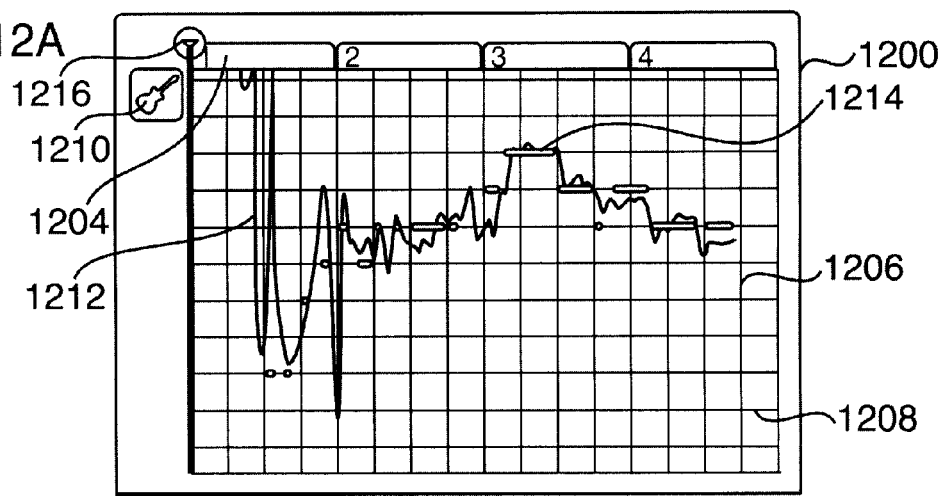
FIGS. 12A, 12B, and 12C together illustrate a second potential user interface associated with the generation of musical tracks within a continuously looping recording session at three separate periods of time.
Figure 12B:
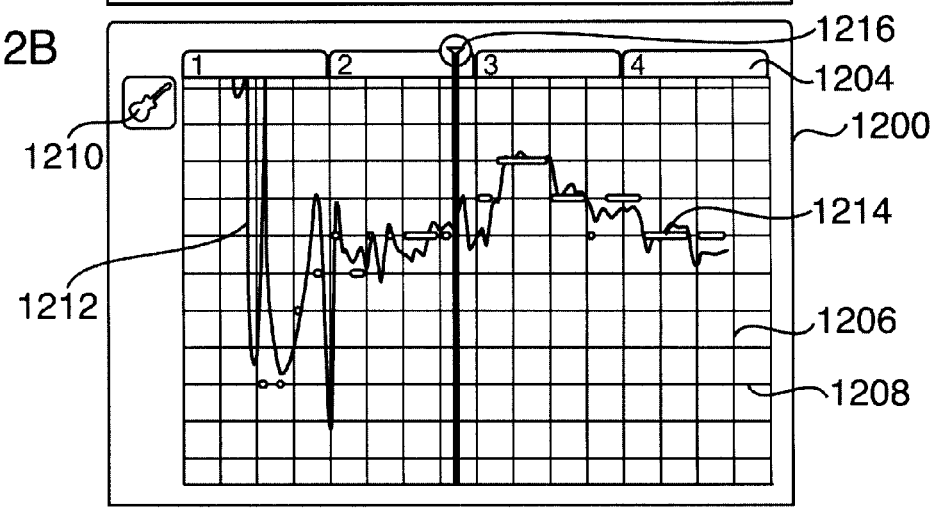
Figure 12C:
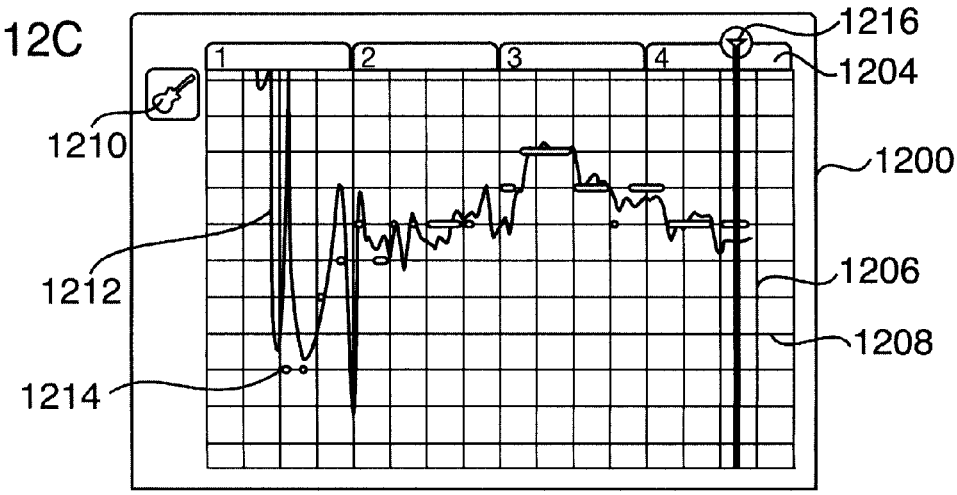

FIGS. 12A, 12B, and 12C together illustrate yet another exemplary visual display that may be used in association with the recording and modification of audio tracks in a multi-track recording. In this example, the audio frequency (actual and morphological (post frequency shift by frequency shifter 210)), partition, quantization, and tempo information are provided graphically in order to provide the user with an even more intuitive experience. For instance, turning first to FIG. 12A, a graphical control space 1200 for a live loop is provided. The control space includes a plurality of partition indicators 1204 that identify each of the partitions (or musical measures) in the track (in the case of FIGS. 12A-C measures 1 through 4 are shown). In one embodiment of the graphical user interface illustrated in FIGS. 12A-C, vertical lines 1206 illustrate the beat within each measure, with the number of vertical lines per measure preferably corresponding to the top number of a time signature. For example if a musical composition is chosen to be composed using a ¾ time signature, each measure would include three vertical lines to indicate that there are three beats in the measure or partition. In the same embodiment of the user interface illustrated in FIGS. 12A-C, horizontal lines 1208 may also identify the fundamental frequencies associated with a selected instrument to which the audible input is to be converted. As further illustrated in the embodiment of FIGS. 12A-C, an instrument icon 1210 may also be provided to indicate the selected instrument, such as the guitar selected in FIGS. 12A-C.

In the embodiment illustrated in FIGS. 12A-C, solid line 1212 represents the audio waveform of one track as recorded by an end-user, either vocally or using a musical instrument; while the plurality of horizontal bars 1214 represent the morphology of the notes that have been generated from the audio waveform by quantizer 206 and frequency shifter 210 of audio converter 140. As depicted, each note of the generated morphology has been shifted in time to align with the beats of each partition and shifted in frequency to correspond to one of the fundamental frequencies of the selected instrument.

As depicted by comparing FIG. 12A to FIG. 12B to FIG. 12C, playback bar 1216 may also be provided to identify the specific part of the live loop that is currently being played by track recorder 202 pursuant to the process of FIG. 9. The playback bar 1216 therefore moves from left to right as the live loop is played. Upon reaching the end of the fourth measure, the playback bar returns to the beginning of measure one and repeats the loop again sequentially. The end-user may provide additional audio input at any point within the live loop by recording additional audio at the appropriate point in the loop. Although not shown in FIGS. 12A-C, each additional recording can be used to provide a new track (or set of notes) for depiction within the live loop. Separate tracks may be associated with a different instruments by adding additional instrument icons 1210.

Figure 13A:
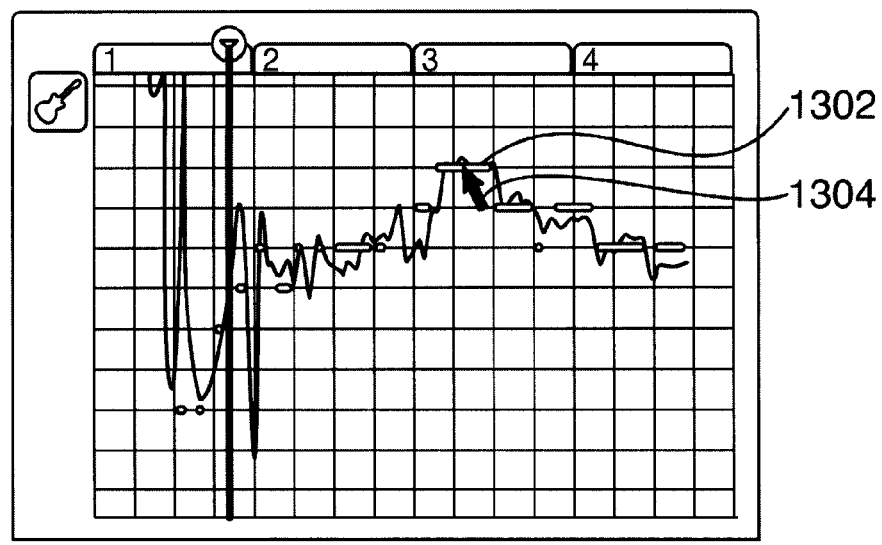
FIGS. 13A, 13B, and 13C together illustrate one potential use of the user interface to modify a musical track input into the system using the user interface of FIG. 12.
Figure 13B:
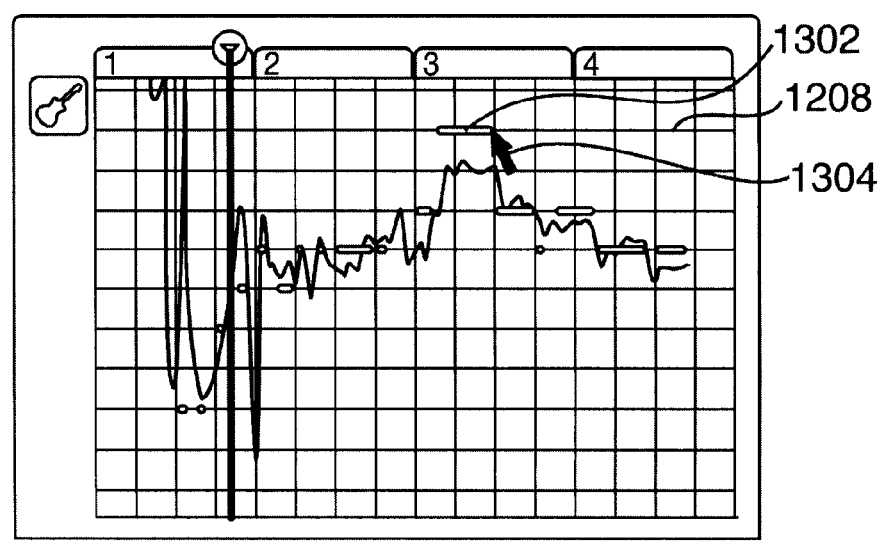
Figure 13C:
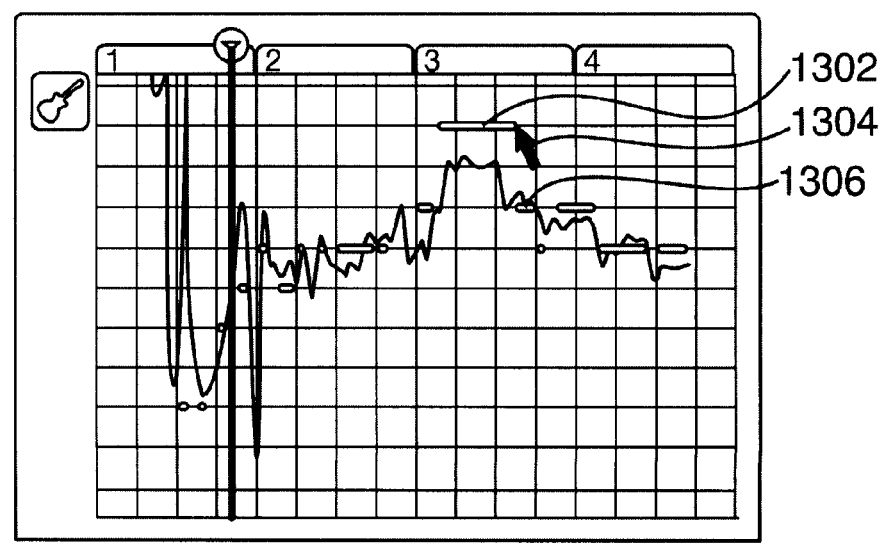

FIGS. 13A, 13B, and 13C together illustrate one example of a process for manually altering a previously generated note via the interface of FIGS. 12A-C. As shown in FIG. 13A, an end-user can select one specific note 1302 using a pointer 1304. As shown in FIG. 13B, the end-user may then drag the note vertically to another horizontal line 1208 to alter the pitch of the dragged note. In this example, the note 1302 is shown as being moved to a higher fundamental frequency. It is contemplated that notes could also be moved to frequencies between fundamental frequencies of the instrument. As shown in FIG. 13C, the timing of a note can also be altered by selecting the end of the morphologic depiction of the note and then dragging it horizontally. In FIG. 13C, the duration of note 1304 has been lengthened. As also depicted in FIG. 13C, the result of lengthening note 1304, is the automatic shortening of note 1306 by quantizer 206 to maintain the beat and avoid overlapping notes being played by a single instrument. As would be understood by those of ordinary skill in the art having the present specification, drawings and claims before them, the same or similar methodology can be used to shorten the duration of a selected note resulting in the automatic lengthening of another adjacent note and further that the duration of a note can be changed from the beginning of the morphologic depiction in the same manner illustrated with respect to modifying the tail of that depiction. It should also be similarly understood by those of ordinary skill in the art that the same methodology may be used to delete notes from a track or copy notes for insertion at other parts of the track.

Figure 14C:
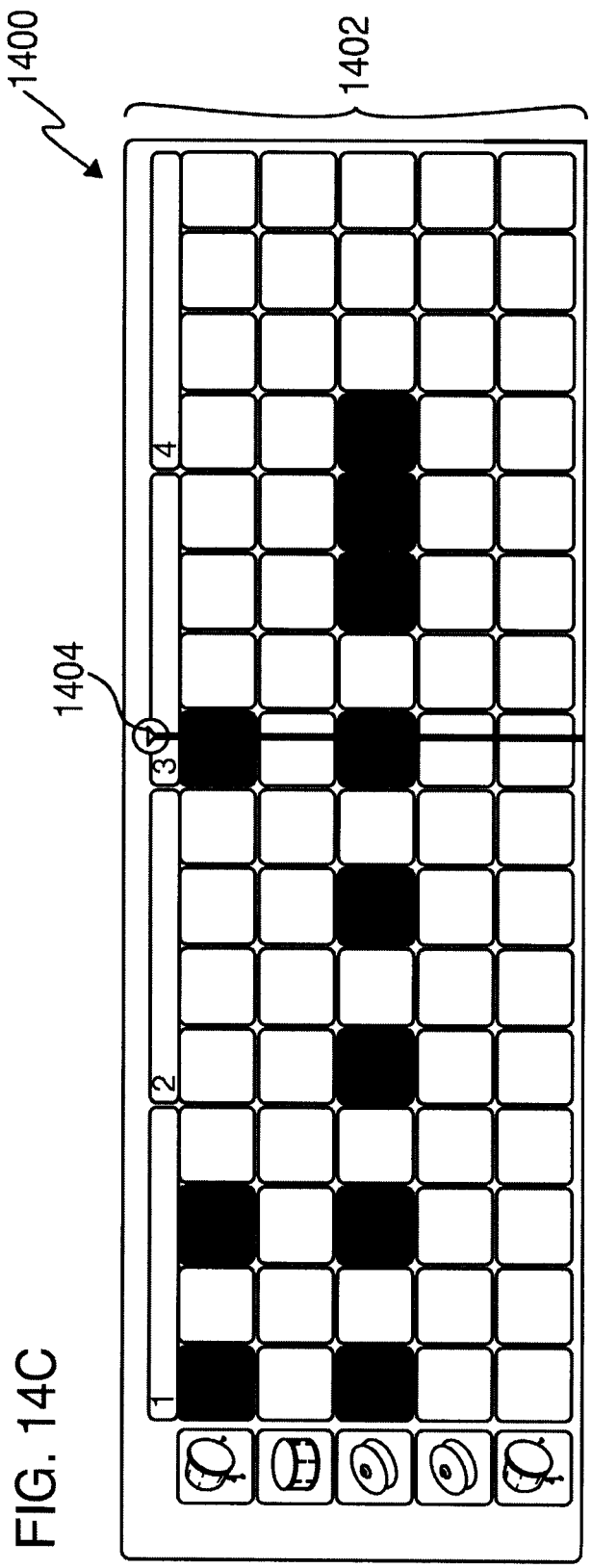

FIGS. 14A, 14B, and 14C illustrate yet another exemplary visual display for use with system 100. In this example, the visual display enables a user to record and modify a multi-track recording associated with percussion instruments. Turning first to FIG. 14A, a control space 1400 includes a grid 1402 that represents the playback and timing of separate sounds within one or more percussion tracks. As in the illustration of FIGS. 12A-C, partitions 1-4, each having four beats are depicted in the example of FIG. 14A-C. For example, in FIG. 14A, the first row of grid 1402 represents the playback and timing of sounds associated with a first base drum, the second row of grid 1402 represents the playback and timing of sounds associated with a snare drum, the third and fourth rows of grid 1402 represents the playback and timing of sounds associated with cymbals, and the fifth row of grid 1402 represents the playback and timing of sounds associated with a floor torn. As would be understood by those of ordinary skill in the art having the present specification, drawings and claims before them, these particularly percussion instruments and their order on grid 1402 is meant only to illustrate the concept and should not be seen as limiting the concept to this particular example.

Each box in the grid represents the timing increments for sounds associated with the related percussion instrument, where an unshaded box indicates that no sound is to be played at that time increment, and a shaded box indicates that a sound (associated with the timbre of the related percussion instrument) is to be played at that time increment. Thus, FIG. 14A illustrates an example where no sounds are to be played, FIG. 14B illustrates an example where the sound of a base drum are to be played at the times indicated by the shaded boxes, and FIG. 14C illustrates an example where the sounds of a base drum and a symbol are to be played at the times indicated by the shaded boxes. For each percussion instrument track, a sound associated with the particular percussion instrument may be added to the track for instrument in various ways. For example, as shown in FIG. 14B or 14C, a playback bar 1404 may be provided to visually indicate a time increment of a current playback position of a multi-track recording during live looping. Thus, in FIG. 14B, the playback bar indicates that the first beat of the third measure is currently being played. A user may then be enabled to add a sound associated with a particular percussion instrument at a particular beat by recording a sound at the time that the playback bar 1404 is over the box associated with a particular beat. In one embodiment, the instrument track to which the sound is to be associated with may be identified manually by the user selecting or clicking on the appropriate instrument. In this case, the particular nature and pitch of the sound made by the user may not be important, although it is contemplated that the volume of the sound made by the user may affect the gain of the associated sound generated for the percussion track. Alternatively, the sound made by a user may be indicative of the percussion instrument that the sound is to be associated with. For example, a user may vocalize the sounds "boom", "tsk" or "ka" to indicate a base drum, symbol, or torn drum beat, respectively. In yet another embodiment, the user may be enabled to add or remove sounds from a track simply by clicking or selecting a box in the grid 1402.

Multiple Take-Auto Composition Module

Figure 15:
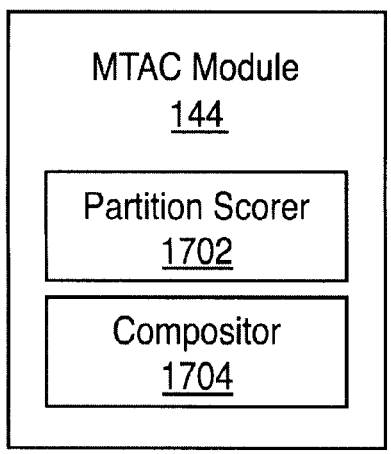
FIG. 15 is a block diagram of one embodiment of potential components of the MTAC module 144 of the system of FIG. 1.

MTAC Module 144 (FIG. 1A) is configured to operate in conjunction with audio converter 140, and optionally RSLL 142, to enable the automatic production of single, "best" take that is derived from a collection of takes. One embodiment of MTAC Module 144 is illustrated in FIG. 15. In this embodiment, MTAC Module 144 includes a Partition Scorer 1702 to score partitions from each take of recorded audio and a Compositor 1704 to assemble the single, "best" take based on the scores identified by Partition Scorer 1702.

Partition scorer 1702 may be configured to score partitions based on any one or more criteria, which may utilize one or more processes running on the processor 2902. For example, a partition may be scored based on the key of the partition relative to a key selected for the overall composition. Often, a performer may sing an off-key note without knowing it. Thus, notes within a partition may also be scored based on the difference between the key of the note and the proper key for the partition.

In many cases, however, a novice end-user may not know what music key he wants to sing in. Consequently, partition scorer 1702 may also be configured to automatically identify a key, which may be referred to as "Automatic Key Detection." With "Automatic Key Detection," partition scorer 1702 may determine the key closest to that of the end-user's recorded audio performance. The system 50 may highlight any notes that are off-key from the automatically detected key and may further automatically adjust those notes to fundamental frequencies that are in the automatically determined key signature.

Figure 16:
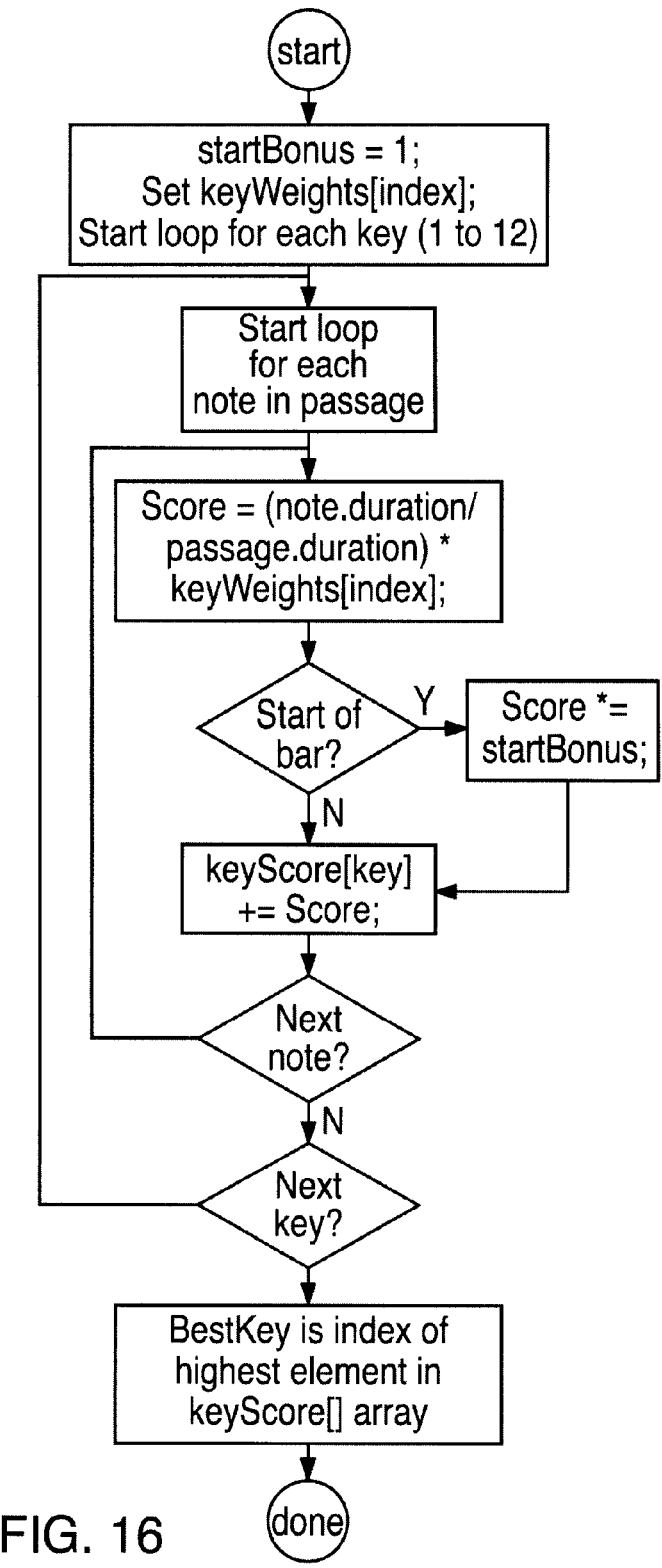
FIG. 16 is a flow diagram illustrating one potential process for determining the musical key reflected by one or more notes of audio input.

One illustrative process for determining the musical key is depicted in FIG. 16. As shown in the first block, this process scores the entire track against each of the 12 musical keys (C, C#/Db, D#/Eb, E, F, F#/Gb, G, G#/Ab, A, A#/Bb, B) with weight being given to each fundamental frequency within a key. For instance, the key weight array for some arbitrary major key may look like this [1, −1, 1, −1, 1, 1, −1, 1, −1, 1, −1, 1], which assigns a weighting to every one of the twelve notes in a scale beginning with Do and continuing with Re, etc. Assigning weights to each note (or interval from the tonic) works for any type of key. The notes that are out of the key are given a negative weight. While the magnitudes of the weights are generally less important, they can be adjusted to individual user taste or based on input from genre matcher module 152. For instance, some tones in the key are more definitive of that key, so the magnitude of their weights could be higher. Furthermore, some tones not in the key are more common than others; they can remain negative but have smaller magnitudes. So, it would be possible for a user or system 100 (based on input, for instance, from the genre matcher module 152) to develop a more refined keyWeights array for a major key that could be [1, −1, 0.5, −0.5, 0.8, 0.9, −1, 1, −0.8, 0.9, −0.2, 0.5]. Each of the 12 major keys would be associated with a weight array. As would be understood by those of ordinary skill in the art having the present specification, drawings and claims before them, minor (or any other) keys could be accommodated by selecting weights for each array that account for the tones within the key with reference to any document showing the relative position of notes within a key.

As shown in the third block of FIG. 16, the relative duration of each note to the duration of the overall passage (or partition) is multiplied by the "weight" of the note's pitch class in the key currently being analyzed for the loop to determine the score for each note in the passage. At the start of each passage, the score is zeroed out, then the scores for each note as compared against the current key are added one to another until there are no more notes in the passage and process loops back around to begin analyzing the passage with respect to the next key. The result of the main loop of the process is a single key score for each key reflecting the aggregate of all the scores for each of the notes in the passage. In the last block of the process of FIG. 16, the key with the highest score would be selected as the BestKey (i.e. most appropriate for the passage). As would be understood by those of ordinary skill in the art different keys could tie or have sufficiently similar scores so as to be essentially tied.

Figure 17:
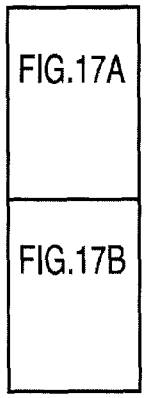
FIGS. 17, 17A, and 17B together form a flow diagram illustrating one potential process for scoring a portion of a musical track based on a chord sequence constraint.

In one embodiment, a note's pitch class in a key, represented by the value "index" in FIG. 17, may be determined using the formula:index:=(note.pitch−key+12) % 12, where note.pitch represents a numerical value associated with a specific pitch for an instrument, where the numerical values are preferably assigned in order of increasing pitch. Taking the example of a piano, which has 88 keys, each key may be associated with a numeral between 1 and 88 inclusively. For instance, key 1 may be the A0 Double Pedal A, key 88 may be the C8 eighth octave, and key 40 may be middle C.

It may be desirable to improve the accuracy of the musical key determination than that achieved with the foregoing methodologies. Where such improved accuracy is desired, the partition scorer 1702 (or alternatively the harmonizer 146 (discussed below)) may determine whether each of the top four most probable keys (determined by the initial key signature determination methodology (described above)) has one or more major or minor modes. As would be understood by those of ordinary skill in the art having the present specification before them, it is possible to determine the major or minor modes of any plurality of probable keys to achieve improvement in key signature accuracy with the understanding that the greater the number of probable keys analyzed the greater the processing requirements.

The determination whether each of the probable keys has one or more major or minor modes may be done by performing interval profiling on the notes red to the partition scorer 1702 (or to the harmonizer 146 by the lead music source 2404 in some embodiments). As shown in FIG. 16A, this interval profiling is performed using a 12×12 matrix so as to reflect every potential pitch class. Initially, the values in this matrix are set to zero. Then, for every note-to-note transition in the collection of notes, the average the duration of the two notes is added to any preexisting matrix value saved at the location defined by pitchClass first note: pitchClass second note. So, for example if the collection of notes were:

|  | Note | | | | | |
|---|---|---|---|---|---|---|
|  | E | D | C | D | E | E |
| Duration | 1 | 0.5 | 2 | 1 | 0.5 | 1 |

That would result in the matrix values depicted in FIG. 16A. Then, this matrix is used in combination with a major key interval profile and a minor key interval profile—as discussed below—to calculate a minor key sum and a major key sum. Each of the major and minor key interval profiles is a 12×12 matrix—containing every potential pitch class like the matrix of FIG. 16A—with each index of the matrix having an integer value between −2 and 2 so as to weight the value of the various pitches in each key. As would be understood by those of ordinary skill in the art, the values in the interval profiles may be set to a different set of integer values to achieve a different key profile. One potential set of values for the major key interval profile is shown in FIG. 16B, while one potential set of values for the minor key interval profile is shown in FIG. 16C.

Then, the minor and major key sums may be calculated, as follows:
1. initialize minor and major key sums to zero;
2. For every index in the note transition array, multiply the integer value by the value in its corresponding location in the Minor Key Interval Profile matrix;
3. Add each product to the running minor key sum;
4. For every index in the note transition array, multiply the stored value by its corresponding location in the Major Key Interval Profile matrix; and
5. Add the product to the running major key sum.

After completing these product-sum calculations for every index in the matrix, the values of the major and minor key sums are compared to the scores assigned to the plurality of most probable keys determined the initial key signature determination and a determination is made as to which key/mode combination is the best. After completing these product-sum calculations for every index in the matrix, the values of the major and minor key sums are multiplied by their corresponding matrix index in each of the interval profiles. Subsequently, the sum of those products constitutes the final valuation of the likelihood that the given set of notes is in the mode. So, for the example set forth in FIG. 16A, for the C major mode (FIG. 16B), we would have: (1.25*1.15)+(1.5*0.08)+(0.75*0.91)+ (0.75*0.47)+(0.75*−0.74)=1.4375+0.12+0.6825+0.3525+ (−0.555)=2.0375. Thus, for C Major, the example melody would result in a score of 2.0375.

Then, to determine the value for whether this mode is minor, however, we need to shift the minor interval profile into the relative minor. The reason for this is that the interval profile is set up to consider the tonic of the mode (not the root of the key signature) to be our first column and first row. We can understand why this is true by looking at the underlying music. Any given key signature may be either major or minor. For example, the major mode that is compatible with the key signature of C Major is the C Major mode. The minor mode that is compatible with the key signature of C Major is the A (natural) minor mode. Since the top-left numerical value in our minor interval represents the transition from C to C when considering the C minor mode, all the indices of comparison would shift by 3 steps (or, more specifically, 3 columns to the right, and 3 rows down), since the tonic/root of a minor key signature relative to the tonic/root of the major key signature is 3 semitones down. Once shifted by 3 steps, the top left numerical value in our interval profile represents the transition from A to A in the A minor mode. To run the numbers using our example of FIG. 16A (with this shifted matrix): (1.25*0.67)+(1.5*−0.08)+(0.75*0.91)+(0.75*0.67)+(0.75*1.61)=0.8375+(−0.12)+0.6825+0.5025+1.2075=3.11. Then, to compare the two mode results, we need to normalize the two interval matrices. To do that, we simply add all the matrix values together, for each matrix, and divide the sums. We find that the major matrix has roughly a 1.10 ratio of the cumulative sum, so we multiply our minor mode value by that amount to normalize the two mode results. Thus, the results from our example would be that the exemplary set of notes is most likely in the A minor mode, because 3.11*1.10=3.421, which is greater than 2.0375 (the result for the major mode).

The same process described above would apply to any key signatures as long as the initial matrix of note transitions is relative to the key being considered. So using FIG. 16A as reference, if in a different example composition the key signature being considered is F major, the initial matrix rows and columns, as well as the rows and columns of the interval profiles represented by FIG. 16B and FIG. 16C, would start with F and end with E, rather than starting with C and ending with B (as is shown in FIG. 16A).

In another embodiment where the end-user knows which musical key they wish to be in, the user may identify that key in which case, the process of FIG. 16 will be started for only the one key selected by the end-user rather than the 12 keys indicated. In this manner, each of the partitions may be judged against the single predetermined key selected by the user in the manner discussed above.

In another embodiment, a partition may also be judged against a chord constraint. A chord sequence is a musical constraint that can be employed when the user wishes to record an accompaniment. Accompaniments may be typically thought of as arpeggiations of the notes in the chord track and may also include the chords themselves. It is, of course, permissible to play notes that are out of the chord, but these must typically be judged on their musical merits.

Figure 17A:
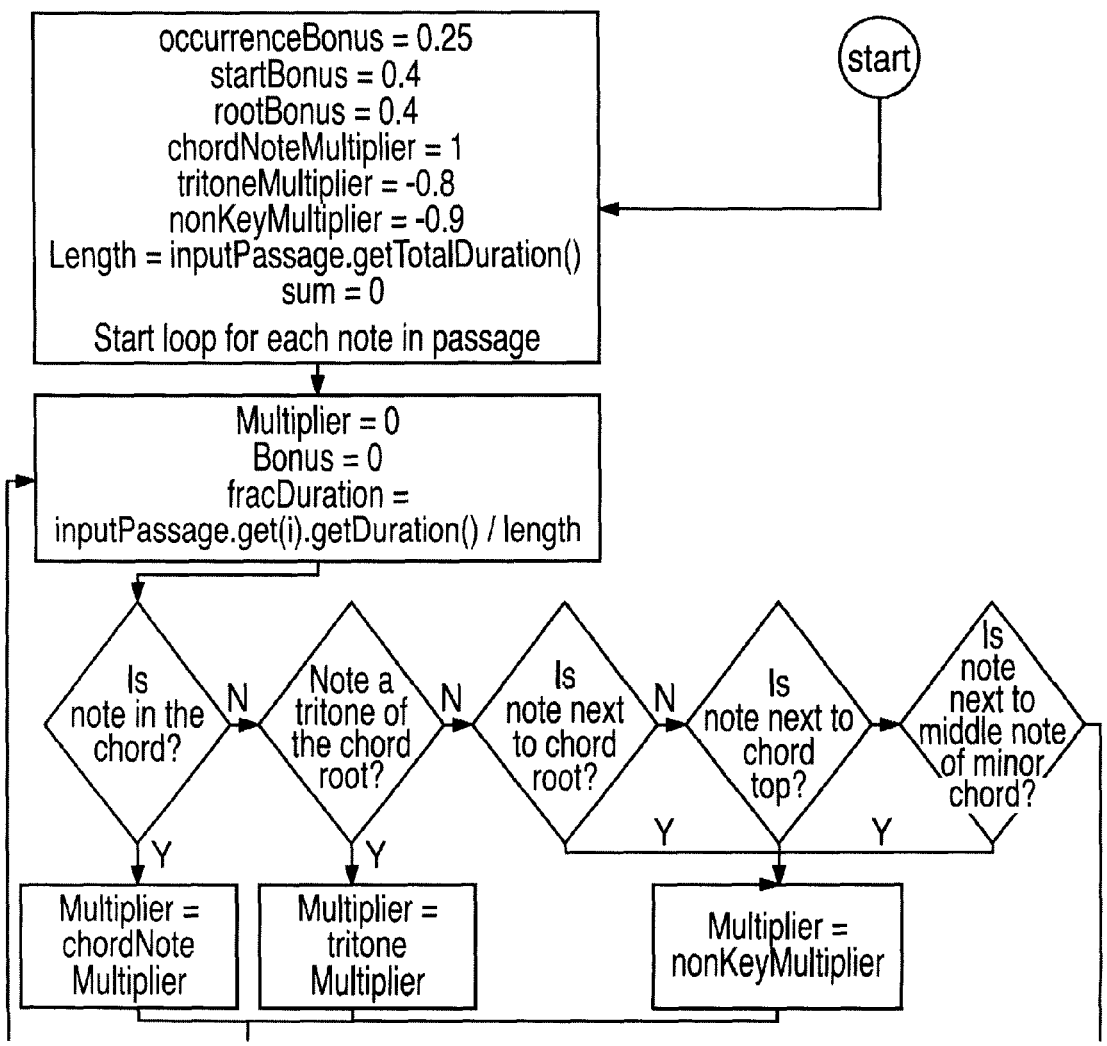
Figure 17B:
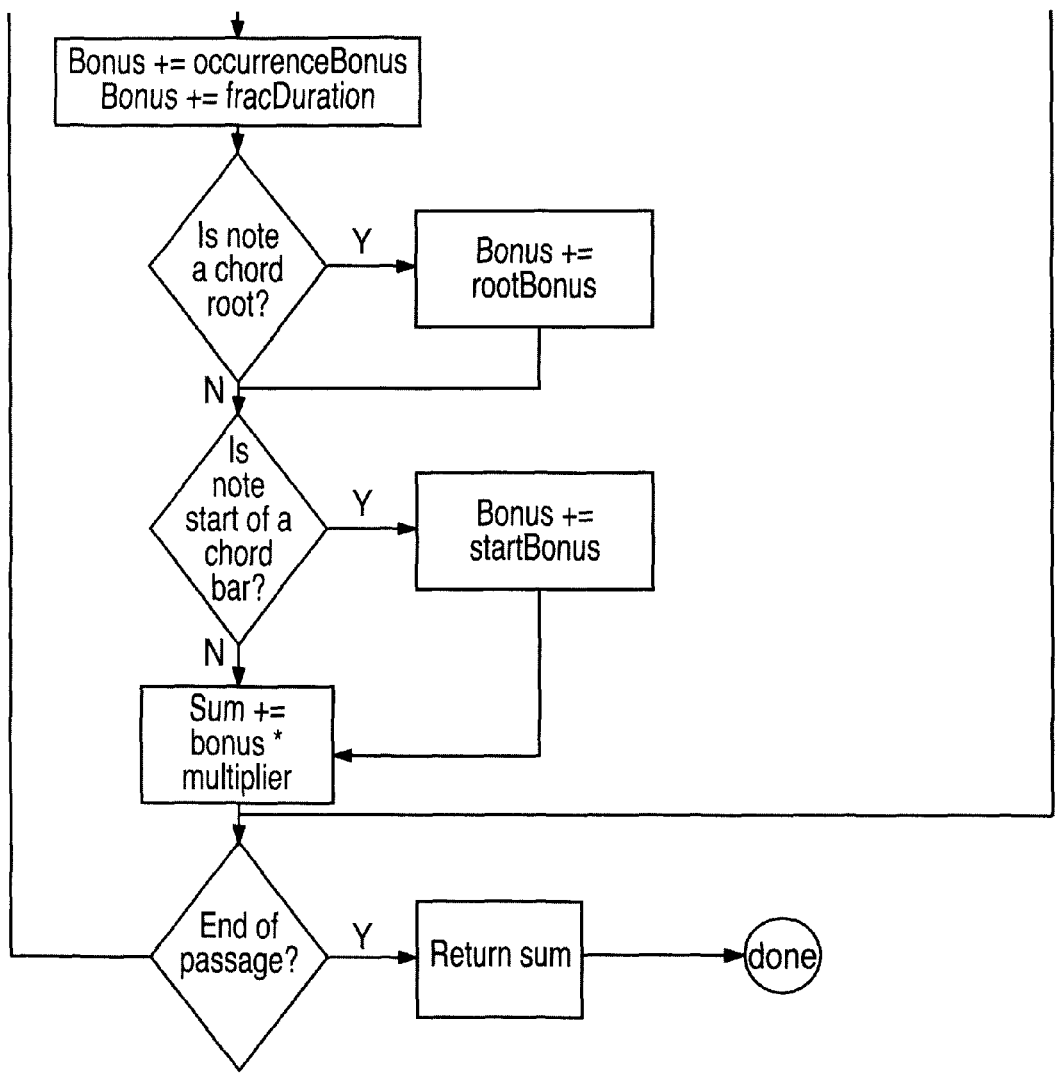

One illustrative process for scoring the quality of a partition's harmony based on a chord sequence constraint is depicted in FIGS. 17, 17A, and 17B. In the process of FIG. 17, one selected chord is scored per pass according to how well that selected chord would harmonize with a given partition (or measure) of the audio track. The chord-score for each note is the sum of a bonus and a multiplier. In the second box of process 1700, the variables are reset to zero for each note in the passage. Then, the relationship of the pitch of the note is compared to the currently selected chord, if the note is in the selected chord, the multiplier is set to the value of chordNoteMultiplier set in the first box of process 1700. If the note is a tritone (i.e. a musical interval that spans three whole tones) of the chord root (e.g. C is the chord root of a C major chord), then the multiplier is set to the value of tritoneMultiplier (which as is shown in FIG. 17A is negative, thus, indicating that the note does not harmonize well with the selected chord). If the note is one or eight semitones above the root (or four semitones above the root in the case of a minor chord), then the multiplier is set to the value of a nonKeyMultiplier (which as is shown in FIG. 17A is again negative, thus, indicating that the note does not harmonize well with the selected chord). Notes which fall into none of the foregoing categories are assigned a zero multiplier, and thus have no effect on the chord-score. As shown in FIG. 17B, the multiplier is sealed by the fraction duration of the passage which the current note occupies. Bonuses are added to the chord-score if the note is at the beginning of the passage, or if the note is the root of the current chord selected for analysis. The chord-score with respect to the passage is the accumulation of this computation for each note. Once a first selected chord is analyzed, the system 50 may analyze other selected chords (one at a time) using the process 1700 anew. The chord-score from each pass through process 1700 may be compared to one another and the highest score would determine the chord that would be selected to accompany the passage as being the best fit with that passage. As would be understood by those of ordinary skill in the art having the present specification, drawings and claims before them, two or more chords may be found to have the same score with respect to a selected passage in which case system 50 could decide between those chords on the basis of various choices, including, but not limited to the genre of the musical track. It should also be understood by those of ordinary skill in the art having the present specification, drawings and claims before them, that the scoring set forth above is to some extent a matter of design choice best upon the prevailing musical genre in Western Music. It is accordingly contemplated that the selection criteria for the multipliers could be altered for different genre of music and/or the multiplier values assigned to the various multiplier selection criteria in FIG. 17 could be changed to reflect different musical tastes without departing from the spirit of the present invention.

In another embodiment, partition scorer 1702 may also judge a partition against the collection of certain allowed pitch values, such as semitones as are typical in Western music. However, quarter tones of other musical traditions (such as those of Middle Eastern Cultures) are similarly contemplated.

Figure 19:
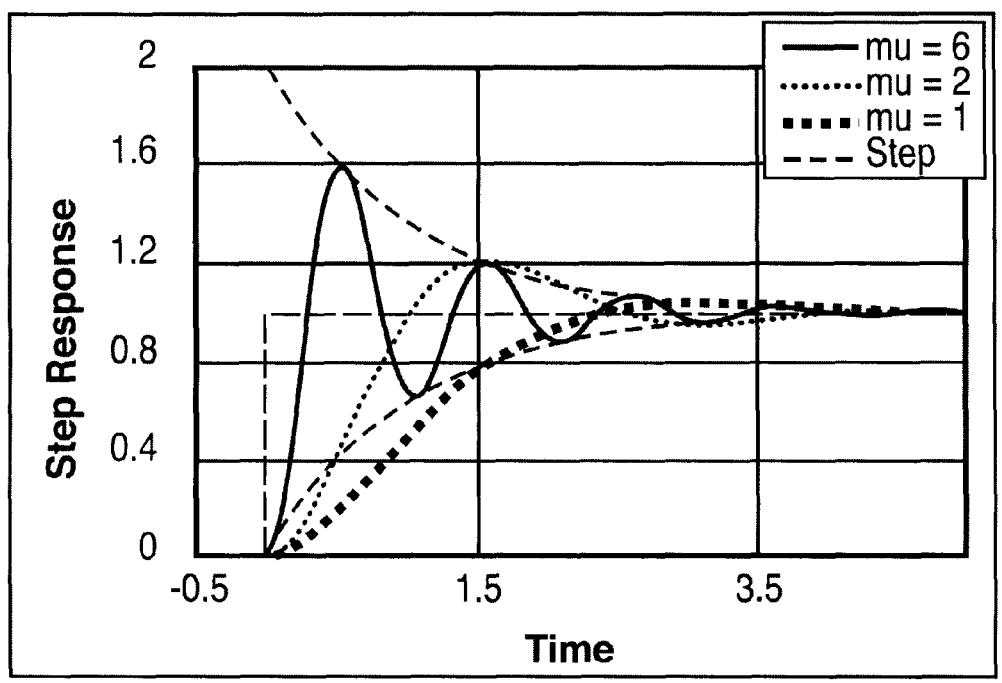
FIG. 19 illustrates step-responses of a harmonic oscillator over time having a damped response, an over-damped response, and an under-damped response.

In another embodiment, a partition may also be scored based on the quality of transitions between the various pitches within the partition. For example, as discussed above, changes in pitch may be identified using pitch impulse detection. In one embodiment, the same pitch impulse detection may also be used to identify the quality of the pitch transitions in a partition. In one approach, system may utilize the generally understood concept that damped harmonic oscillators generally satisfy the following equation:

$$\frac{d^2 x}{dt^2} + 2\zeta\omega_0 \frac{dx}{dt} + \omega_0^2 x = 0$$

where $\omega_0$ is the undamped angular frequency of the oscillator and $\zeta$ is a system dependent constant called the damping ratio. (for a mass on a spring having a spring constant k and a damping coefficient c, $\omega_0 = \sqrt{k/m}$ and $\zeta = c/2m\omega_0$.) It is understood that the value of the damping ratio $\zeta$ critically determines the behavior of the damped system (e.g. overdamped, critically damped ($\zeta=1$), or underdamped). In a critically damped system, the system returns to equilibrium as quickly as possible without oscillating. A professional singer, in general, is able to change his/her pitch with a response that is critically damped. By using pitch impulse analysis, both the true start of the pitch change event and the quality of the pitch change may be determined. In particular, the pitch change event is the deduced step function, whereas the quality of the pitch change is determined by the $\zeta$ value. For instance, FIG. 19 depicts a step-response of a damped harmonic oscillator for three values $\zeta$. In general, values of $\zeta>1$ denote poor vocal control, where the singer "hunts" for the target pitch. Thus, the larger the value of $\zeta$, the poorer the pitch-transition-score attributed to the partition.

Figure 20:
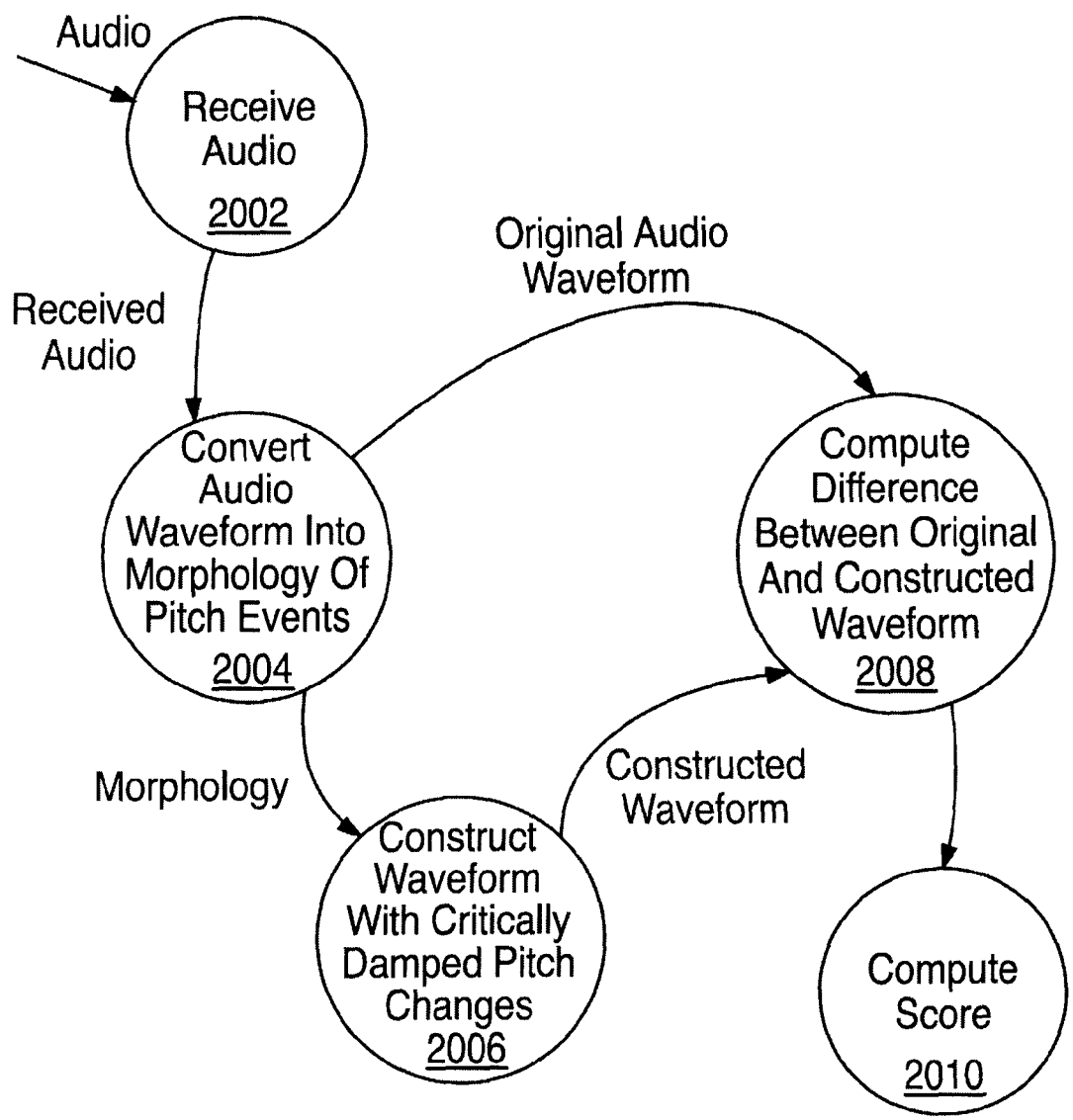
FIG. 20 illustrates a logical flow diagram showing one embodiment for scoring a portion of a musical input.

Another exemplary method for scoring the quality of pitch transition is shown in FIG. 20. In this embodiment, the scoring of a partition may comprise receiving an audio input (process 2002), converting the audio input into a morphology of pitch events showing the true oscillations between pitch changes (process 2004), using the morphology of pitch events to construct a waveform with critically damped pitch changes between each pitch event (process 2006), computing the difference between the pitch in the constructed waveform with the original audio waveform (process 2008), and computing a score based on this difference (process 2010). In one embodiment, the score may be based on the signed root mean square error between the "filtered pitch" and the "reconstructed pitch." In simple terms, this calculation can indicated to the end-user how far they deviated from the "ideal" pitch, which in turn may be turned into a pitch-transition-score.

The scoring methods described above may be utilized to score a partition against either an explicit reference or an implicit reference. An explicit reference may be an existing or pre-recorded melody track, musical key, chord sequence, or note range. The explicit case is typically used when the performer is recording in unison with another track. The explicit case could analogized to judging Karaoke in that the music reference exists and the track is being analyzed using the previous known melody as the reference. An implicit reference, on the other hand, may be a "target" melody (i.e. the system's best guess at the notes that the performer is intending to produce) computed from multiple previously recorded takes that have been saved by track recorder 202 in data storage 132. The implicit case is typically used when the user is recording the lead melody of a song during which no reference is available, such as an original composition or a song for which partition scorer 1702 has no knowledge.

Figure 18:
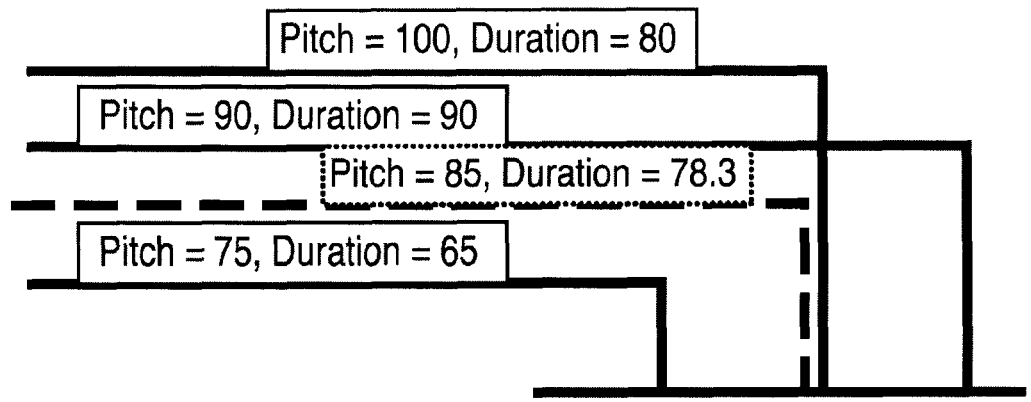
FIG. 18 illustrates one embodiment of a process for determining the centroid of a morphology.

In the case where a reference is implicit, a reference may be computed from the takes. This is typically achieved by determining the centroid of the morphologies for each of the N partitions of each previously recorded track. In one embodiment, the centroid of a set of morphologies is simply a new morphology constructed by taking the mean average pitch and duration for each event in the morphology. This is repeated for n=1 to N. The resulting centroid would then be treated as the morphology of the implicit reference track. One illustration of a centroid determined in this manner for a single note is depicted in FIG. 18, with the dotted line depicting the resulting centroid. It is contemplated that other methods may be used to compute the centroid. For instance, the modal average value of the set of morphologies for each of the takes could be used instead of the mean average. In any approach, any outlying values can be discarded before computing the average or mean. Those of ordinary skill in the art having the present specification, drawings and claims before them, would understand that additional options for determining the centroid of the takes may be developed based on the principles set forth in the specification without having to conduct undue experimentation.

As would be understood by those of ordinary skill in the art having the present specification, drawings and claims before them, any number of the foregoing independent methodologies for scoring partitions may be combined to provide an analysis of a wider set of the considerations. Each score may be given identical or different weight. If the scores are given different weights it may be based on the particular genre of the composition as determined by genre matcher module 152. For instance, in some musical genre a higher value may be placed on one aspect of a performance over another. The selection of which scoring methodologies are applied may also be determined automatically or manually selected by a user.

Figure 23:
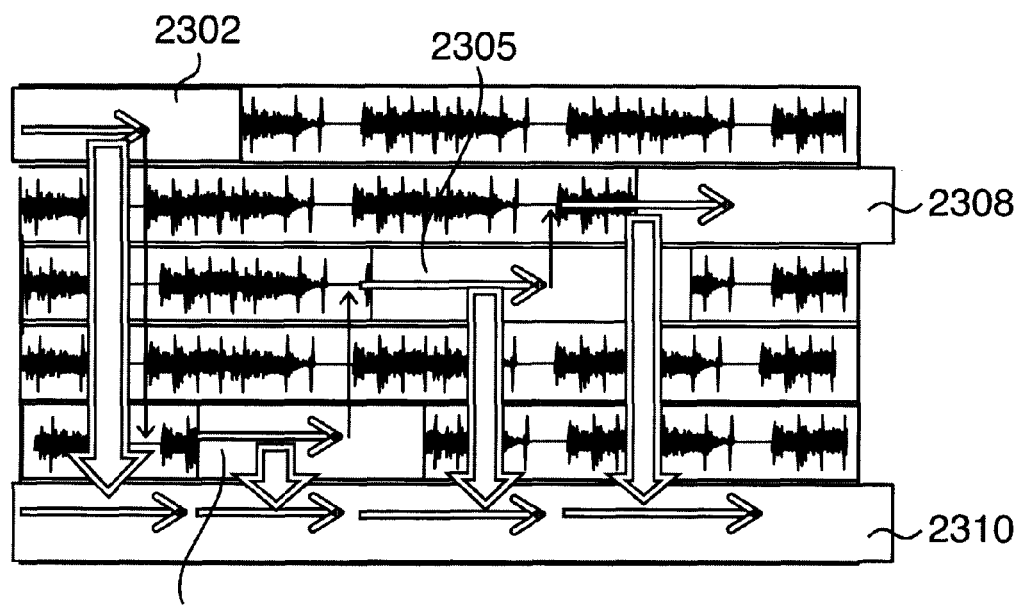
FIG. 23 illustrates one embodiment of a new track constructed from partitions of previously recorded tracks.

As illustrated in FIG. 23, partitions of musical performance may selected from any of a plurality of recorded tracks. Compositor 1704 is configured to combine partitions from the plurality of recorded tracks in order to create an ideal track. The selection could be manual through a graphical user interface where the user could view the scores identified for each version of a partition, audition each version of a partition, and choose one version as the 'best' track. Alternatively, or additionally, the combination of partitions may be performed automatically by selecting the version of each track partition with the highest scores based on the scoring concepts introduced above.

Figure 21:
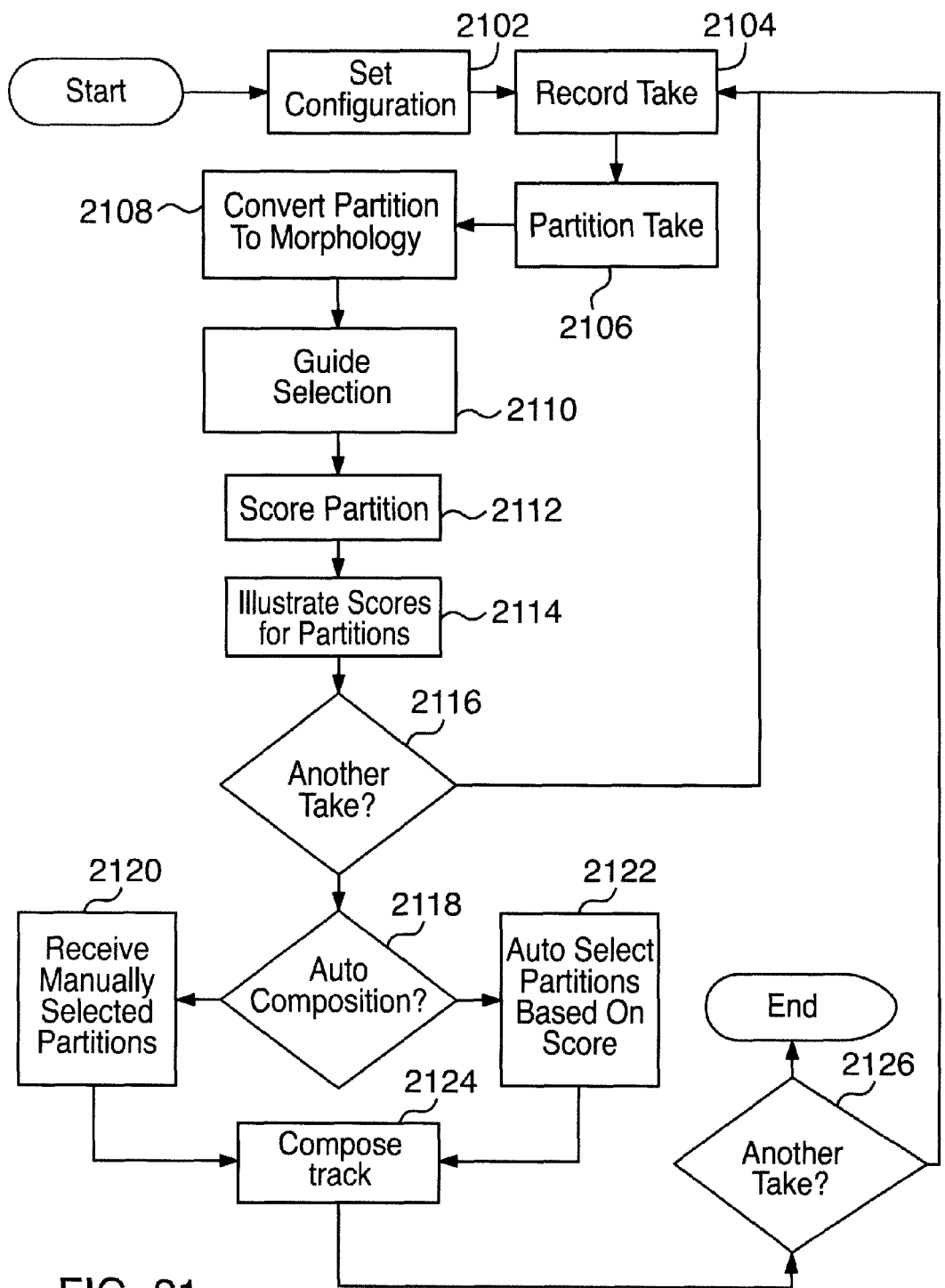
FIG. 21 illustrates a logical flow diagram for one embodiment of a process for composing a "best" track from multiple recorded tracks.

FIG. 21 illustrates on exemplary embodiment of a process for providing a single, "best" take from a collection of takes using MTAC module 144 in conjunction with Audio Converter 140. In step 2102, the user sets a configuration. For instance, the user can select whether a partition is to be scored against an explicit or an implicit reference. The user may also select one or more criteria (i.e. key, melody, chord, target, etc.) to use for scoring a partition, and/or provide rankings to identify the relevant weight or importance of each criteria. A take is then recorded in step 2104, partitioned in step 2106, and converted into a morphology in step 2108 using the process described above. If RSSL Module 142 is being employed then, as described above, at the end of the take, the track may automatically loop back to the start, allowing the user to record another take. Also, during recording the user may choose to hear a click track, a previously recorded track, a MIDI version of any single track, or a MIDI version of a "target" track computed as discussed above with respect to an explicit or an implicit reference (see FIGS. 18, 19, 20 and 21). This allows the user to listen to a reference against which he can produce the next (hopefully improved) take.

In one embodiment, the end-user may select the reference and/or one or more methods against which the recorded take(s) should be scored, step 2110. For instance, the user's configuration may indicate that the partition should be scored against a key, a melody, the chords, a target morphology constructed from the centroid of one or more tracks, or any other method discussed above. The guide selection may be made manually by the user or set automatically by the system.

Figure 22:
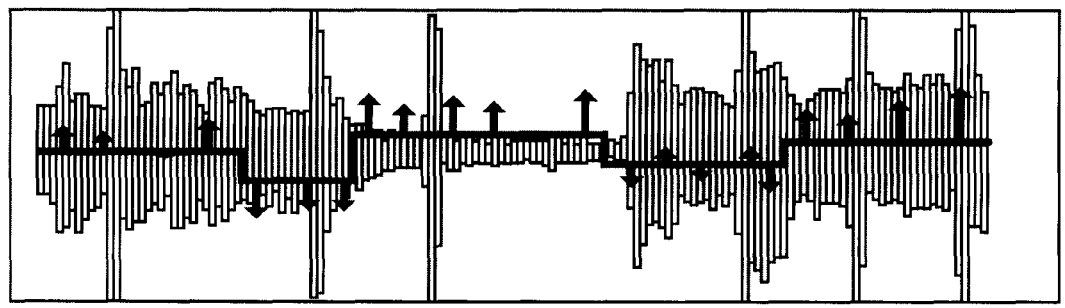
FIG. 22 illustrates one embodiment of an exemplary audio waveform and a graphical representation of a score showing the variance of the actual pitch from an ideal pitch.

The partitions of a take are scored in step 2112, and, in step 2114, an indication of the scoring for each partition in a track may be indicated to the user. This may benefit the end user by providing them with an indication of where the end user's pitch or timing is off so that the end user can improve in future takes. One illustration of a graphical display for illustrating the score of a partition is illustrated in FIG. 22. In particular, FIG. 22 the vertical bars depict an audio waveform as recorded from an audio source, the solid black, primarily horizontal, line depicts the ideal waveform the audio source was trying to mimic, and the arrows represent how the pitch of the audio source (e.g. a singer) varied from the ideal waveform (called the explicit reference).

In step 2116, the end user manually determines whether to record another take. If the user desires another take, the process returns to step 2104. Once the end user has recorded all of the multiple takes for a track, the process proceeds to step 2118.

In step 2118, the user may be provided a choice as to whether a "best" overall track is to be compiled from all of the takes manually or automatically. If the user selects to create a manual composition, the user may, in step 2120, simply audition the first partition of the first take, followed by the first partition of the second take, until each of the candidate first partitions have been auditioned. One interface that be used to facilitate the auditioning and selection between the various takes of the partitions is shown in FIG. 23 wherein the end user by use a pointing device (such as a mouse) to click on each track taken for each partition to prompt the playback of that track and then subsequently the user selects one of these candidate partitions as the best performance of that partition by, for instance, double-clicking the desired track and/or clicking-and-dragging the desired track into the bottom, final compiled track 2310. The user repeats this process for second, third and subsequent partitions, until he reaches the end of the track. The system then constructs a "best" track by splicing together the selected partitions into a single, new track in step 2124. The user may then also decide whether to record further takes in order to improve his performance in step 2126. If the user chose to compile the "best" track automatically, a new track is spliced together in step 2122 based on the scores for each partition in each take (preferably using the highest scored take for each partition).

One example of a virtual "best" track that is spliced together from partitions of actual recorded tracks is also illustrated in FIG. 23. In this example, the final compiled track 2310 includes a first partition 2302 from take 1, a second partition 2304 from track 5, a third partition 2306 from take 3 and a fourth partition 2308 taken from track 2, with no partitions being used from track 4.

Harmonizer

Harmonizer module 146 implements a process for harmonizing notes from an accompanying source with a musical key and/or chord of a lead source, which may be a vocal input, a musical instrument (real or virtual), or a pre-recorded melody that may be selectable by a user. One exemplary embodiment of this harmonizing process an accompanying source is described in conjunction with FIGS. 24 and 25. Each of these figures are illustrated as a data flow diagram (DFD). These diagrams provide a graphical representation of the "flow" of data through an information system, where data items flow from an external data source or an internal data store to an internal data store or an external data sink, via an internal process. These diagrams are not intended to provide information about the timing or ordering of processes, or about whether processes will operate in sequence or in parallel. Also, control signals and processes that convert input control flows into output control flows are generally indicated by dotted lines.

Figure 24:
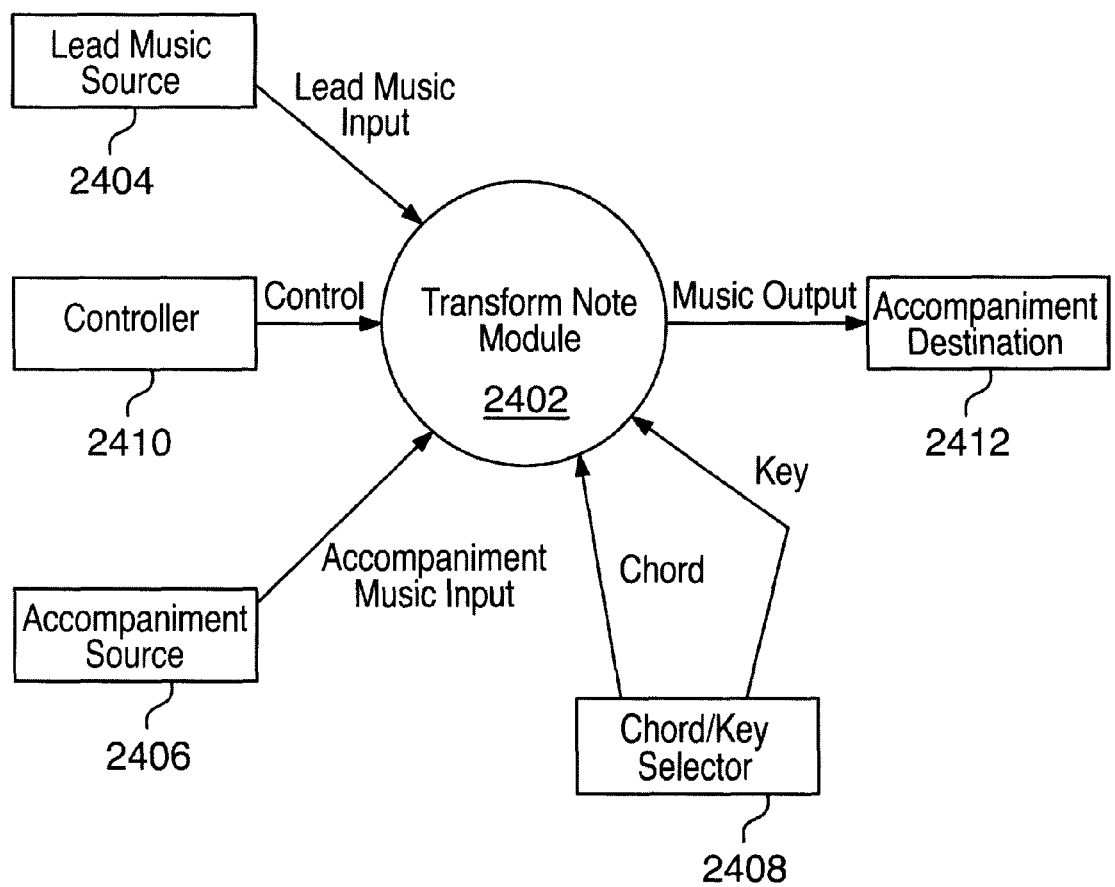
FIG. 24 illustrates a data flow diagram showing one embodiment of a process for harmonizing an accompaniment musical input with a lead musical input.

FIG. 24 depicts that the harmonizer module 146 may generally include a transform note module 2402, a lead music source 2404, an accompaniment source 2406, a chord/key selector 2408 and a controller 2410. As shown, the transform note module may receive lead music input from the lead music source 2404; and an accompaniment music input from the accompaniment source 2406. The lead and accompaniment music may each be comprised of live audio or previously stored audio. In one embodiment the harmonizer module 146 may also be configured to generate the accompaniment music input based on a melody of the lead music input.

The transform note module 2402 may also receive a musical key and/or a selected chord from the chord/key selector 2408. The control signal from controller 2410 indicates to transform note module 2402 whether the music output should be based on the lead music input, accompaniment music input and/or musical key or chord from the chord/key selector 2408 and how the transformation should be handled. For instance, as described above, the musical key and chord may be either derived from the lead melody or the accompaniment source or even from the manually selected key or chord indicated by chord/key selector 2408.

Based on the control signal, the transform note module 2402 may alternatively transform the lead music input into a note consonant with the chord or the musical key, producing a harmonious output note. In one embodiment, input notes are mapped to harmonious notes using a pre-established consonance metric. In an embodiment discussed in more detail below, the control signal may also be configured to indicate whether one or more "blue-notes" may be allowed in the accompaniment music input without transformation by the transform note module 2402.

Figure 25:
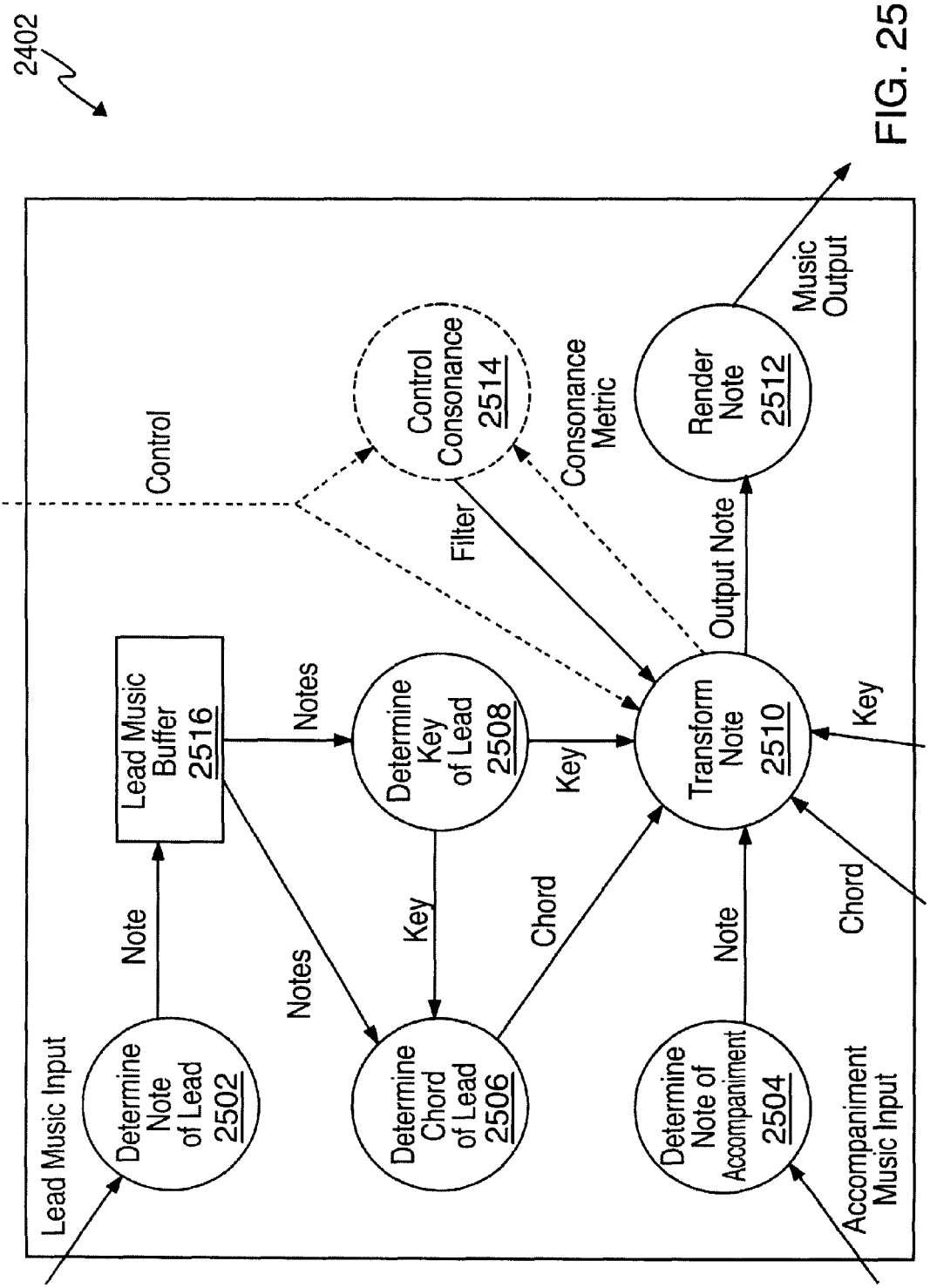
FIG. 25 illustrates a data flow diagram of the processes performed by the Transform Note Module of FIG. 24.

FIG. 25 illustrates a data flow diagram generally showing more detail of the processes that may be performed by transform note module 2402 of FIG. 24 in selecting notes to "harmonize" with the lead music source 2404. As shown, the lead musical input is received at process 2502, where a note of the lead melody is determined. In one embodiment, a note of the lead melody may be determined using one of the techniques described, such as converting the lead musical input into a morphology that identifies its onset, duration, and pitch, or any subset or combination thereof. Of course, as would be understood by those of ordinary skill in the art having the present specification, drawings and claims before them, other methods of determining a note from the lead melody may be used. For example, if the lead music input is already in MIDI format, determining a note may simply include extracting a note from the MIDI stream. As notes of the lead melody are determined, they are stored in a lead music buffer 2510. Proposed accompaniment musical input is received at process 2504 from accompaniment source 2406 (as shown in FIG. 24). Process 2504 determines a note of accompaniment and may extract the MIDI note from the MIDI stream (where available), convert the musical input into a morphology that identifies its onset, duration, and pitch, or any subset or combination thereof or use another methodology that would be understood by those of ordinary skill in the art having the present specification, drawings and claims before them.

At process 2506, a chord of the lead melody may be determined from the notes found in lead music buffer 2516. The chord of the lead melody may be determined by analyzing notes in the same manner forth in association with FIG. 17 above or by using another methodology understood by those of ordinary skill in the art (such as a chord progression analysis using a Hidden Markov Model as performed by Chord Matcher 154 described below). The Hidden Markov Model may determine the most probable sequence of chords based on the chord harmonizing algorithm discussed herein in association with a transition matrix of chord probabilities which is based on diatonic harmony theory. In this approach, the probability of a given chord correctly harmonizing a measure of the melody is multiplied by the probability of the transition from the previous chord to the current chord, and then the best path is found. The timing of the notes as well as the notes, themselves, may be analyzed (among other potential considerations, such as genre) to determine the current chord of the lead melody. Once that chord has been determined its notes are passed to transform note 2510 to await potential selection by the control signal from control consonance 2514.

At process 2508 of FIG. 25, the musical key of the lead melody may be determined. In one embodiment, the process described with reference to FIG. 16 above may be used to determine the key of the lead melody. In other embodiments, statistical techniques including the use of a Hidden Markov Model or the like may be used to determine a musical key from the notes stored in the lead music buffer. As would be understood by those of ordinary skill in the art having the present specification, drawings and claims before them, other methods of determining a musical key are similarly contemplated, including but not limited to combinations of process 1600 and the use of statistical techniques. The output of process 2508 is one of many inputs to transform note 2510.

Process 2510 (FIG. 25) "transforms" the note used as accompaniment. The transformation of the accompaniment musical note input into process 2510 is determined by the output of control consonance 2514 (discussed in some detail below). Based on the output of control consonance 2514, the transform note process 2510 may select between (a) the note input from process 2504 (which is shown in FIG. 24 as having received the accompaniment music input from the accompaniment source 2406); (b) one or more notes from the chord (which is shown in FIG. 24 as having been received from chord/key selector 2408); (c) a note from the selected musical key (the identity of the key having been received from chord/key selector 2408 (as shown in FIG. 24)); (d) one or more notes from the chord input from process 2506 (which is shown as having been based on the notes and musical key determined from the notes in the lead music buffer 2516); or (e) the musical key determined from the notes in the lead music buffer 2516 by process 2508.

At process 2512, the transformed note may be rendered by modifying the note of accompaniment musical input and modifying the timing of the note of accompaniment musical input. In one embodiment, the rendered note is played audibly. Additionally or alternatively, the transformed note may also be rendered visually.

Control consonance 2514 represents a collection of decisions that the process makes based on one or more inputs from one or more sources that control the selection of notes made by transform note process 2510. Control consonance 2514 receives a number of input control signals from controller 2410 (see FIG. 24), which may come directly from user input (perhaps from a graphical user input or preset configuration), from harmonizer module 146, genre matcher module 152 or another external process. Among the potential user inputs that may be considered by control consonance 2514 are user inputs that require the output note to be (a) constrained to the chord selected via chord/key selector 2408 (see FIG. 24); (b) constrained to the key selected via chord/key selector 2408 (see FIG. 24); (c) in harmony with the chord or key selected by 2408 (see FIG. 24); (d) constrained to the chord determined by process 2506; (e) constrained to the key determined by process 2508; (f) in harmony with the chord or key determined from the lead notes; (g) constrained within a certain range of tones (e.g. below middle C, within two octaves of middle C, etc.); and/or (h) constrained within a certain selection of tones (i.e. minor, augmented, etc.).

In one approach, control consonance 2514 may further include logic to find "bad sounding" notes (based on the selected chord progression) and snap them to the nearest chord tone. A "bad sounding" note would still be in the correct key, but it will sound bad over the chord being played. The notes are categorized into 3 different sets, relating to the chord over which they are played. The sets are defined as: "chordTones", "nonChordTones" and "badTones". All notes would still be in the correct key, but they would have varying degrees of how "bad" they sound over the chord being played; chordTones sound the best, nonChordTones sound reasonably well, and badTones sound bad. In addition, a "strictness" variable may be defined where notes are categorized based on how strictly they should adhere to the chords. These "strictness" levels may include: StrictnessLow, StrictnessMedium, and StrictnessHigh. For each "strictness" level, the three sets of chordTones, nonChordTones, and badTones vary. Further, for every "strictness" level, the three sets always relate to each other in this way: chordTones are always the tones of which the chord consists, badTones are the tones that will sound "bad" at this strictness level, and the nonChordTones are the diatonic tones left over that have not been accounted for in either set. Because the chords are variable, the badTones may be specifically categorized for each strictness level, while the other two sets may be categorized when given a specific chord. In one embodiment, the rules for identifying "bad sounding" notes is static, as follows:

StrictnessLow (badTones):
A 4th over a major chord (e.g. F over C major);
A sharp 4th over a major chord (e.g. F# over C major);
A minor 6th over a minor chord (e.g. G# over C minor);
A major 6th over a minor chords (e.g. A over C minor); and
A minor 2nd over any chord (e.g. C# over either C minor or C major).

StrictnessMedium (badTones):
A 4th over a major chord (e.g. F over C major);
A sharp 4th over a major chord (e.g. F# over C major);
A minor 6th over a minor chord (e.g. G# over C minor);
A major 6th over a minor chords (e.g. A over C minor); and
A minor 2nd over any chord (e.g. C# over either C minor or C major).
A major 7th over a major chord (e.g. B over C)

StrictnessHigh (badTones):
Any note that does not fall on the chord (is not a chordTone)

Being a "bad" note alone may not be the sole basis for correction, basic counterpoint logic based on classical melodic theory may be used to identify those notes that would sound bad in context. The rules for whether notes are snapped to a chordTone may also be defined dynamically in terms of the strictness levels described above. Each level may use the note set definitions described above at its corresponding strictness level, and may further be determined in terms of "stepTones." A stepTone is defined as any note that falls directly before a chordTone in time, and is 2 or less semitones away from the chordTone; and any note that falls directly after a chordTone in time, and is also 2 or less semitones away from the chordTone. In addition, each level may apply the following specific rules:

StrictnessLow: For StrictnessLow, stepTones are extended to 2 notes away from a chordTone, so that any note that steps to or from another note that steps to or from a chordTone is also considered a stepTone. Also, any note that is a badTone as defined by StrictnessLow is snapped to a chordTone (the nearest chordTone will always be a maximum of 2 semitones away in a diatonic framework), unless that note is a stepTone.

StrictnessMedium: For StrictnessMedium, stepTones are not extended to notes that are 2 notes away from chordTones in time, as they are in StrictnessLow. Any note that is a badTone as defined by StrictnessMedium is snapped to a chordTone. In addition, any nonChordTone that falls on the down beat of a strong beat is also snapped to a chord tone. The down beat is defined as any note that begins before the second half of any beat, or any note that endures over the entire first half of any beat. The strong beat may be defined as follows:

For meters that have a number of beats that is divisible evenly by three (3/4, 6/8, 9/4), every third beat after the first beat, as well as the first beat, is a strong beat (in 9/4, 1, 4, and 7).

For meters that are not divisible evenly by three, and are divisible evenly by 2, the strong beat is the first beat, as well as every 2nd beat after that (in 4/4: 1 and 3; in 10/4: 1, 3, 5, 7, 9).

For meters that are not divisible evenly by 2 or three, and also don't have 5 beats (5 is a special case), the first beat, as well as every 2nd beat thereafter EXCEPT the 2nd to last beat is considered a strong beat (in 7/4: 1, 3, 5).

If the meter has 5 beats per bar, strong beats are considered to be 1 and 4.

StrictnessHigh: Any note that is defined as a badTone by StrictnessHigh is snapped to a chordTone. However, if a note is snapped to a chordTone, it will not be snapped to the 3rd of the chord. For example, if D is snapped over the chord C, the note may be snapped to C (the root) instead of E (the third).

Another input to control consonance 2514 is the consonance metric, which is essentially a feedback path from the transform note process 2510. First, "consonance" is generally defined as sounds that make for pleasant harmony with respect to some base sound. Consonance can also be thought of as the opposite of dissonance (which includes any sounds used freely even if they are inharmonious). So, if an end user has caused control signals to be fed into control consonance 2514 via controller 2410 that constrained the output note from transform note process 2510 to the chord or key manually selected via chord/key selector 2408, then it is possible that one or more of the output notes were inharmonious to the lead music buffer 2516. An indication that the output note was inharmonious (i.e. the consonance metric) will be ultimately fed back to control consonance 2514. While, control consonance 2514 is designed to force the output note track generated by transform note 2510 back into consonance with the lead music due to inherent latencies in feedback and programming systems, a number of inharmonious notes are expected to be allowed through into the music output. In fact, allowing at least some inharmonious notes and even inharmonious rifts in the music produced by the system should facilitate the system 50 making a less mechanical sounding form of musical composition, something desired by the inventors.

In one embodiment, another control signal that may also be input into control consonance 2514 indicates whether one or more "blue-notes" may be allowed in the music output. As noted above, the term "blue note" for purposes of this specification is given a broader meaning than its ordinary use in blues music as a note that is not in a correct musical key or chord, but which is allowed to be played without transformation. In addition to the harnessing the latencies of the system to provide some minimal insertion of "blue notes," one or more blues accumulators (preferably software coded rather than hard wired) may be used to provide some additional leeway for blue-notes. So, for example, one accumulator can be used to limit the number of blue-notes within a single partition, another accumulator can be used to limit the number of blue-notes in adjacent partitions, still another accumulator can be used to limit the number of blue-notes per some predetermined time interval or total number of notes. In other words, control consonance via the consonance metric may be counting any one or more of the following: elapsing time, the number of blue-notes in the music output, the number of total notes in the music output, the number of blue-notes per partition, etc. Pre-determined, automatically determined, and real-time determined/adjusted ceilings can be programmed in real-time or as preset/predetermined values. These values may also be affected by the genre of the current composition.

In one embodiment, the system 100 may also include a super keyboard for providing an accompaniment music source. The super keyboard may be a physical hardware device, or a graphical representation that is generated and displayed by a computing device. In either embodiment, super keyboard may be thought of as the manual input for chord/key selector 2408 of FIG. 24. The super keyboard preferably includes at least one row of input keys on a keyboard that dynamically maps to notes that are in musical key and/or that are in chord (that is, part of the chord) with respect to the existing melody. A super keyboard may also include a row of input keys that are inharmonious to the existing melody. However, inharmonious input keys pressed on the super keyboard may then be dynamically mapped to notes that are in the musical key of the existing melody, or to notes that are chord notes for the existing melody.

One embodiment of a super keyboard in accordance with the present invention is illustrated in FIG. 26. The embodiment illustrated in FIG. 26 is shown with respect to the notes for a standard piano, although it would be understood that the super keyboard may be used for any instrument. In embodiment shown in FIG. 26, the top row 2602 of input keys of a super keyboard maps onto standard piano notes; the middle row 2604 maps onto notes that are in a musical key for the existing melody; and the bottom row 2606 maps onto notes that are within the current chord. More particularly, the top row exposes 12 notes per octave as in a regular piano, the middle row exposes eight notes per octave, and the bottom row exposes three notes per octave. In one embodiment, the color of each input key in the middle row may depend on the current musical key of the melody. As such, when the musical key of the melody changes, the input keys that were chosen to be displayed in the middle row also change. In one embodiment, if an inharmonious musical note is entered by the user from the top row, the super keyboard may also be configure to automatically play a harmonious note instead. In this way, the player can accompany lead music in an increasingly constrained manner the lower the row he chooses. However, other arrangements are also envisioned.

FIG. 27A illustrates one embodiment of a chord selector in accordance with the present invention. In this embodiment, the chord selector may comprise a graphical user interface of a chord wheel 2700. The chord wheel 2700 depicts chords that are in musical key with respect to the existing melody. In one embodiment, the chord wheel 2700 displays chords derived from the currently selected musical key. In one embodiment, the currently selected musical key is determined by the melody, as discussed above. Additionally or alternatively, the outermost concentric circle of the chord wheel provides a mechanism to select a musical key. In one embodiment, a user may input a chord via chord/key selector 2408, by selecting a chord from the chord wheel 2700.

In one embodiment, the chord wheel 2700 depicts seven chords related to the currently selected musical key—three major chords, three minor chords, and one diminished chord. In this embodiment, the diminished chord is located at the center of the chord wheel; the three minor chords surround the diminished chord; and the three major chords surround the three minor chords. In one embodiment, a player is enabled to select a musical key using the outermost concentric circle, wherein each of the seven chords depicted by the chord wheel are determined by the selected musical key.

FIG. 27B illustrates another potential embodiment of a chord selector in accordance with the present invention at a particular instant during operation of system 50. In this embodiment, the chord selector may comprise a chord flower 2750. Like chord wheel 2700, chord flower 2750 depicts at least a sub-set of the chords that fall musically within the current musical key of the current audio track. And Chord flower 2750 also indicates the chord currently being played. In the example illustrated in FIG. 27B, the key is C major (as can be determined from the identity of the major and minor chords included on the flower petals and in the center) and the currently played chord is indicated by the chord depicted in the center, which in the illustrated time of playback is C major. The chord flower 2750 is arranged to provide visual cues as to the probability of any depicted chord following immediately after the currently played chord. As depicted in FIG. 27B, the most likely chord progression would be from the currently playing C major to G major, the next most likely progression would be to F major, followed in likelihood by A minor. In this sense, the likelihood that any chord will follow another is not a rigorous probability in the mathematical sense but rather a general concept of the frequency of a certain chord progressions in particular genres of music. As would be understood by those of ordinary skill in the art having the present specification, drawings and claims before them, when the lead track results in the calculation of a different chord, then chord flower 2750 will change. For example, lets say that the next partition of the lead musical track is actually determined to correspond to B-flat major, then the center of the flower would show an upper-case B with a flat symbol. In turn, the other chord found in the key of C major will "rotate" about the B-flat into an arrangement that indicates the relatively likelihood that any particular chord is the next in the progression.

Track Sharer Module

Returning to the diagram of system 100 in FIG. 1A, track sharer module 148 may enable transmission and receipt of tracks or multi-track recordings for system 100. In one embodiment, such tracks may be transferred or received from a remote device or server. The track sharer module 148 may also perform administrative operations related to the sharing of tracks, such as enabling account login and exchange of payment and billing information.

Sound Searcher Module

Sound searcher module 150, also shown in FIG. 1A, may implement operations related to finding a previously recorded track or multi-track recording. For example, based on an audible input, the Sound Searcher Module 150 may search for similar tracks and/or multi-track recordings that were previously recorded. This search may be performed on a particular device 50 or on other, networked devices or servers. The results of this search may then be presented via the device and a track or multi-track recording may be subsequently accessed, purchased, or otherwise acquired for use on device 50 or otherwise within the system 100.

Genre Matcher Module

Genre Matcher Module 152, also shown in FIG. 1A, is configured to identify chord sequences and beat profiles that are common to a genre of music. That is, a user may input or select a particular genre or an exemplary band that has an associated genre to Genre Matcher Module 152. The processing for each recorded track may then be preformed by applying one or more traits of the indicated genre with each generated audio track. For example, if a user indicate "jazz" as the desired genre, the quantization of a recorded audible input may be applied such that the timing of beats may tend to be syncopated. Also, the resulting chords generated from the audible input may comprise be one or more chords that are that are traditionally associated with jazz music. Furthermore, the number of "blue notes" may be higher than would be allowed in lets say a classical piece.

Chord Matcher Module

Chord Matcher 154 provides pitch and chord related services. For example, Chord Matcher 154 may perform intelligent pitch correction of a monophonic track. Such a track may be derived from an audible input and pitch correction may include modifying a frequency of the input to align the pitch of the audible input with a particular, predetermined frequency. The Chord Matcher 154 may also build and refine an accompaniment to an existing melody included in a previously recorded multi-track recording.

In one embodiment, Chord Matcher 154 may also be configured to dynamically identify the probability of appropriate future chords for an audio track based on the previously played chords, in particular, Chord Matcher 142 may, in one embodiment, include a database of music. Using a Hidden Markov Model in conjunction with this database, the probabilities for a future progression of chords may then be determined based on the previous chords occurring in the audio track.

Network Environment

Figure 28:
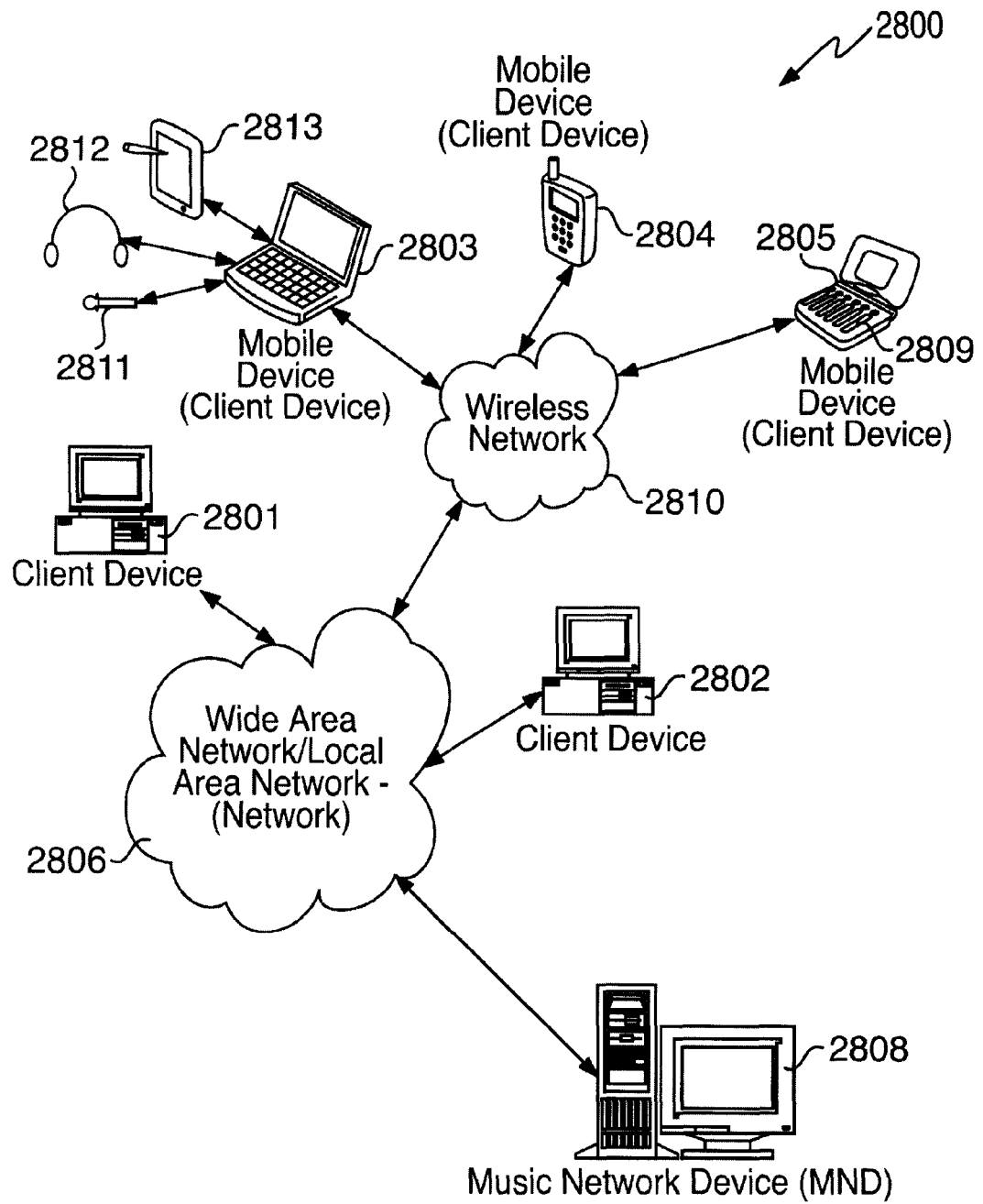
FIG. 28 illustrates one exemplary embodiment of a network configuration in which the present invention may be practiced.

As discussed above, device 50 may be any device capable of performing the processes described above, and need not be networked to any other devices. Nevertheless, FIG. 28 shows components of one potential embodiment of a network environment in which the invention may be practiced. Not all the components may be required to practice the invention, and variations in the arrangement and type of the components may be made without departing from the spirit or scope of the invention.

As shown, system 2800 of FIG. 28 includes local area networks ("LANs")/wide area networks ("WANs")-(network) 2806, wireless network 2810, client devices 2801-2805, Music Network Device (MND) 2808, and peripheral input/output (I/O) devices 2811-2813. Any one or more of client devices 2801-2805 may be comprised of a device 100 as described above. Of course, while several examples of client devices are illustrated, it should be understood that, in the context of the network disclosed in FIG. 28, client devices 2801-2805 may include virtually any computing device capable of processing audio signals and sending audio-related data over a network, such as network 2806, wireless network 2810, or the like. Client devices 2803-2805 may also include devices that are configured to be portable. Thus, client devices 2803-2805 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, client devices 2803-2805 typically range widely in terms of capabilities and features. For example, a cell phone may have a numeric keypad and a few lines of monochrome LCD display on which only text may be displayed. In another example, a web-enabled mobile device may have a multi-touch sensitive screen, a stylus, and several lines of color LCD display in which both text and graphics may be displayed.

Client devices 2801-2805 may also include virtually any computing device capable of communicating over a network to send and receive information, including track information and social networking information, performing audibly generated track search queries, or the like. The set of such devices may include devices that typically connect using a wired or wireless communications medium such as personal computers, multiprocessor systems, microprocessor-based or programmable consumer electronics, network PCs, or the like. In one embodiment, at least some of client devices 2803-2805 may operate over wired and/or wireless network.

A web-enabled client device may also include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send various content. In one embodiment, a user of the client device may employ the browser application to interact with a messaging client, such as a text messaging client, an email client, or the like, to send and/or receive messages.

Client devices 2801-2805 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, client devices 3001-3005 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a network packet, or the like, sent to MND 108, or other computing devices.

Client devices 2801-2805 may further be configured to include a client application that enables the end-user to log into a user account that may be managed by another computing device, such as MND 2808, or the like. Such a user account, for example, may be configured to enable the end-user to participate in one or more social networking activities, such as submit a track or a multi-track recording, search for tracks or recordings similar to an audible input, download a track or recording, and participate in an online music community, particularly one centered around the sharing, review, and discussion of produced tracks and multi-track recordings. However, participation in various networking activities may also be performed without logging into the user account.

In one embodiment, a musical input comprising the melody may be received by client devices 2801-2805 over network 2806 or 2810 from MND 3008, or from any other processor-based device capable of transmitting such a musical input. The musical input containing the melody may be pre-recorded or captured live by MND 2808 or other such processor-based device. Additionally or alternatively, the melody may be captured in real-time by client devices 2801-2805. For example, a melody generating device may generate a melody, and a microphone in communication with one of client devices 2801-2805 may capture the generated melody.

If the music input is captured live, the system typically seeks at least one bar of music before the musical key and chords of the melody are calculated. This is analogous to musicians playing in a band, where an accompanying musician may typically listen to at least one bar of a melody to determine the musical key and chords being played before contributing any additional music.

In one embodiment, the musician may interact with client devices 2801-2805 in order to accompany a melody, treating a client device as a virtual instrument. Additionally or alternatively, the musician accompanying the melody may sing and/or play a musical instrument, such as user played instrument, to accompany a melody.

Wireless network 2810 is configured to couple client devices 2803-2805 and its components with network 2806. Wireless network 2810 may include any of a variety of wireless sub-networks that may further overlay stand-alone ad-hoc networks, and the like, to provide an infrastructure-oriented connection for client devices 2803-2805. Such sub-networks may include mesh networks, Wireless LAN (WLAN) networks, cellular networks, and the like. Wireless network 2810 may further include an autonomous system of terminals, gateways, routers, and the like connected by wireless radio links, and the like. These connectors may be configured to move freely and randomly and organize themselves arbitrarily, such that the topology of wireless network 2810 may change rapidly.

Wireless network 2810 may further employ a plurality of access technologies including 2nd (2G), 3rd (3G), 4th (4G) generation radio access for cellular systems, WLAN, Wireless Router (WR) mesh, and the like. Access technologies such as 2G, 3G, 4G and future access networks may enable wide area coverage for mobile devices, such as client devices 2803-2805 with various degrees of mobility. For example, wireless network 2810 may enable a radio connection through a radio network access such as Global System for Mobil communication (GSM), General Packet Radio Services (GPRS), Enhanced. Data GSM Environment (EDGE), Wideband Code Division Multiple Access (WCDMA), and the like. In essence, wireless network 2810 may include virtually any wireless communication mechanism by which information may travel between client devices 2803-2805 and another computing device, network, and the like.

Network 2806 is configured to couple network devices with other computing devices, including, MND 2808, client devices 2801-2802, and through wireless network 2810 to client devices 2803-2805. Network 2806 is enabled to employ any form of computer readable media for communicating information from one electronic device to another. Also, network 106 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 2806 includes any communication method by which information may travel between computing devices.

In one embodiment, client devices 2801-2805 may directly communicate, for example, using a peer to peer configuration.

Additionally, communication media typically embodies computer-readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

Various peripherals, including I/O devices 2811-2813 may be attached to client devices 2801-2805. Multi-touch, pressure pad 2813 may receive physical inputs from a user and be distributed as a USB peripheral, although not limited to USB, and other interface protocols may also be used, including but not limited to ZIGBEE, BLUETOOTH, or the like. Data transported over an external and the interface protocol of pressure pad 2813 may include, for example, MIDI formatted data, though data of other formats may be conveyed over this connection as well. A similar pressure pad 2809 may alternately be bodily integrated with a client device, such as mobile device 2805. A headset 2812 may be attached to an audio port or other wired or wireless I/O interface of a client device, providing an exemplary arrangement for a user to listen to looped playback of a recorded track, along with other audible outputs of the system. Microphone 2811 may be attached to a client device 2801-2805 via an audio input port or other connection as well. Alternately, or in addition to headset 2812 and microphone 2811, one or more other speakers and/or microphones may be integrated into one or more of the client devices 2801-2805 or other peripheral devices 2811-2813. Also, an external device may be connected to pressure pad 2813 and/or client devices 101-105 to provide an external source of sound samples, waveforms, signals, or other musical inputs that can be reproduced by external control. Such an external device may be a MIDI device to which a client device 2803 and/or pressure pad 2813 may route MIDI events or other data in order to trigger the playback of audio from external device 2814. However, formats other than MIDI may be employed by such an external device.

Figure 30:
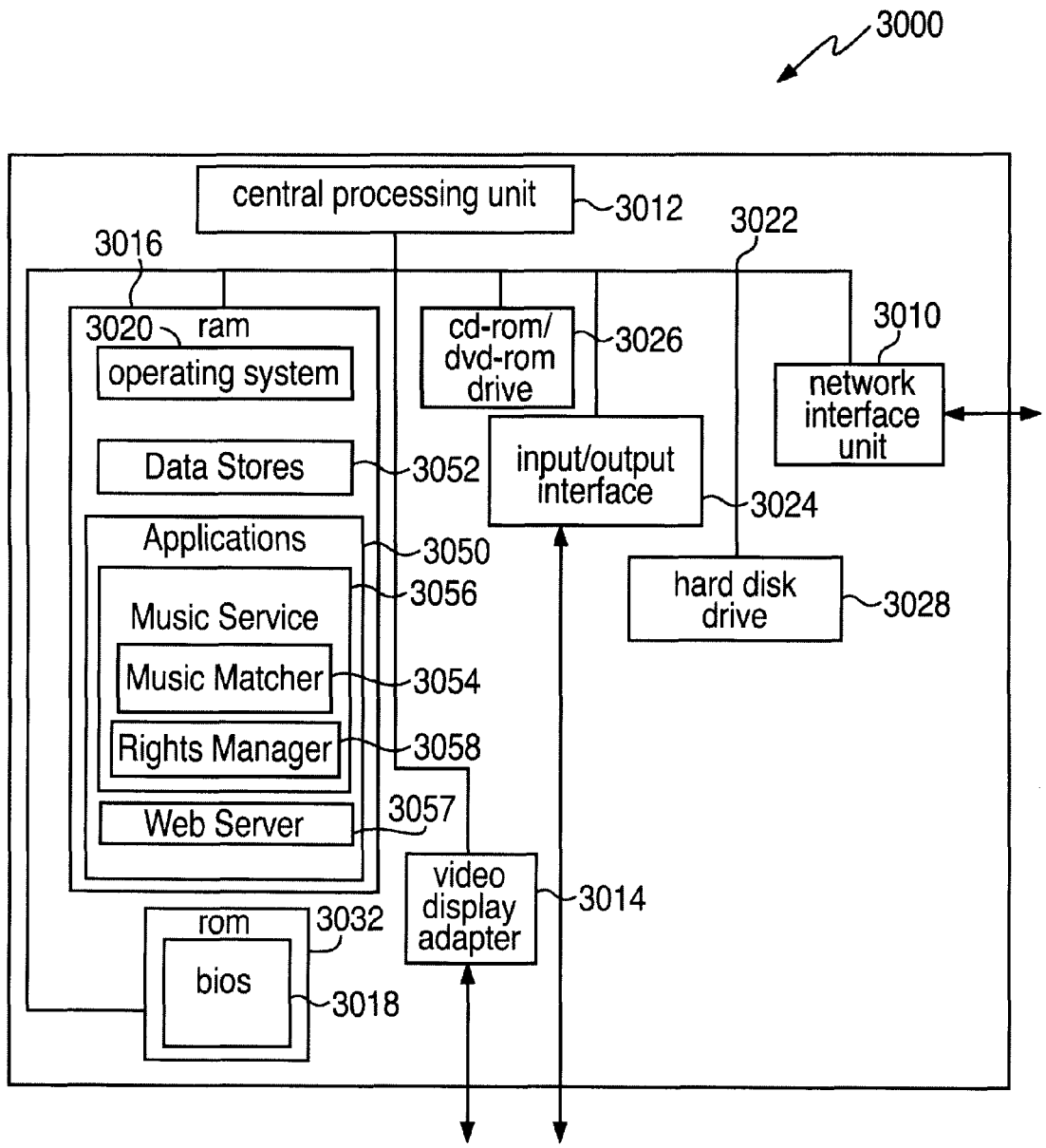
FIG. 30 illustrates one embodiment of a music network device.

FIG. 30 shows one embodiment of a network device 3000, according to one embodiment. Network device 3000 may include many more or less components than those shown. The components shown, however, are sufficient to disclose an illustrative embodiment for practicing the invention. Network device 3000 may represent, for example, MND 2808 of FIG. 28. Briefly, network device 3000 may include any computing device capable of connecting to network 2806 to enable a user to send and receive tracks and track information between different accounts. In one embodiment, such track distribution, or sharing, is also performed between different client devices, which may be managed by different users, system administrators, business entities, or the like. Additionally or alternatively, network device 3000 may enable sharing a tune, including melody and harmony, produced with client devices 2801-2805. In one embodiment, such melody or tune distribution, or sharing, is also performed between different client devices, which may be managed by different users, system administrators, business entities, or the like. In one embodiment, network device 3000 also operates to automatically provide a similar "best" musical key and/or chord for a melody from a collection of musical keys and/or chords.

Devices that may operate as network device 3000 include various network devices, including, but not limited to personal computers, desktop computers, multiprocessor systems, microprocessor-based or programmable consumer electronics, network PCs, servers, network appliances, and the like. As shown in FIG. 30, network device 3000 includes processing unit 3012, video display adapter 3014, and a mass memory, all in communication with each other via bus 3022. The mass memory generally includes RAM 3016, ROM 3032, and one or more permanent mass storage devices, such as hard disk drive 3028, tape drive, optical drive, and/or floppy disk drive. The mass memory stores operating system 3020 for controlling the operation of network device 3000. Any general-purpose operating system may be employed. Basic input/output system ("BIOS") 3018 is also provided for controlling the low-level operation of network device 3000. As illustrated in FIG. 30, network device 3000 also can communicate with the Internet, or some other communications network, via network interface unit 3010, which is constructed for use with various communication protocols including the TCP/IP protocol. Network interface unit 3010 is sometimes known as a transceiver, transceiving device, or network interface card (NIC).

The mass memory as described above illustrates another type of computer-readable media, namely computer-readable storage media. Computer-readable storage media may include volatile, nonvolatile, removable, and non-removable media implemented in any method or technology for storage of information, such as computer readable instructions, data structures, program modules, or other data. Examples of computer readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

As shown, data stores 3052 may include a database, text, spreadsheet, folder, file, or the like, that may be configured to maintain and store user account identifiers, email addresses, IM addresses, and/or other network addresses; group identifier information; tracks or multi-track recordings associated with each user account; rules for sharing tracks and/or recordings; billing information; or the like. In one embodiment, at least some of data store 3052 might also be stored on another component of network device 3000, including, but not limited to cd-rom/dvd-rom 3026, hard disk drive 3028, or the like.

The mass memory also stores program code and data. One or more applications 3050 are loaded into mass memory and run on operating system 3020. Examples of application programs may include transcoders, schedulers, calendars, database programs, word processing programs, HTTP programs, customizable user interface programs, IPSec applications, encryption programs, security programs, SMS message servers, IM message servers, email servers, account managers, and so forth. Web server 3057 and Music Service 3056 may also be included as application programs within applications 3050.

Web server 3057 represent any of a variety of services that are configured to provide content, including messages, over a network to another computing device. Thus, web server 3057 includes for example, a web server, a File Transfer Protocol (FTP) server, a database server, a content server, or the like. Web server 3057 may provide the content including messages over the network using any of a variety of formats, including, but not limited to WAP, HDML, WML, SMGL, HTML, XML, cHTML, xHTML, or the like. In one embodiment, web server 3057 may be configured to enable a user to access and manage user accounts and shared tracks and multi-track recordings.

Music Service 3056 may provide various functions related to enabling an online music community and may further include a Music Matcher 3054 a Rights Manager 3058, and melody data. The Music Matcher 3054 may match similar tracks and multi-track recordings, including those stored in data stores 3052. In one embodiment, such matching may be requested by Sound Searcher or MTAC on a client device which may, for example, provide an audible input, track, or multi-track to be matched. Rights Manager 3058 enables a user associated with an account to upload tracks and multi-track recordings. Such tracks and multi-track recordings may be stored in one or more data stores 3052. The Rights Manager 3058 may further enable a user to provide controls for the distribution of provided tracks and multi-track recordings, such as restrictions based on a relationship or membership in the online music community, a payment, or an intended use of a track or multi-track recording. Using Rights Manager 3058, a user may also restrict all access rights to a stored track or multi-track recording, thereby enabling an unfinished recording or other work-in-progress to be stored without community review before the user believes it to be ready.

Music Service 3056 may also host or otherwise enable single or multiplayer games to be played by and among various members of the online music community. For example, a multi-user role playing game hosted by Music Service 3056 may be set in the music recording industry. Users may select a role for their character that is typical of the industry. A game user may then progress their character through the creation of music using their client device 50 and, for example, RSLL 142, and MTAC 144.

Messaging server 3056 may include virtually any computing component or components configured and arranged to forward messages from message user agents, and/or other message servers, or to deliver messages. Thus, messaging server 3056 may include a message transfer manager to communicate a message employing any of a variety of messaging protocols, including, but not limited, to SMS messages, IM, MMS, IRC, RSS feeds, mIRC, any of a variety of text messaging protocols, or any of a variety of other message types. In one embodiment, messaging server 3056 may enable users to initiate and/or otherwise conduct chat sessions, VOIP sessions, text messaging sessions, or the like.

It is noted that while network device 3000 is illustrated as a single network device, the invention is not so limited. For example, in another embodiment, a music service, or the like, of network device 3000 may reside in one network device, while an associated data store might reside in another network device. In still another embodiment, various music and/or message forwarding components might reside in one or more client devices, operate in a peer-to-peer configuration, or the like.

Gaming Environment

To further facilitate the creation and composition of music, FIGS. 31-37 illustrate an embodiment in which a gaming interface is provided as the user interface to the music compilation tools described above. In this manner, it is believed that the user interface will be less intimidating, more user-friendly so as to minimize any interference with an end user's creative musical process. As will be apparent from the following discussion, the gaming interface provides visual cues and indicia that are associated with one or more functional aspects described above in order to simplify, streamline, and incentivise the music compilation process. This enables end users (also referred to with respect to this embodiment as "players") to utilize professional quality tools to create professional quality music without requiring those users to have any expertise in music theory or the operation of music creation tools.

Figure 31:
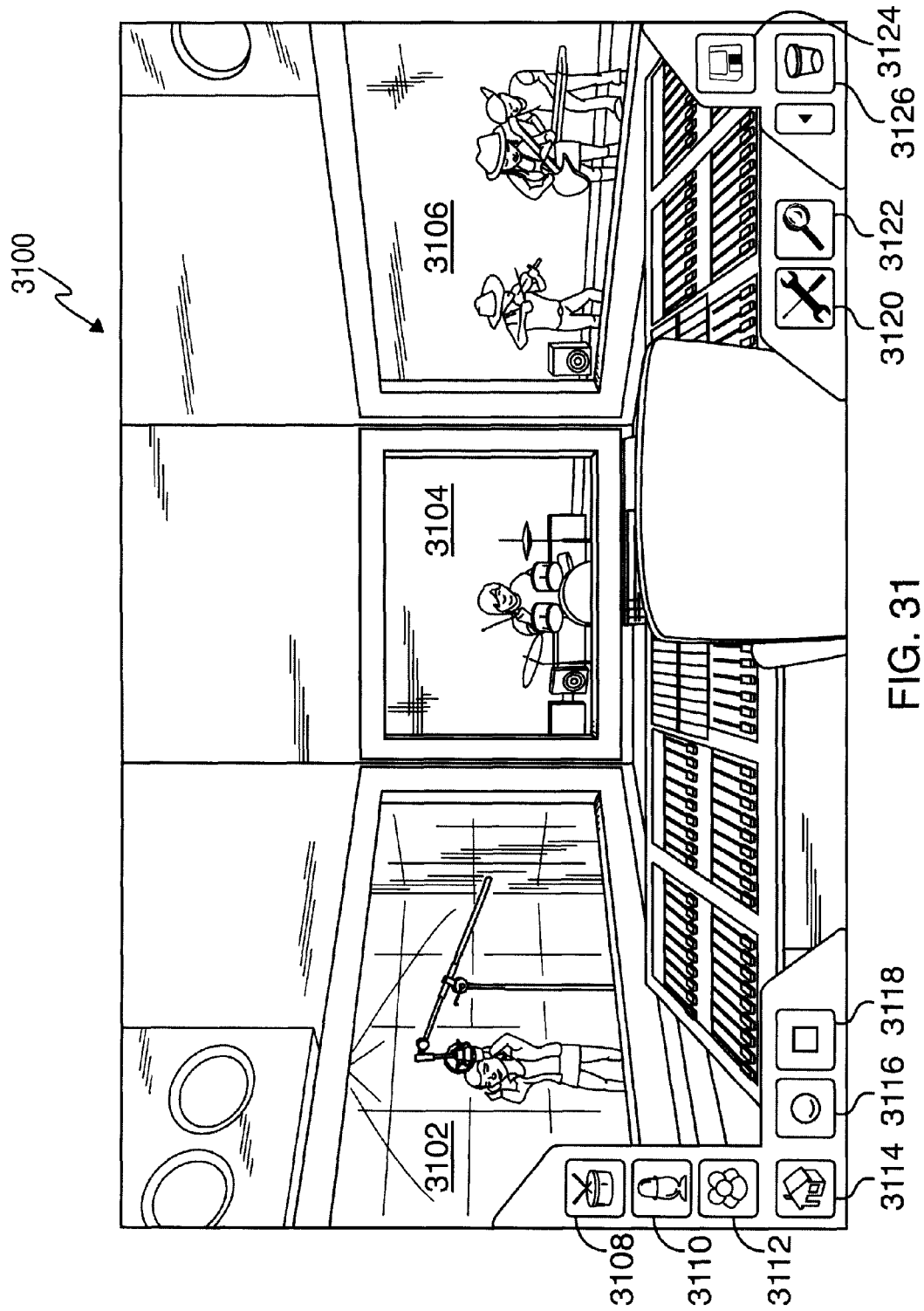
FIG. 31 illustrates one potential embodiment of a first interface in a game environment.

Turning first to FIG. 31, one exemplary embodiment of a first display interface 3100 is provided. In this interface, the player may be provided a studio view from the perspective of a music producer sitting behind a mixing board. In the embodiment of FIG. 31, three different studio rooms are then visualized in the background: a lead vocal/instrument room 3102, a percussion room 3104, and an accompaniment room 3106. As would be understood by those of ordinary skill in the art having the present specification, drawings and claims before them, the number of rooms could be greater or fewer, the functionality provided in each room may be sub-divided differently and/or additional options may be provided in the rooms. Each of the three rooms depicted in FIG. 31 may include one or more musician "avatars" that provide visual cues that illustrate the nature and/or purpose of the room, as well as to provide further cues as to the genre, style, and/or nuanced performance of music performed by the "avatars" and the variety of instruments being utilized. For example, in the embodiment illustrated in FIG. 31, the lead vocal/instrument room 3102 includes a female pop singer, the accompaniment room 3104 includes a rock drummer, and the accompaniment room 3106 includes a country violinist, a rock bass player, and a hip-hop electric keyboard player. As will be discussed in more detail below, the selection of musician avatars, in conjunction with other aspects of the gaming environment interface, provides a visual, easy to understand, interface by which various tools described above can be readily implemented by the most novice of end users.

To begin creating music, the player may select one of these rooms. In one embodiment, the user may simply select the room directly using a mouse or other input device. Alternatively, one or more buttons may be provided that correspond to the various studio rooms. For example, in the embodiment illustrated in FIG. 31, selection of a lead room button 3110 will transfer the player to the lead vocal/instrument room 3102, selection of a percussion room button 3108 will transfer the player to the percussion room 3104; and selection of an accompaniment room button 3112 will transfer the player to the accompaniment room 3106.

Other selectable buttons may also be provided, as shown in FIG. 31. For instance, a record button 3116 and a stop button 3118 may be provided to start and stop the recording of any music made by the end user in studio room 3100 via the recording session live looping module 142 (FIG. 1A). A settings button 3120 may be provided to permit the player to alter various settings, such as desired genre, tempo, and rhythm, volume, etc. A search button 3122 may be provided to enable a user to initiate the sound searcher module 150. Buttons for saving (3124) and deleting (3126) the player's musical composition may also be provided.

Figure 32:
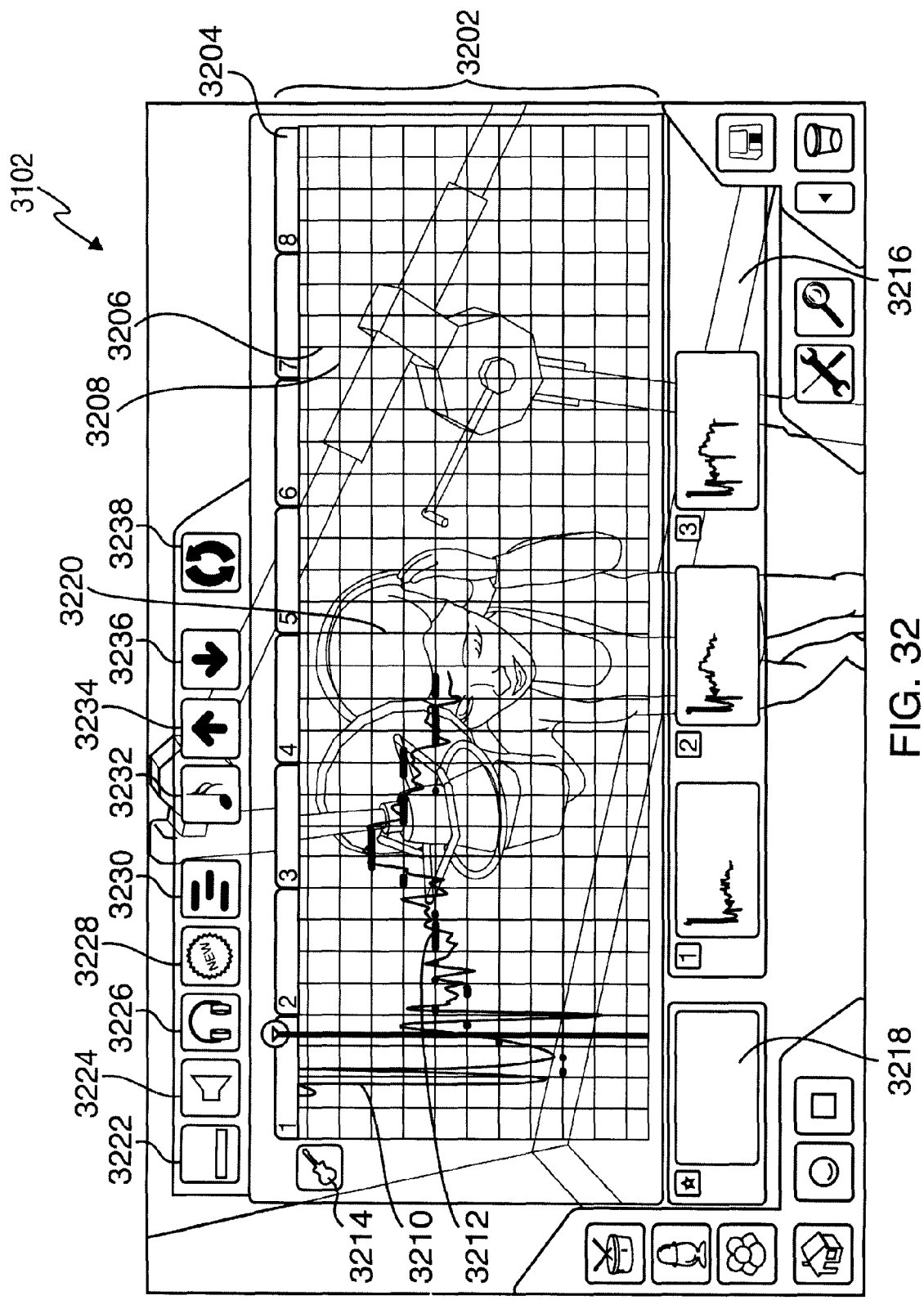
FIG. 32 illustrates one potential embodiment of an interface for creating one or more lead vocal or instrument tracks in the game environment of FIG. 31.

FIG. 32 presents one exemplary embodiment of a lead vocal/instrument room 3102. In this embodiment, the interface for this studio room has been configured to enable an end user to create and record one or more lead vocal and/or instrument tracks for a musical compilation. The lead vocal/instrument room 3102 may include a control space 3202 similar to the one described above in conjunction with FIGS. 12-13. Thus, as described above, the control space 3202 may include a plurality of partition indicators 3204 to identify each of the partitions (e.g. musical measures) in the track; vertical lines 3206 illustrating the beat within each measure, horizontal lines 3208 identifying the various fundamental frequencies associated with a selected instrument (such as a guitar indicated by instrument selector 3214 (shown in FIG. 32), and a playback bar to identify the specific part of the live loop that is currently being played.

In the example illustrated in FIG. 32, the interface illustrates the audio waveform 3210 of one track that has already been recorded, presumably earlier in the session by the player, however, the user may also pull up preexisting audio tracks particularly in conjunction with sound search module 150 (as called by search button 3122 (see FIG. 31). In the example illustrated in FIG. 32, the recorded audio waveform 3210 has also been converted into its morphology of the notes 3212 in correspondence to the fundamental frequencies of a guitar, as indicated by instrument selector 3214. As should be understood, using various instrument selector icons that may be dragged onto control space 3202, the player may be able to select one or more other instruments, which would cause the original audio waveform to be converted to a different morphology of notes corresponding to the fundamental frequencies of the newly or additionally selected instrument(s). The player may also alter the number of measures, or the number of beats per measure, which may also then cause the audio waveform to be quantized (by quantizer 206 (see FIG. 2)) and aligned in time with the newly altered timing. It should also be understood that while the player may choose to convert the audio waveform into a morphology of notes associated with an instrument, the player need not do so, thus enabling one or more original sounds from the audible input to be substantially included in the generated audio track with its original timbre.

As shown in FIG. 32, an avatar of a singer 3220 may also be provided in the background. In one embodiment, this avatar may provide a readily understandable visual indication of a specific genre of music that has been previously defined in genre matcher module 152. For instance, in FIG. 32, the singer is illustrated as a pop singer. In this case, the processing of the recorded track 3210 may be performed by applying one or more traits associated with pop music. In other examples, the singer could be illustrated as a male adult, a young male or female child, a barber-shop quartet, as opera or Broadway diva, a country-western star, a hip-hop musician, a British Invasion rocker, folk singer, etc. with the resulting pitch, rhythms, modes, musical textures, timbres, expressive qualities, harmonies, etc. that people commonly understand to be associated with each type of singer. In one embodiment, to provide additional entertainment value the singer avatar 3220 may be programmed to dance and otherwise act like the avatar is involved in a recording session perhaps even in synchronization with the musical track.

The lead vocal/instrument room interface 3102 may further include a track selector 3216. The track selector 3216 enables a user to record or create multiple lead takes and the select one or more of those takes to be included within the musical compilation. For example, in FIG. 32, three track windows, labeled as "1", "2", and "3" are illustrated, each of which shows a miniature representation of an audio waveform of the corresponding track in order to provide a visual cue as to the audio associated with each track. The track in each track window may represent a separately recorded audio take. However, it should also be understood that copies of an audio track may be created, in which case each track window may represent different instances of a single audio waveform. For instance, track window "1" could represent an unaltered vocal version of the audio waveform, track window "2" could represent the audio waveform as converted into a morphology of notes associated with a guitar, and track window "3" could represent the same audio waveform as converted into a morphology of notes associated with a piano. As would be understood by those of ordinary skill in the art having the present specification, drawings and claims before them, there need be no particular limitation on the number of tracks that may be held on track selector 3216.

A track selection window 3218 is provided to enable the player to select one or more of the tracks to be included in the musical compilation by, for example, selecting and dragging one or more of the three track windows to the selection window 3218. In one embodiment, the selection window 3218 may also be used to engage MTAC module 144 in order to generate a single best take from multiple takes "1" "2" and "3."

The lead vocal/instrument room interface 3102 may also include a plurality of buttons to enable one or more functions associated with the creation of a lead vocal or instrument track. For instance, a minimize button 3222 may be provided to permit a user to minimize grid 3202; sound button 3224 may be provided to enable a user to mute or unmute the sound associated with one or more audio tracks, a solo button 3226 may be provided to mute any accompaniment audio that has been generated by the system 100 based on the audio waveform 3210 or its morphology so as to allow the player to concentrate on issues associated with the lead audio, a new track button 3228 may be provided to enable the user to begin recording a new lead track; morphology button 3230 activates the operations of frequency detector and shifter 208 and 210 on the audio waveform in the control space 3202. A set of buttons may also be provided to enable a user to set a reference tone to aid in providing a vocal track. Thus, toggling tone button 3232 may enable and disable a reference tone, tone up button 3234 may increase the frequency of the reference tone, and tone down button 3236 may decrease the pitch of the reference tone.

Figure 33:
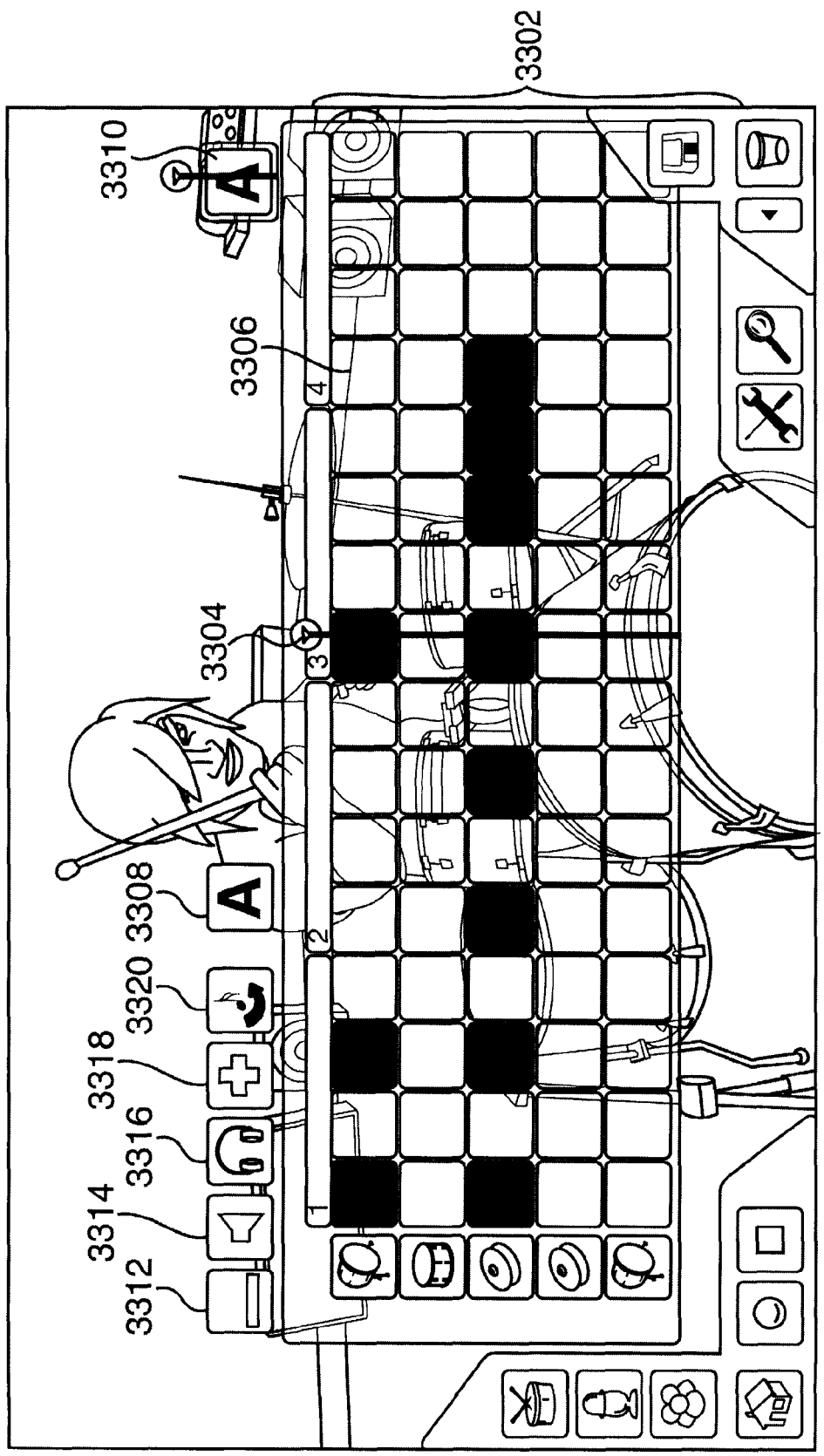
FIG. 33 illustrates one potential embodiment of an interface for creating one or more percussion tracks in the game environment of FIG. 31.

FIG. 33 illustrates one exemplary embodiment of a percussion room 3104. The interface for this room is configured to enable the player to create and record one or more percussion tracks for the musical compilation. The percussion room interface 3104 includes a control space similar to the one described above in conjunction with FIG. 14. Thus, the control space may include a grid 3302 that represents the playback and timing of separate sounds within one or more percussion tracks, a playback bar 3304 to identify the specific part of the live loop that is currently being played, and a plurality of partitions (1-4) divided into multiple beats, with each box 3306 in the grid representing the timing increments for sounds associated with the related percussion instrument (where an unshaded box indicates that no sound is to be played at that time increment, and a shaded box indicates that a sound associated with the timbre of the related percussion instrument is to be played at that time increment).

A percussion segment selector 3308 may also be provided in order to enable a player to create and select multiple percussion segments. In the example illustrated in FIG. 33, only the partitions of a single percussion segment "A" are shown. However, by selecting the percussion segment selector 3308, additional segments may be created and identified as segments "B", "C" and so on. The player may then create different percussion sequences within each partition of each different segment. The created segments may then be arranged in any order to create a more varied percussion track for use in the musical compilation. For example, a player may desire to create different percussion tracks repetitively played in the following order: "A", "A", "B", "C", "B", although any number of segments may be created and any order may be used. To facilitate review and creation of multiple percussion segments, a segment playback indicator 3310 may be provided to visually indicate the percussion segment that is currently being played and/or edited, as well as the portion of the segment that is being played and/or edited.

As further illustrated in FIG. 33, an avatar of a drummer 3320 may also be provided in the background. Similar to the performer avatar described in conjunction with the lead vocal/instrument room 3102, the drummer avatar 3220 may provide a readily understandable visual indication of a specific genre of music and style of playing that corresponds to a genre that has been previously defined in genre matcher module 152. For instance, in FIG. 33, the drummer is illustrated as a rock drummer. In this case, the processing of the created percussion tracks may be performed for each percussion instrument by applying one or more previously defined traits of percussion instruments associated with rock music. In one embodiment, to provide additional entertainment value the drummer avatar 3320 may be programmed to dance and otherwise act like the avatar is involved in a recording session perhaps even in synchronization with the musical track.

The percussion room interface 3104 may also include a plurality of buttons to enable one or more functions associated with the creation of one or more percussion tracks. For instance, minimize button 3312 may be provided to enable a user to minimize grid 3302, a sound button 3314 may be provided to enable a user to mute or unmute the sound associated with one or more audio tracks, solo button 3316 may be provided to enable a user to toggle between mute and unmute to stop playback of the other audio tracks so the player can focus on the percussion track without distraction, additional percussion instrument button 3318 adds an additional sub-track corresponding to a percussion instrument that may be selected by the player, and swing button 3320 permits a user to swing (i.e. syncopate) notes.

Figure 34A:
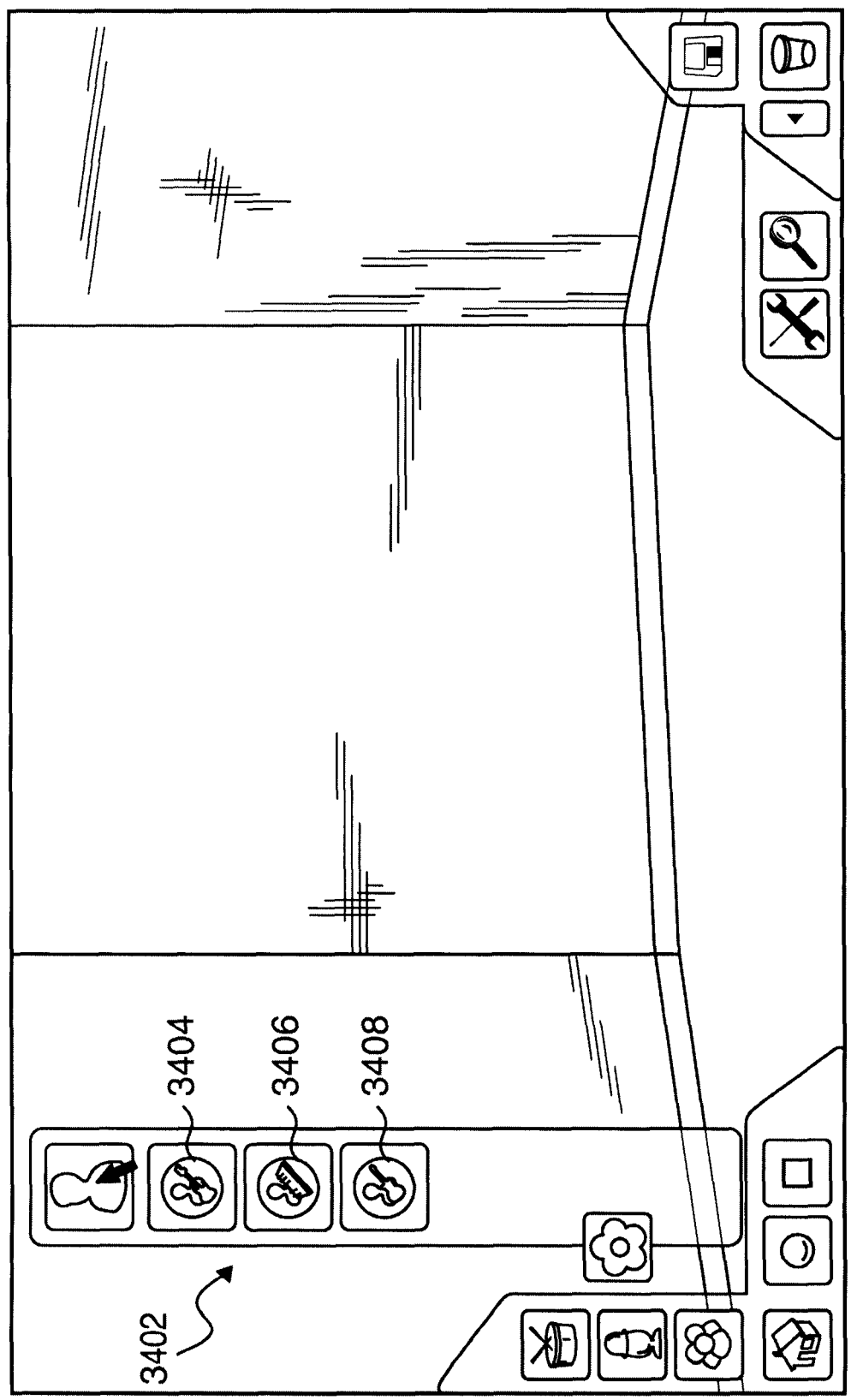
FIGS. 34A-C illustrate potential embodiments of an interface for creating one or more accompaniment tracks in the game environment of FIG. 31.
Figure 34B:
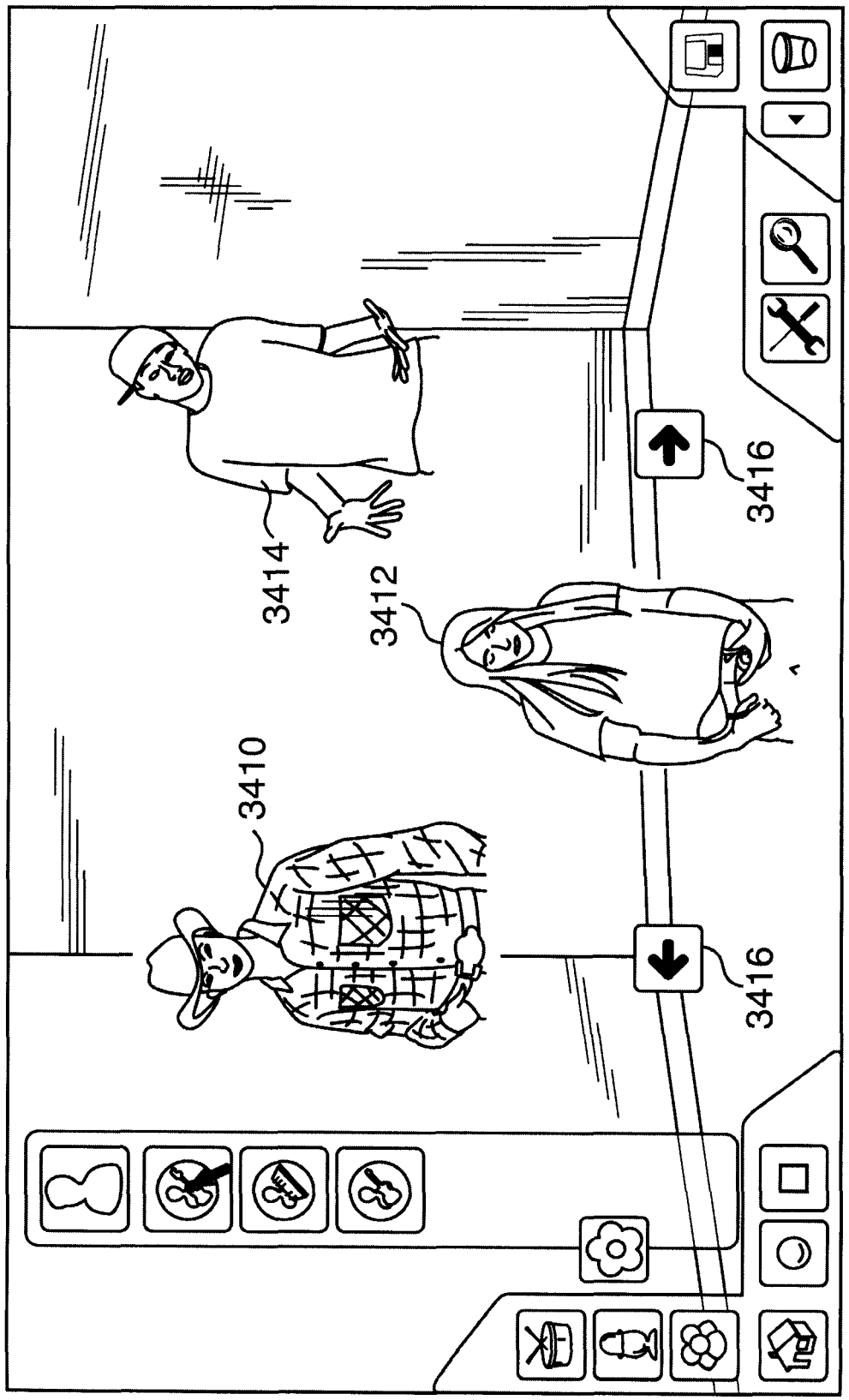
Figure 34C:
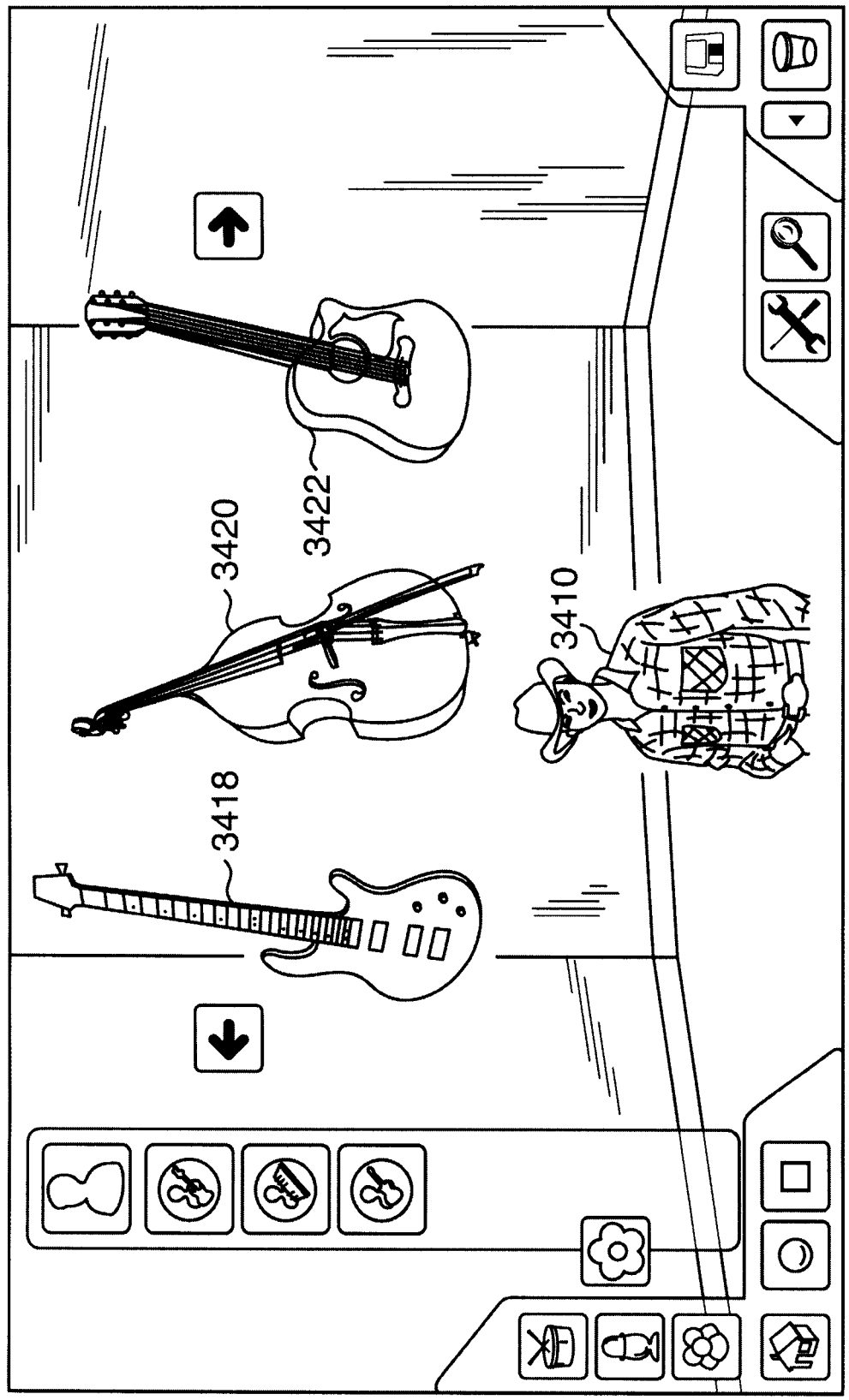

FIGS. 34A-C present one exemplary embodiment of an accompaniment room interface 3106. The interface for this studio room is configured to provide the player with a musical pallet from which the user can select and create one or more accompaniment tracks for a musical compilation. For example, as shown in FIG. 34A, the player may be provided with an instrument class selector bar 3402 to enable the player to select a class of instrument to accompany the lead vocal and/or musical tracks. In the illustrated embodiment, three classes are illustrated for selection—base 3404, keyboard 3406, and guitar 3408. As would be understood by those of ordinary skill in the art having the present specification, drawings and claims before them, any number of instrument classes may be provided including a variety of instruments, including brass, woodwinds, and strings.

For illustration purposes, let us assume that the player has selected the bass class 3404 in FIG. 34A. In that case, the player is then provided with an option to select among one or more musician avatars to play the accompanying instrument. For example, as shown in FIG. 34B, the player may be provided with the option to select between a country musician 3410, a rock musician 3412, and a hip-hop musician 3414, which the player may then select by clicking directly on the desired avatar. Of course, while three avatars are illustrated, the player may be permitted to select between more or less choices. Arrows 3416 may also be provided to enable the player to scroll through the avatar choices, especially where more avatars choices are provided.

After selecting a musician avatar in FIG. 34B, the player may then be provided with an option to select a specific instrument. For example, let us now assume that the player has selected the country musician. As shown in FIG. 34C, the player may then be given the option to select among an electric bass guitar 3418, a standing bass 3420, or an acoustic bass guitar 3422, which the player may then select by clicking directly on the desired instrument. Arrows 3424 may also be provided to enable the player to scroll through the instrument choices, which as would be understood by those of ordinary skill in the art having the present specification, drawings and claims before them, may not be limited to only three types of bass instruments. Of course, while in the above sequence the instrument class is selected prior to selecting a musician avatar, it is contemplated that a player may be provided with the option to select a musician avatar before selecting a class of instrument. Similarly, it is also contemplated that a player may be provided the option to select a specific instrument before selecting a musician avatar.

After the player has selected a musician avatar, and instrument, system 100 creates an appropriate accompaniment track by generating a set of accompaniment notes based on the one or more lead tracks currently being played in the lead vocal/instrument room 3102 (even if the other rooms are muted), converting those notes to the appropriate genre, timbre, and musical style for the selected musician and instrument utilizing genre matcher module 152 and harmonizer module 146 to harmonize the one or more lead tracks. Thus, an accompaniment track for a specific instrument may have different sound, timing, harmony, blue note content, and the like depending on instrument and musician avatar chosen by the player.

The accompaniment room interface 3106 is also configured to enable the player to individually audition each of the multiple musician avatars and/or multiple instruments to aid in the selection of a preferred accompaniment track. As such, once a musical instrument and avatar have been selected by the user and the corresponding accompaniment track has been created as described above, the accompaniment track is automatically played in conjunction with other previously created tracks (lead, percussion, or accompaniment) during a live loop playback so that the player can, in virtually real time, assess whether the new accompaniment track is a good fit. The player may then choose to keep the accompanying track, select a different musician avatar for the same instrument, select a different instrument for the same musician avatar, pick an entirely new avatar and instrument, or delete the accompaniment track altogether. The player may also create multiple accompaniment tracks by repeating the steps described above.

Figure 35:
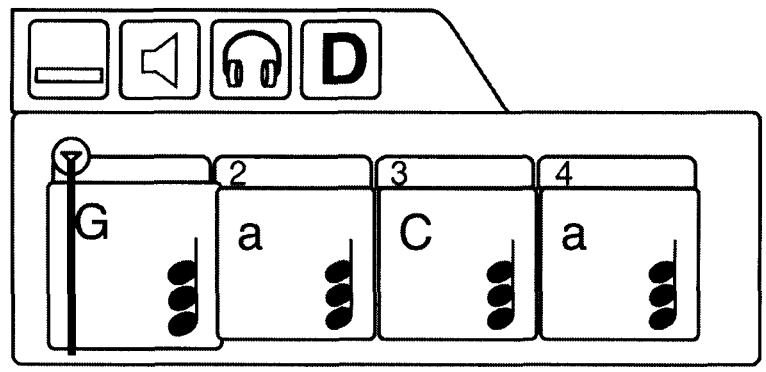
FIG. 35 illustrates one potential embodiment of a graphical interface that depicts the chord progression playing as accompaniment of the lead music.

FIG. 35 illustrates one potential embodiment of a graphical interface that depicts the chord progression playing as accompaniment of the lead music. In one embodiment, this graphical user interface may be launch by pressing the flower button shown in FIGS. 34A, 34B, and 34C. In particular, this interface shows the chord progression that is generally being forced onto the multiple accompanying avatars in accompaniment room 3106 subject to any blue note allowances (due to genre and other issues discussed above in association with FIG. 25) that the avatar may have built into its associated configuration file. Each avatar may also have certain arpeggio techniques (i.e. broken chords played in a sequence) that are associated with the avatar because of the avatar's genre or based on other attributes of the avatar. As depicted in the example of FIG. 35, the chord progression is "G" major, "A" minor, "C" major, "A" minor, with each chord being played for the entirety of a partition in accord with the technique individually associated with each accompanying avatar in accompaniment room 3106. As would be understood by those of ordinary skill in the art having the present specification, drawings and claims before them, the chord progression may change chords multiple times within a single partition or may remain the same chord over a plurality of partitions.

Figure 36:
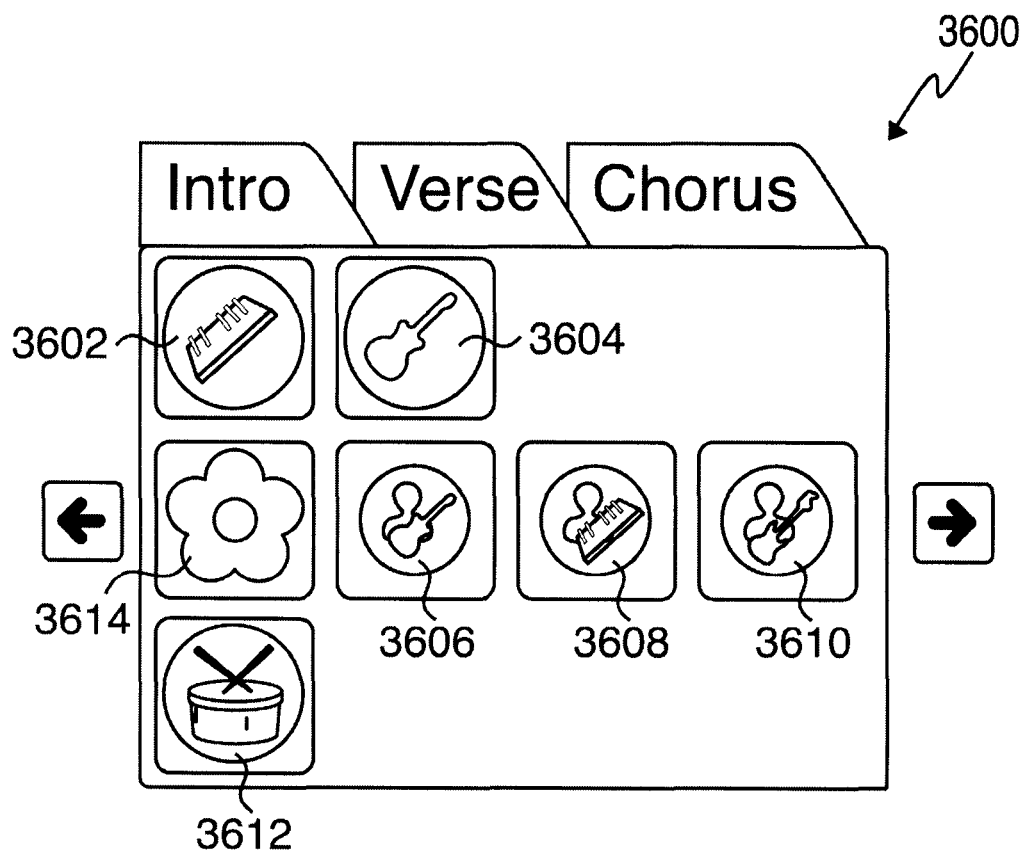
FIG. 36 illustrates one potential embodiment for selecting among different sections of a musical compilation in the game environment of FIG. 31.

FIG. 36 illustrates one exemplary interface by which a player can identify the portion of a musical composition the player desires to create or edit. For instance, in the exemplary interface shown in FIG. 36, a tabbed structure 3600 is provided in which the player can select between an intro section, a verse section, and a chorus section of a musical composition. Of course, it should be understood that other portions of a musical composition may also be available, such as a bridge, an outro, and the like. The portions that are made available for editing in a particular musical composition may be predetermined, manually selected by the player, or automatically set based on a selected genre of music. The order in which the various portions are ultimately arranged to form a musical composition may similarly be predetermined, manually selected by the player, or automatically set based on a selected genre of music. So, for instance, if a novice user choose to create a pop song, tabbed structure 3600 may be pre-populated with the expected elements of a pop composition, which generally include an introduction, one or more versus, a chorus, a bridge and a conclusion. The end user may then be prompted to create music associated with a first aspect of this overall composition. After completing the first aspect of the overall composition, the end user may be directed to create another aspect. Each aspect individually and/or collective may be scored to warn an end user if the key of adjacent elements is different. As would be understood by those of ordinary skill in the art having the present specification, drawings and claims before them, using standard graphical user interface manipulation techniques, portions of the composition may be deleted, moved to other portions of the composition, copied and subsequently modified, and the like.

As shown in FIG. 36, the tab for each portion of a musical compilation may also include selectable icons to enable a player to identify and edit audio tracks associated with that portion, where a first row may illustrate the lead track, the second row may illustrate the accompaniment track, and the third row may illustrate the percussion tracks. In the illustrated example, the intro section is shown as including keyboard and guitar lead tracks (3602 and 3604, respectively); guitar, keyboard, and bass accompaniment tracks (3606, 3608, and 3610, respectively); and a percussion track 3612. A chord selector icon 3614 may also be provided that, when selected, provides the player with an interface (such as in FIG. 27 or FIG. 35) that allows the player to alter the chords associated with the accompaniment tracks.

Figure 37A:
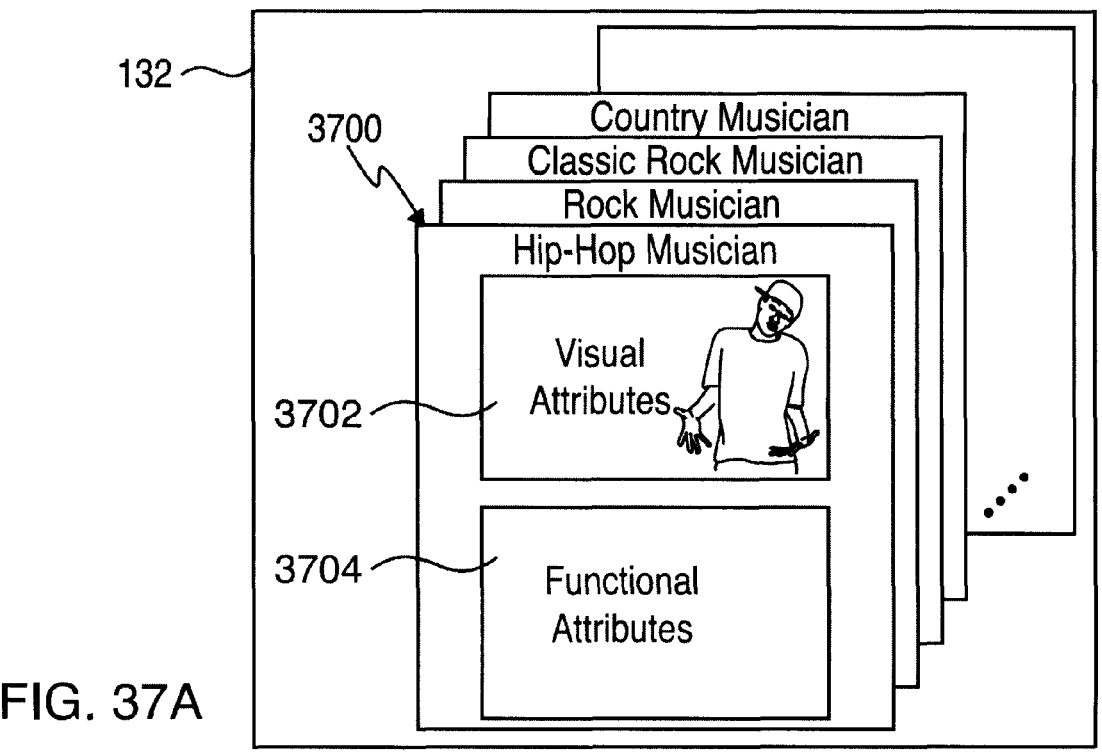
FIGS. 37A and 37B illustrate potential embodiments of a files structure associated with musical assets that may be utilized in conjunction with the game environment of FIGS. 31-36.
Figure 37B:
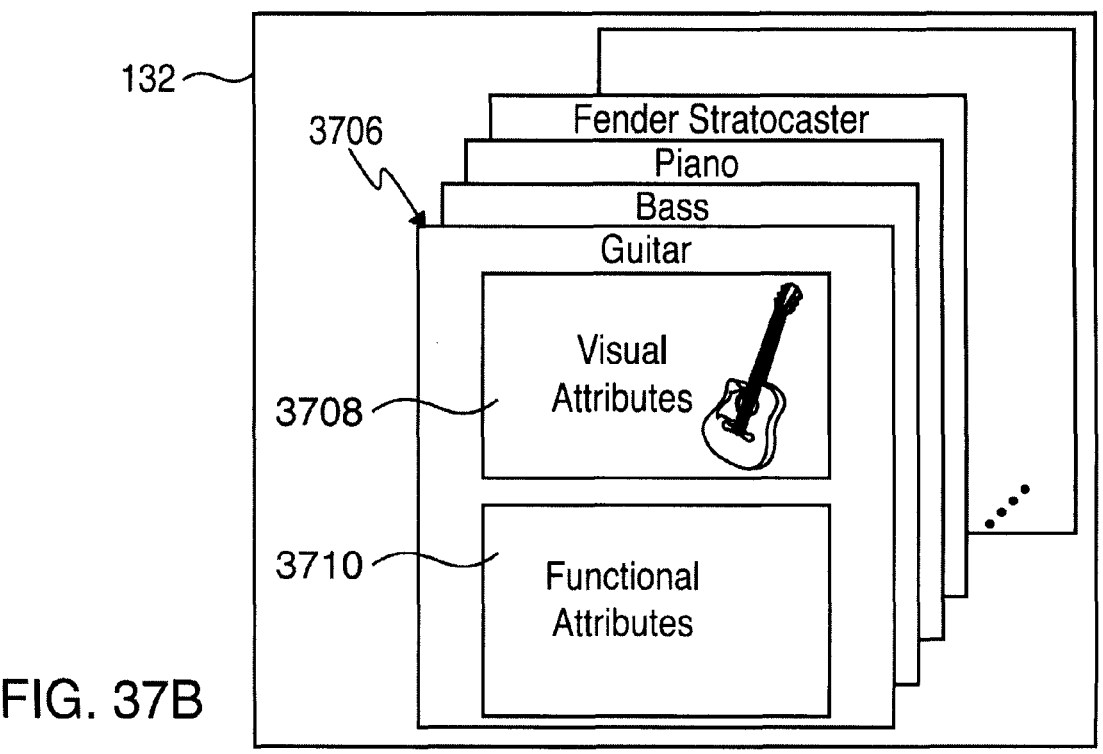

FIGS. 37A and 37B illustrate one embodiment of a file structure that may be provided for certain visual cues utilized in the graphical interface described above and stored in data storage 132. Turning first, to FIG. 37A, a file 3700, also referred to herein as a musical asset, may be provided for each musician avatar that is player selectable within the graphical interface. For example, in FIG. 37A, the top musical asset illustrated is for a hip-hop musician. In this embodiment, the musical asset may include visual attributes 3704 that identify the graphical look of the avatar that is to be associated with the musical asset. The musical asset may also include one or more functional attributes that are associated with the musical asset and which, upon selection of the musical asset by the player, are applied to an audio track or compilation. The functional attributes may be stored within the musical asset and/or provide a pointer or call to another file, object or process, such as genre matcher 152. The functional attributes may be configured to affect any of the various setting or selection described above, including but not limited to the rhythm or tempo of a track, constraints on the chords or keys to be used, constraints on available instruments, the nature of the transitions between notes, the structure or progression of a musical compilation, etc. In one embodiment, these functional assets may be based on the genre of music that would be generally associated with the visual representation of the musician. In instances where the visual attributes provide a representation of a specific musician, the functional attributes may also be based on the musical style of that particular musician.

FIG. 37B illustrates another set of musical assets 3706 that may be associated with each selectable instrument, which may be a generic type of instrument (i.e. a guitar) or a specific brand and/or model of instrument (i.e. Fender Stratocaster, Rhodes Electric Piano, Wurlitzer Organ) Similar to the musical assets 3700 corresponding to musician avatars, each musical asset 3706 for an instrument may include visual attributes 3708 that identify the graphical look of the instrument that is to be associated with the musical asset, and one or more functional attributes 3710 of that instrument. As above, the functional attributes 3710 may be configured to affect any of the various setting or selection described above. For an instrument, these may include the available fundamental frequencies, the nature of the transition between notes, etc.

Using the graphical tools and the game based dynamic illustrated in FIGS. 31-37, novice user will be more readily able to create professional sounding musical compositions that the user will be willing to share with other user for self-enjoyment and even entertainment much the same way the player may listen to commercially produced music. The graphical paradigm provided in the context of a music authoring system in the present specification would work equally well with respect to a variety of creative projects and endeavors that are generally performed by professionals because the level of skill otherwise necessary to produce even a pedestrian product would be too high to accessible to the ordinary person. However, by simplifying the routine tasks, even a novice user can be making professional level projects with intuitive ease.

Render Cache

In one embodiment, the present invention may be implemented in the cloud where, in which the systems and methods described above are utilized within a client-server paradigm. By offloading certain functions onto a server, the processing power required by the client device is decreased. This increases both the number and type of devices on which the present invention can be deployed, this allowing interaction with a mass audience. Of course, the extent to which functions are performed by the server as opposed to the client may vary. For instance, in one embodiment the server may be utilized to store and serve relevant audio samples, while processing is performed in the client device. In an alternate embodiment, the server may both store the relevant audio samples and perform certain processing before serving the audio to the client.

In one embodiment, client-side operations may also be performed via a stand-alone application that operates on the client device and is configured to communicate with the server. Alternatively, the user may be capable of accessing the system and initiating communications with the server via an http browser (such as Internet Explorer, Netscape, Chrome, Firefox, Safari, Opera, etc.). In some instances, this may require a browser plug-in to be installed.

In accordance with the present invention, certain aspects of the systems and methods may be performed and/or enhanced through the use of an audio render cache. More specifically, as will be described in more detail below, the render cache enables improved identification, processing, and retrieval of the audio segments associated with requested or identified notes. As will be understood from the description below, the audio render cache has particular utility when the systems and methods described above are utilized with a client-server paradigm as described above. In particular, in such a paradigm the audio render cache would preferably be stored on the client side to improve latency and reduce server costs, although as described below, the render cache may also be stored remotely.

Figure 38:
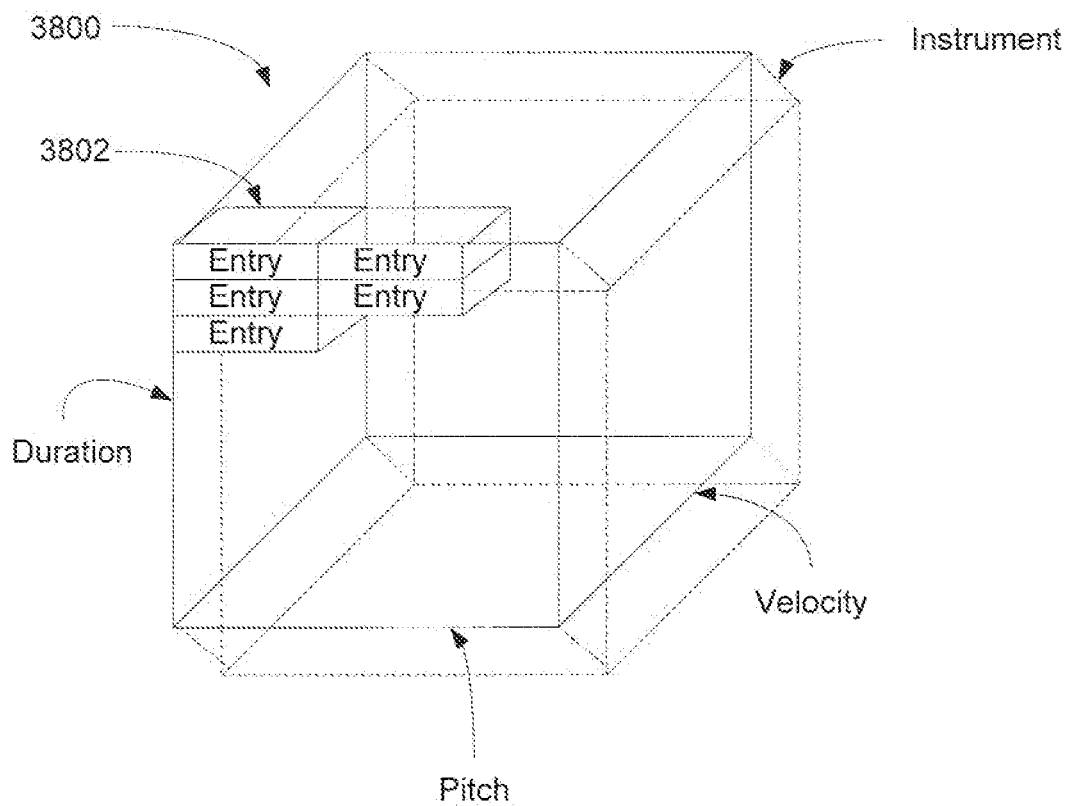
FIG. 38 illustrates one embodiment of a render cache in accordance with the present invention.

Preferably, the render cache is organized as an n-dimensional array, where n represents a number of attributes that are associated with, and used to organize, the audio within the render cache. One exemplary embodiment of a render cache 3800 in accordance with the present invention is illustrated in FIG. 38. In this embodiment, the cache 3800 is organized as a 4-dimensional array, with the 4 axes of the array representing the (1) instrument type associated with a musical note, (2) the duration of the note, (3) the pitch, and (4) the velocity of the note. Of course, other or additional attributes may also be used.

The instrument type may represent the corresponding MIDI channel, the pitch may represent an integer index of the respective semitone, the velocity may represent the strength at which the note is played, and the duration may represent the duration of the note in milliseconds. Entries 3802 in the render cache 3800 may be stored within the array structure based on these four attributes, and may each include a pointer to the allocated memory containing the cached rendered audio samples. Each cache entry may also include an indicator identifying a time associated with the entry, such as the time the entry was first written, the time it was last accessed, and/or a time that the entry expires. This permits entries that are not accessed following the passage of a certain period of time to be removed from the cache. The render cache is also preferably maintained to a finite duration resolution, for example a $16^{th}$ note, and is fixed in size in order to permit rapid indexing.

Of course, other structures may also be used. For example, the render cache may be maintained at a different finite resolution, or may not be fixed in size if rapid indexing is not necessary. Audio may also be identified using more or less than four attributes, thus requiring an array having more or less axes. For instance, rather than a 4-dimensional array, the entries in FIG. 38 may also be organized as multiple 3-dimensionals arrays, with a separate array for each instrument type.

It should also be understood that while an array is described as being the preferred embodiment for the render cache, other memory conventions may also be used. For example, in one embodiment, each audio entry in the render cache may be expressed as a hash value that is generated based on the associated attribute values. One exemplary system that may be employed to facilitate a caching system using this approach is Memcached. By expressing the audio in this way, the number of associated attributes can be increased or decreased without requiring significant changes to the associated code for cache entry look-up and identification.

Figure 39:
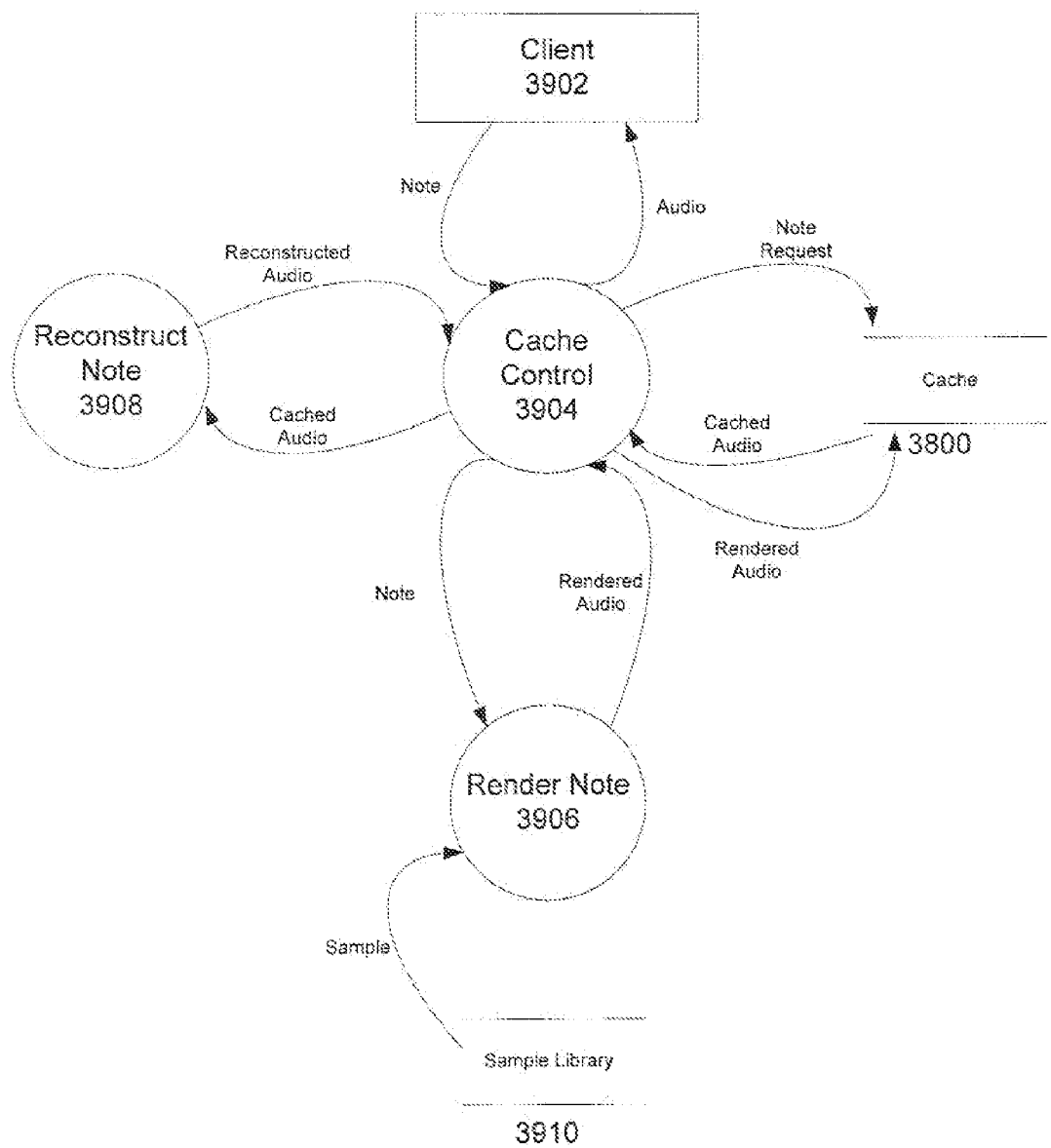
FIG. 39 illustrates one embodiment of a logical flow diagram showing one embodiment for obtaining audio for a requested note in accordance with the present invention.

FIG. 39 illustrates one exemplary data flow utilizing such a cache. As shown in FIG. 39, process 3904 performs cache control. Process 3904 receives requests for a note from a client 3902, and in response retrieves a cached audio segment corresponding with the note. The note request may be any request for a specific note. For instance, the note request may be a note that has been identified by a user through any of the interfaces described above, a note identified by the harmonizer module, or from any other source. Rather than identifying specific note, the note request may also identify a plurality of attributes associated with a desired note. Although generally referred to in the singular, it should be understood that a note request may involve a series or group of notes, which may be stored in a single cache entry.

In one exemplary embodiment, the notes may be specified as a MIDI 'note on' with a given duration, while the audio is returned as a Pulse-code modulated (PCM) encoded audio sample. However, it should be understood that the notes may be expressed using any attribute or attributes, and in any notation, including MIDI, XML, or the like. The retrieved audio sample may also be compressed or uncompressed.

As shown in FIG. 39, process 3904 communicates with process 3906, process 3908 and the render cache 3800. Process 3906 is configured to identify the attributes of the requested note (such as the instrument, note-on, duration, pitch, velocity, etc.) and render the corresponding audio using an available audio sample library 3910. Audio rendered by process 3906 in response to a requested note is passed back to process 3904, which provides the audio to the client 3902, and may also write the rendered audio to the render cache 3800. If a similar note is then later requested, and the audio corresponding to that requested note is already available in the render cache, process 3904 may retrieve the audio from the render cache 3800 without requiring a new audio segment to be rendered. In accordance with the present invention, and as will be described in more detail below, an audio sample may also be retrieved from the render cache that is not an exact match to the requested note. This retrieved audio sample may be provided to process 3908, which reconstructs the note in to one that is substantially similar to the audio sample substantially corresponding to the requested note. As the process of retrieving and reconstructing audio from the cache is generally faster than process 3906 for rendering new audio, this process significantly improves the performance of the system. It should also be understood that each of the elements illustrated in FIG. 39, including processes 3904, 3906 and 3908, the render cache 3800 and the sample library 3910 may be operated on the same device as the client, on a server that is remote from the client, or on any other device; and that various of the elements may be distributed among various devices in a single embodiment.

Figure 40:
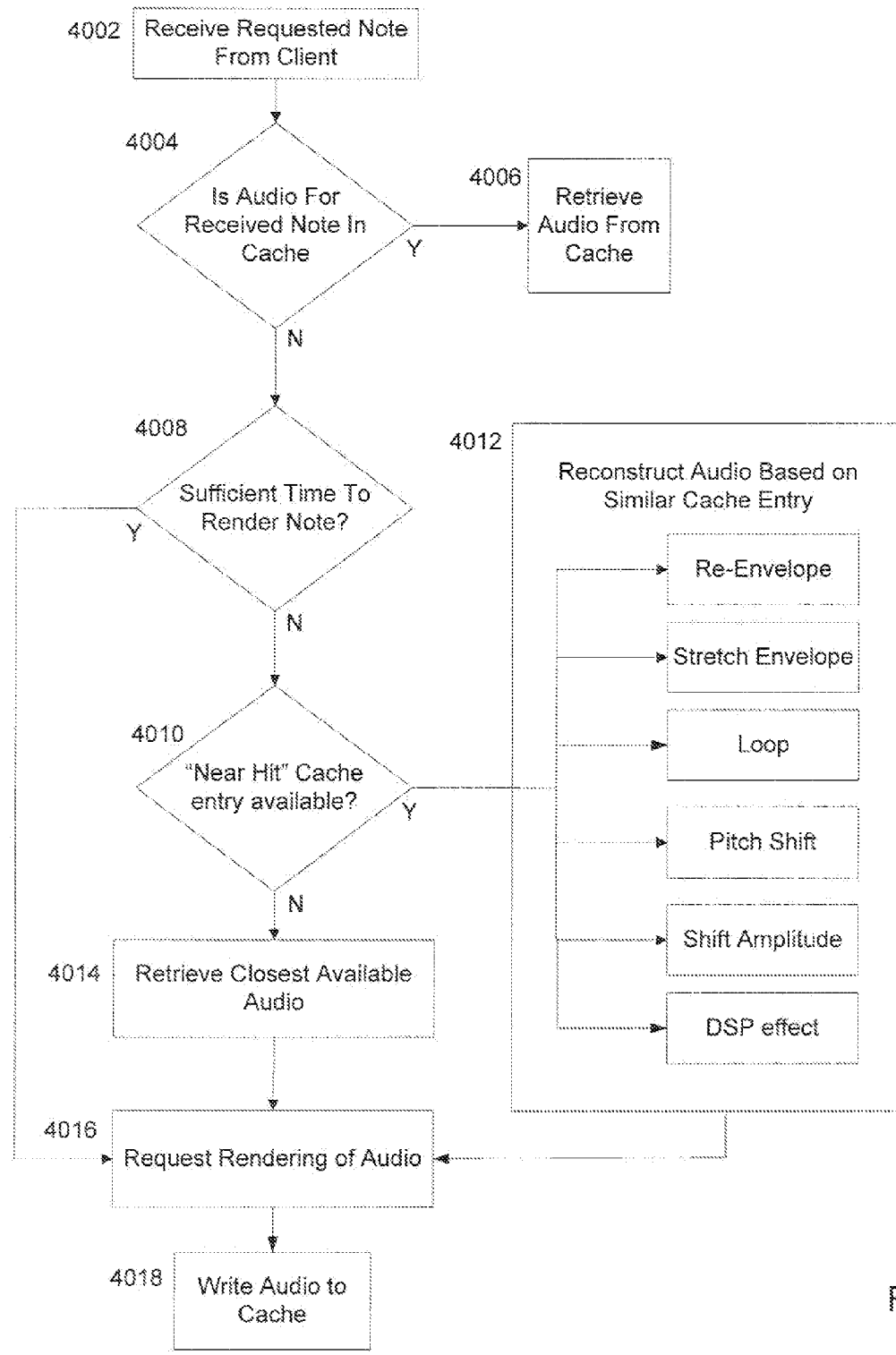
FIG. 40 illustrates one embodiment of a flow chart for implementing the cache control process of FIG. 39 in accordance with the present invention.

FIG. 40 describes one exemplary method that may be utilized for processing requested notes by cache control 3904. This exemplary method is described assuming the use of the 4-dimensional cache as illustrated in FIG. 38. However, one skilled in the art having the present specification in front of them would be able to readily adapt the method for use with different cache structures.

In step 4002, a requested note is received from the client 3902. In step 4004, it is determined whether the render cache 3800 contains an entry corresponding to the specific requested note. This may be accomplished by identifying the instrument that the requested note is to be associated with (i.e. a guitar, piano, saxophone, violin, etc.), as well as the duration, pitch, and velocity of the note, and then determining whether there is a cached entry that precisely matches each of these parameters. If there is, that audio is retrieved from the cache in step 4006 and provided to the client. If there is no exact match, the process proceeds to step 4008.

In step 4008, it is determined whether there is sufficient time to render a new audio sample for the requested note. For example, in one embodiment, the client may be configured to identify a specific time by which the audio for a note is to be provided. The time by which the audio is to be provided may be a preset amount of time after a request was made. In an embodiment in which live looping is employed, as described above, the time by which the audio is to be provided may also be based on the time (or number of bars) until the end of the loop and/or until the note is to be played back during the following loop.

In order to assess whether audio can be provided within the time limit, an estimate of the amount of time to render and send the note is identified and compared to the specific time limit. This estimate may be based on numerous factors, including a predetermined estimate of the processing time required to generate the audio, the length of any backlogs or processing queues present at the time of the request, and/or the bandwidth connection speed between the client device and the device serving the audio. To effectuate this step, it may also be preferable that the system clocks of the client and the device on which the cache control 3904 is operating be synchronized. If it is determined that there is sufficient time to render the note then, in step 4016 the note is sent to Render Note process 3906, where audio for the requested note is rendered. Once rendered, the audio may also be stored in the cache 3800 in step 4018.

However, if it is determined that there is not sufficient time to render the note, then the process proceeds to step 4010. In step 4010, it is determined whether a "near hit" entry is available. For purposes of this description, a "near hit" is any note that is sufficiently similar to the requested note that it can be reconstructed, using one or more processing techniques, into an audio sample that is substantially similar to the audio sample that would be rendered for the requested note. A "near hit" may be determined by comparing the instrument type, pitch, velocity, and/or duration of the requested note to those of already cached notes. Since different instruments behave differently, it should be understood that the range of entries that may be considered a "near hit" will differ for each instrument.

In one preferred embodiment, a first search for a "near hit" entry may look for a near cache entry along the "duration" axis of the render cache, (i.e. an entry with the same instrument type, pitch, and velocity). Even more preferably, the search would be for an entry having a longer duration (within a range determined to be acceptable for the given instrument) than the requested note, as shortening a note often produces a better result than lengthening a note. Alternatively, or if there is no acceptable entry along the duration axis, a second search may look for a near cache entry along the "pitch axis", i.e. an entry within a certain range of semitones.

In yet another alternative, or if there are no acceptable entries on either the duration of pitch axes, a third search may look for a near cache entry within a range along the velocity axis. The acceptable range in differing velocities may, in some cases, depend on the specific software and algorithms used to perform the audio reconstruction. Most audio samplers user several samples mapped to different velocity ranges for one note, since most real instruments have significant timbral differences in the produced sound depending on how strongly the note is place. Thus, preferably a "near hit" along the velocity axis would be an audio sample that differs from the requested note only in amplitude.

In yet another alternative, or if there are no acceptable entries on the duration, pitch, or velocity axes a fourth search may look for a near cache entry within a range along the instrument axis. Of course, it is understood that this strategy may be limited to only certain types of instruments that produce similar sounds to other instruments.

It should also be understood that while it is preferable to identify a "near hit" entry that differs in only a single attribute (in order to limit the amount of processing required to reconstruct the audio sample), a "near hit" entry may also be an entry that differs in two or more of the duration, pitch, velocity, and/or instrument attributes. Additionally, if multiple "near hit" entries are available, the audio sample to be used may be selected based on any one or more of a number of factors including for example, the distance from the desired note in the array (for instance, by determining the shortest Euclidian distance in the 'n' dimensional space), the closest attribute-based hash value, a weighting of the priority of each axis in the array (e.g., audio differing in audio is preferred over audio differing in velocity, which is preferred over audio differing in pitch, which is preferred over audio differing in instrument), and/or the speed in processing the audio sample.

In another embodiment, near hits may be identified using a composite index approach. In this embodiment, each dimension in the cache is folded. In one approach, this may be accomplished by folding a certain number of bits of each dimension. For example, if the lowest two bits of the pitch dimension are folded, all of the pitches can be mapped to one of 32 values. Similarly, the bottom 3 bits of the duration dimension can be folded. As a result, all duration can be mapped onto one of 16 values. Other dimensions can be similarly processed. In another approach, a non-linear folding method can be utilized where the instrument dimension is assigned a similar sounding instrument with the same folded dimension value. The folded dimension values may then be concatenated into a composite index, and the cached entries may be stored in a table that is sorted by the composite index. When a note is requested, relevant cached entries may be identified through a look-up based on the composite index. In this case, all results matching the composite index may be identified as 'near hit' entries.

If, in step 4010, a "near hit" entry is determined to be available, the process proceeds to step 4012 where the "near hit" entry is reconstructed (by Reconstruct Note process 3908) to generate an audio sample that substantially corresponds to the requested note. As shown in FIG. 40, the reconstruction may be performed in several ways. The techniques described below are provided as examples, and it should be understood that other reconstruction techniques may also be used. Furthermore, the techniques described below are generally known in the art for the sampling and manipulation of audio. Accordingly, while the use of the techniques in conjunction with the present invention is described, the specific algorithms and functions for implementing the techniques are not described in detail.

The reconstruction techniques described below may also be performed at any device in the system. For instance, in one embodiment, the reconstruction techniques may be applied at a cache server or by a remote device coupled to the cache server, where the reconstructed note is then provided to the client device. However, in another embodiment, the cached note itself may be transmitted to client device, and the reconstruction may then be performed at the client. In this case, information identifying the note and/or instructions for performing the reconstruction may also be transmitted to the client along with the cached note.

Turning to the first technique, let us assume for example, that the "near hit" entry differed only in duration with the requested note. If the audio sample for the "near hit" is longer than the one being requested, the audio sample may be reconstructed using a "re-enveloping" technique where a new, shorter, envelope is applied to the audio sample.

If the requested note is longer than the "near hit" entry, the sustain portion of the envelope may be stretched to acquire the desired duration. Since attack and decay are generally considered to be what gives an instrument its sonic character, manipulations of the sustain may stretch the duration without a significant impact on the "color" of the note. This is referred to as "envelope-stretching." Alternatively, a "looping" technique may be applied. In this technique, instead of stretching the sustain portion of an audio sample, a section of the sustain section may be looped in order to lengthen the duration of the note. However, it should be noted that randomly selecting a portion of the sustain section to loop may result in clock and pops in the audio. In one embodiment, this may be overcome by cross fading from one loop-end to the next loop-start. In order to lessen any effects that may result from processing and the addition of various effects, it is also preferred that the cached entry be a raw sample, and that any additional digital signal processing be performed after reconstruction is completed, for instance on the client device.

If the requested note is of a different pitch than the "near hit" entry, the cached audio sample may be pitch shifted to acquire the appropriate pitch. In one embodiment, this may be performed in the frequency domain using FFT. In another embodiment, pitch shifting may be performed in the time domain using auto-correlation. In a scenario where the requested note is an octave higher or lower, the cached note may also be simply stretched or shortened to acquire the appropriate pitch. This concept is similar to playing a tape recorder faster or slower. That is, if the cached entry is shortened to play twice as fast, the pitch of the recorded material becomes twice as high, or an octave above. If the cached entry is stretched to play twice as slow, the pitch of the recorded material is halved, or an octave below. Preferably, this technique is applied to cached entries that are within approximately two semitones of the requested note, since stretching or shortening an audio sample greater than that amount may cause an audio sample to lose is sonic character.

If the requested note is of a different velocity than the "near hit" entry, the cached entry may be shifted in amplitude to match the new velocity. For example, if the requested note is of a greater velocity, the amplitude of the cached entry may be increased by the corresponding difference in velocity. If the requested note is of a lower velocity, the amplitude of the cached entry may be decreased by the corresponding difference in velocity.

The requested note may also be of a different, but similar instrument. For instance, the requested note may be for a specific note played on a heavy metal guitar, while the cache may only include a note for a raw metal guitar. In this case, one or more DSP effects could be applied to the cached note in order to approximate a note from the heavy metal guitar.

After the "near hit entry has been reconstructed using one or more of the techniques described above, it may be sent back to the client. An indication may also be provided to the user to inform the user that a reconstructed note has been provided. For instance, in an interface such as the one shown in FIG. 12a. let us assume that note 1214 has been reconstructed. In order to inform the user that this note has been reconstructed from other audio, the note may be illustrated in a different manner from rendered notes. For example, the reconstructed note may be illustrated in a different color than other notes, as a hollow (as opposed to solid color) note, or any other type of indication. If the audio for the note is then later rendered (as will be discussed below), the visual representation of the note may be changed to indicate that a rendered version of the audio has been received.

If, in step 4010, a "near hit" cache entry was not present, the closest available audio sample (as determined based on the instrument, pitch, duration, and velocity attributes) may be retrieved. In one embodiment, this audio sample may be retrieved from the cache 3800. Alternatively, the client device may also be configured to store in a local memory a series of general notes to be used in circumstances when neither a rendered note nor a reconstructed "near hit" note is available. Additional processing, such as that described above, may also be performed on this audio sample. A user interface on the client may also be configured to provide a visual indication to the user that an audio sample has been provided that is neither rendered audio, nor a reconstructed "near-hit."

In step 4016, a request is made to render note process 3906 to render the audio for the requested note using sample library 3910. Once the note is rendered, the audio is returned to cache control 3904, which provides the rendered audio to the client 3902, and writes the rendered audio to the render cache 3800 in step 4018.

Figure 41:
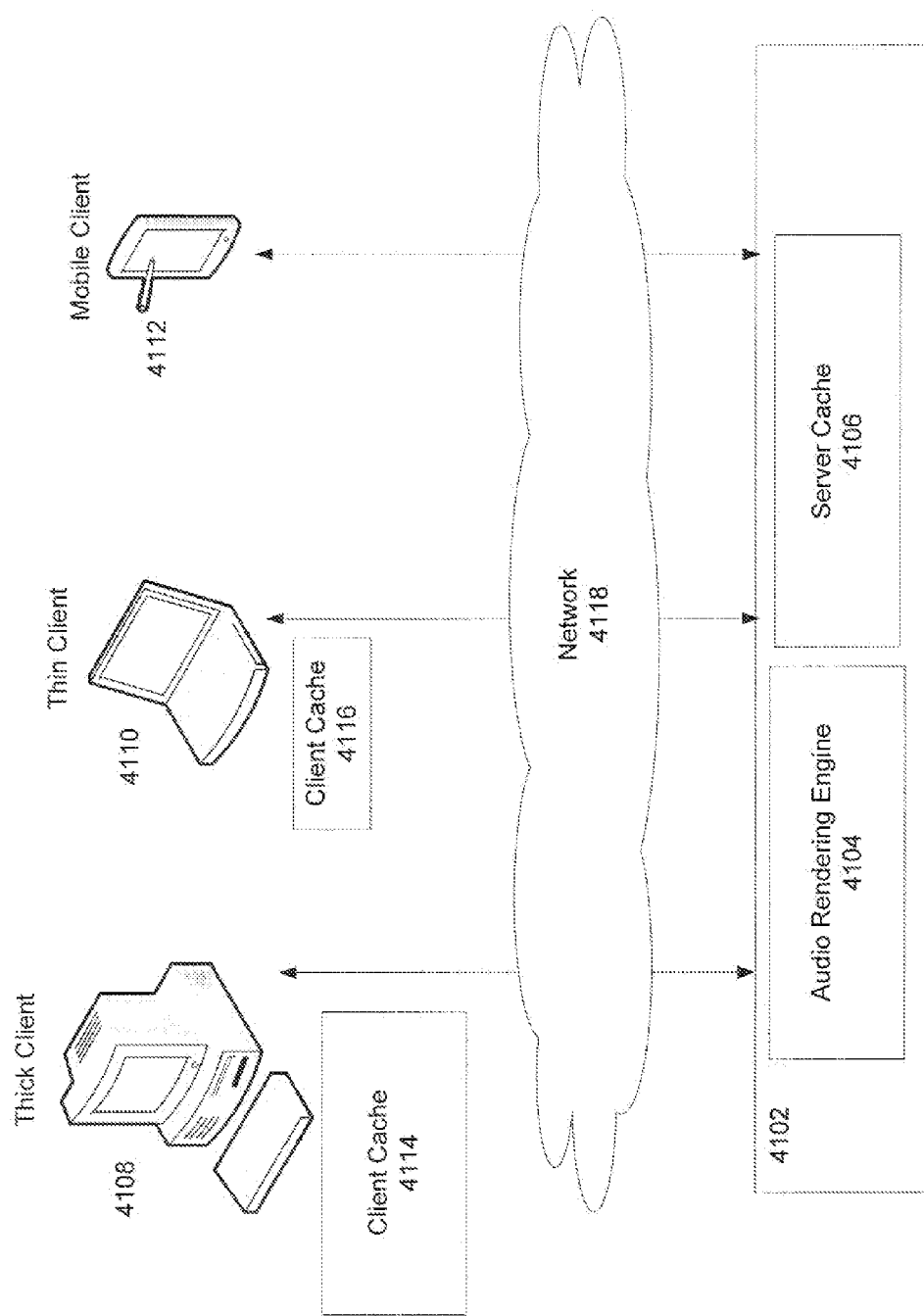
FIG. 41 illustrates one embodiment of an architecture for implementing a render cache in accordance with the present invention.

FIG. 41 shows one embodiment of an architecture for implementing a render cache in accordance with the present invention. As shown, a server 4102 is provided that includes an audio rendering engine 4104 for rendering audio as described above, and a server-cache 4106. The server 4102 may be configured to communicate with a plurality of different client devices 4108, 4110, and 4112 via a communication network 4118. The communication network 4118 may be any network including the internet, a cellular network, wi-fi, etc.

In the example embodiment shown in FIG. 41, device 4108 is a thick client, device 4110 is a thin client and device 4112 is a mobile client. A thick client, such as a fully featured desktop or laptop, typically has a large amount of memory available. As such, in one embodiment, the render cache may be maintained entirely on the internal hard drive of the thick client (illustrated as client cache 4114). A thin client is generally a device with less storage space than a thick client. Accordingly, the render cache for a thin client may be split between the local hard drive (illustrated as client cache 4116) and the server cache 4106). In one embodiment, the most frequently used notes may be cached locally on the hard drive, while less frequently used notes may be cached on the server. A mobile client (such as a cellular phone or a smartphone) generally has less memory than either a thick client or a thin client. Thus, the render cache for a mobile client may be maintained entirely on the server cache 4106. Of course, these are provided as examples and it should be understood that any of the above configurations may be used for any type of client device.

Figure 42:
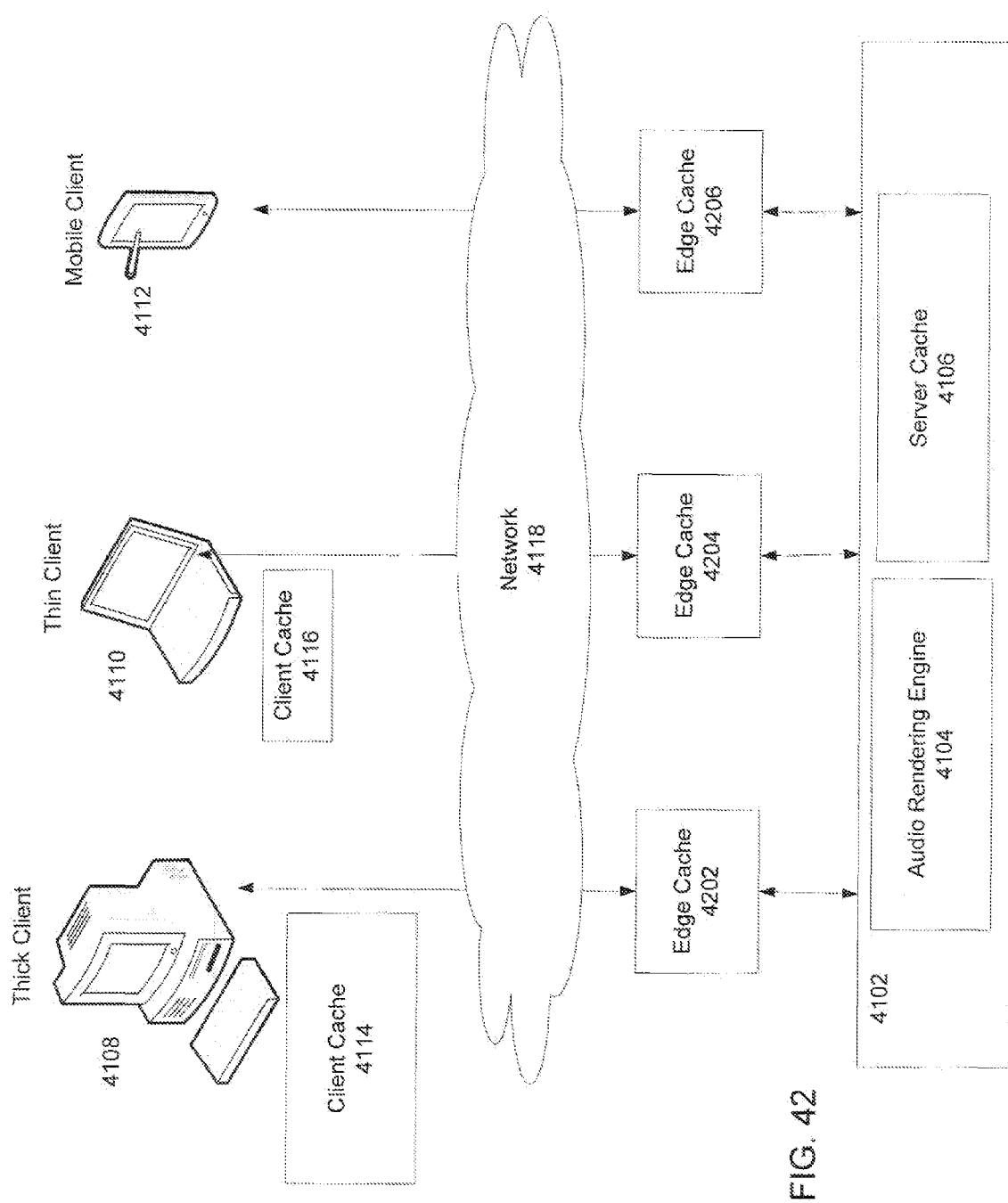
FIG. 42 illustrates a second embodiment of an architecture for implementing a render cache in accordance with the present invention.

FIG. 42 shows another embodiment of an architecture for implementing a render cache in accordance with the present invention. In this example, multiple edge cache servers 4102-4106 may be provided and located to serve various geographical locations. Each client device 4108, 4110, and 4112 may then communicate with the edge cache server 4102, 4104, and 4106 that is closest to its geographic location in order to reduce the transmission time required to obtain a cached audio sample. In this embodiment, if a client device requests audio for a note that is not previously cached on the client device, a determination is made as to whether the respective edge cache server includes either the audio for the requested note, or a "near-hit" for that note. If it does, then the audio sample is obtained and/or reconstructed, respectively, and provided to the client. If such a cached entry is not available, the audio sample may be requested from server 4102 which—in accordance with the process described in association with FIG. 40—can either provide a cached entry (either an exact match or a "near-hit") or render the note.

Figure 43:
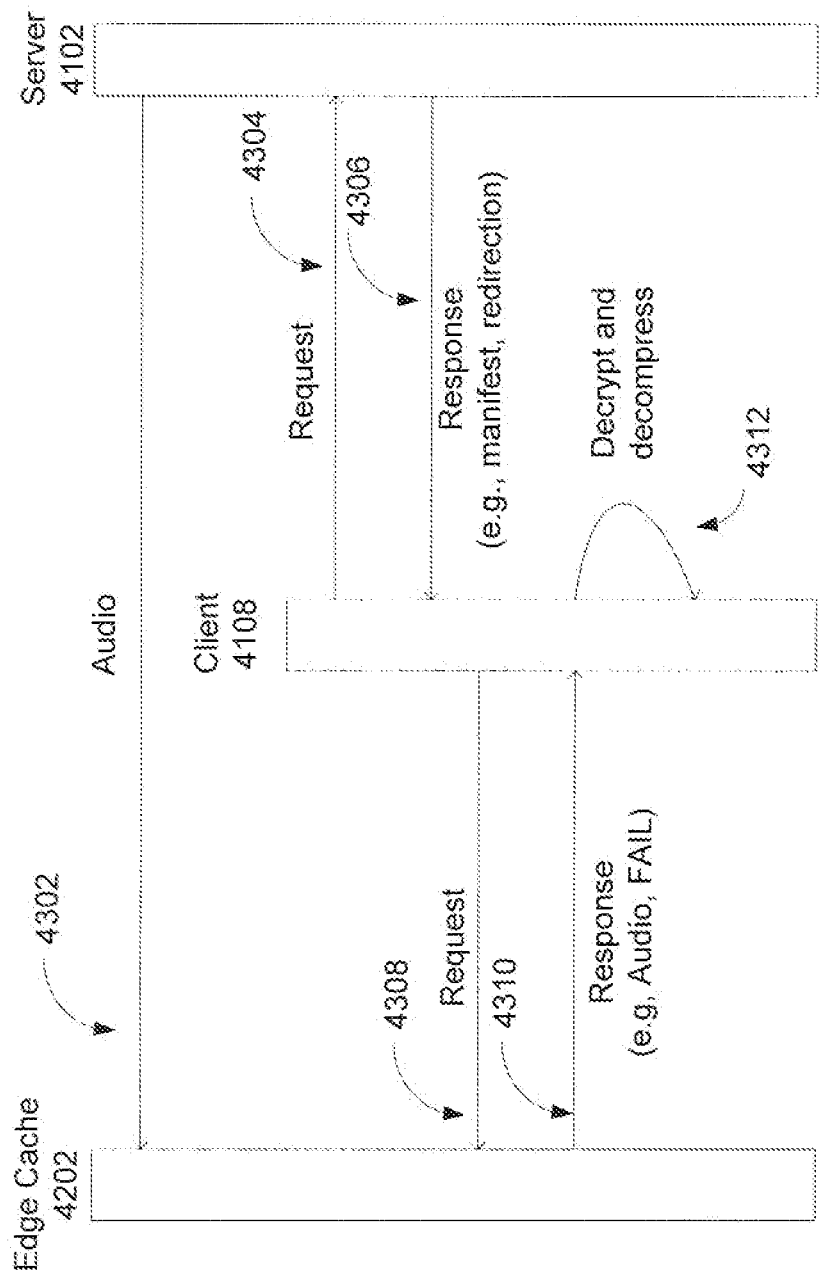
FIG. 43 illustrates one embodiment of a signal diagram illustrating communications between a client, a server, and an edge cache in accordance with the present invention.

FIG. 43 illustrates one embodiment of the signal sequencing between the client, the server, and an edge cache from FIG. 42. Although FIG. 43 refers to client 4108 (i.e. the thick client) and edge cache 4202, it should be understood that this signal sequence may similarly apply to thin client 4110 and 4112, and to edge caches 4204 and 4206 in FIG. 42. In FIG. 43, signal 4302 represents a communication between the server 4102 and the edge cache 4202. In particular, the server 4102 transmits audio data to the edge cache 4202 in order to send and pre-load the edge cache with audio content. This may occur either autonomously or in response to a render request from a client. Signal 4304 represents a request for audio content that is sent from the client 4108 to the server 4102. In one embodiment, this request may be formatted using hyper-text transfer protocol (http), although other languages or formats may also be used. In response to this request, the server 4102 sends a response back to the client, illustrated as signal 4306. The response signal 4306 provides the client 4108 a redirection to the location of the cache (in edge cache 4202, for example). The server 4102 may also provide a manifest which includes a reference to a list of cached content. This list may identify all the cached content, although preferably the list would identify only the cached content that is relevant to the requested audio. For example, if the client 4108 requested audio for a middle-C violin, the server may identify all cached content for violin notes. The manifest may also include any encryption keys required to access the relevant cached content, as well as a time to live (TTL) that may be associated with each cached entry.

After receiving the response from the server 4102, the client 4108 sends a request (illustrated as signal 4310) to the edge cache 4202 to identify the appropriate cache entry (whether for the specific associated audio, a "near hit," etc.) based on the information in the manifest. Again, this request may be formatted using http, although other languages or formats may also be used. In one embodiment, the client 4108 performs the determination of the appropriate cache entry, although the determination may also be performed remotely at the edge cache 4202. Signal 4310 represents the response from the edge cache server to the client 4108 that includes the identified cache entry. However, if the request identified a cache entry that is beyond its TTL, or is otherwise unavailable, the response will include an indication that the request has failed. This may cause the client 4108 to retry its request to the server 4102. If the response 4310 did contain the requested audio entry, it may then be decrypted and/or decompressed, as needed, by the client 4108. If the cached entry was a "near hit," it may also be reconstructed using the processes described above or their equivalents.

Figure 44:
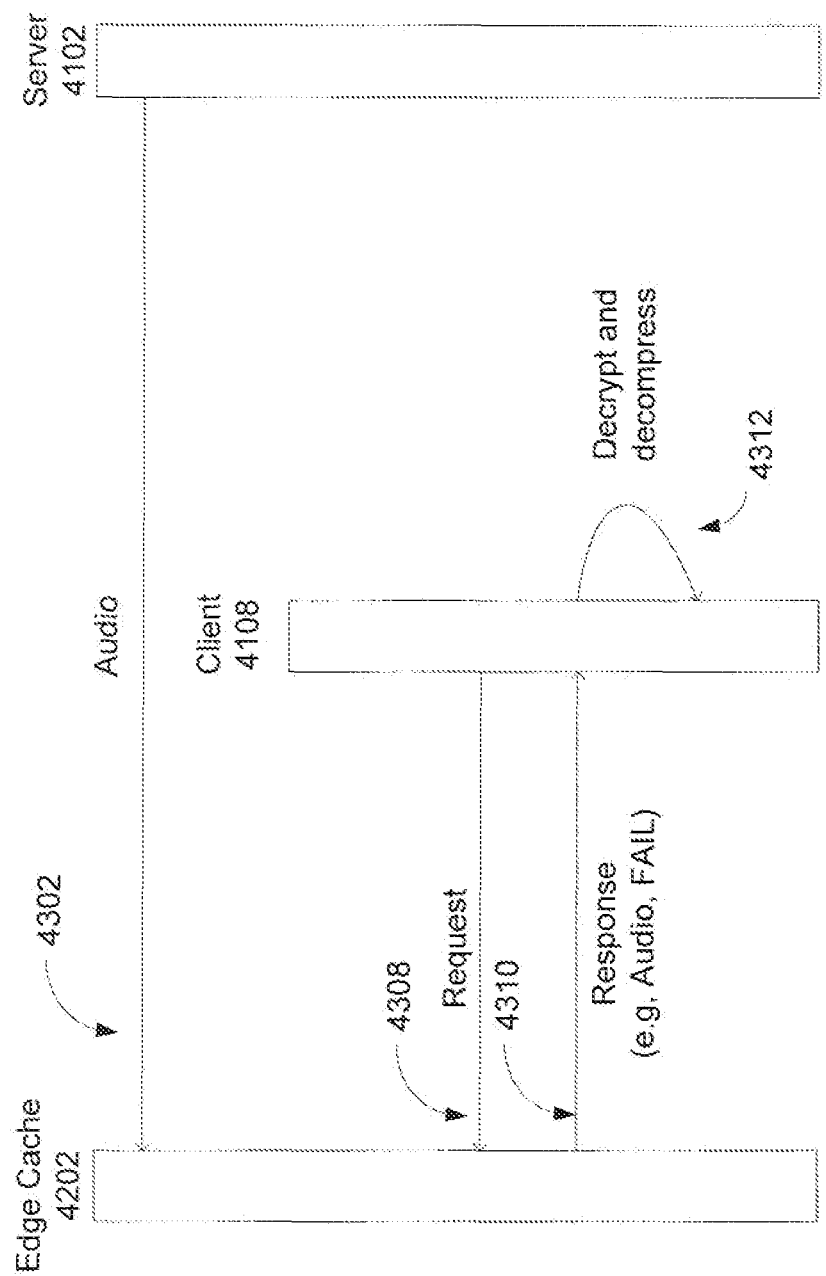
FIG. 44 illustrates a second embodiment of a signal diagram illustrating communications between a client, a server, and an edge cache in accordance with an embodiment of the present invention.

FIG. 44 illustrates an alternative embodiment of the signal sequencing between the client, the server, and an edge cache from the embodiment disclosed in association with FIG. 42. In this embodiment, communications between the client 4108 and 4202 are similar to that described in FIG. 43 with the exception that, instead of the client 4108 contacting the server 4102 to obtain the location of the cache and a manifest of cached content, the client 4108 directly sends the request for audio content 4308 to the edge cache 4202.

Figure 45:
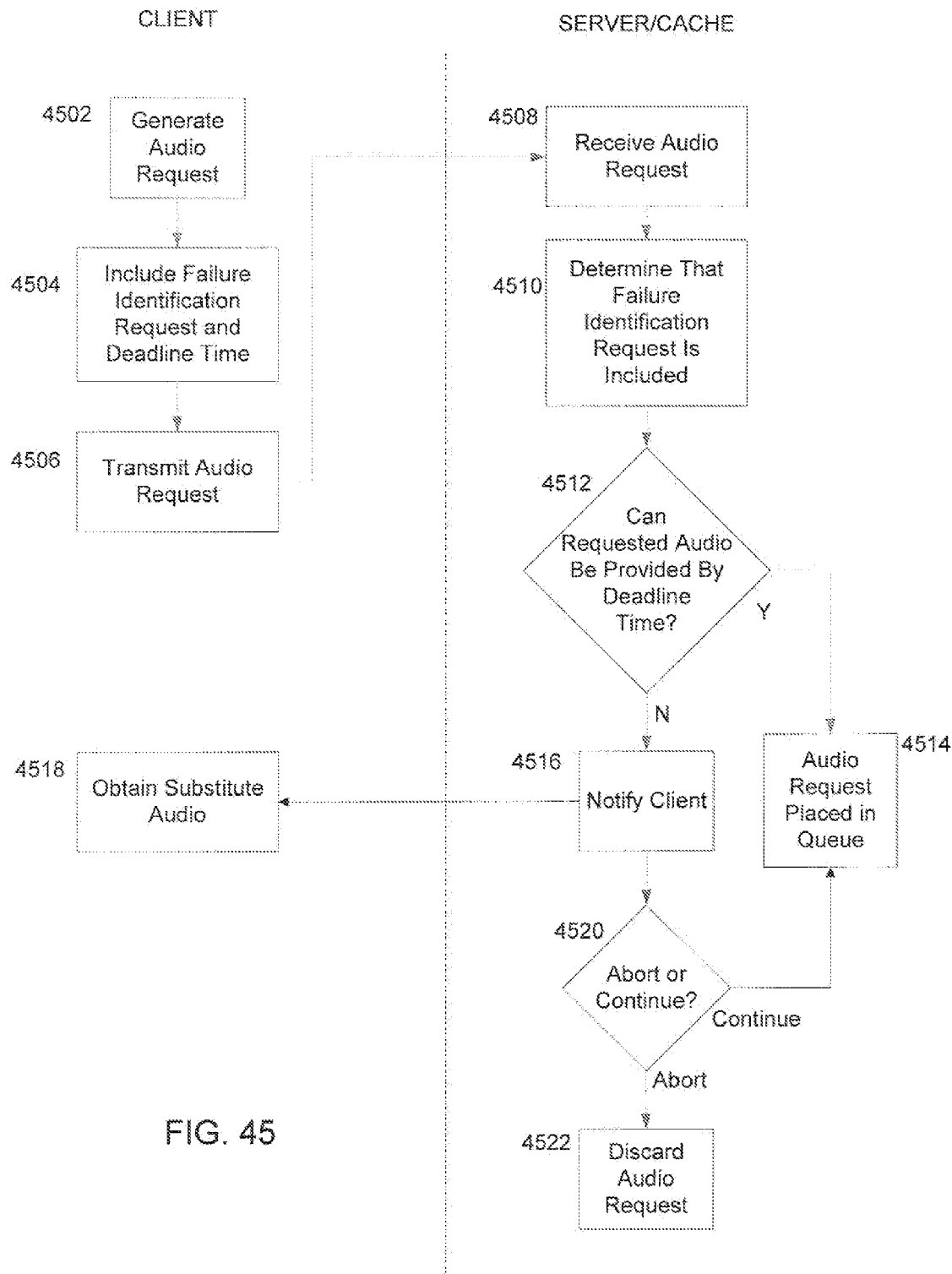
FIG. 45 illustrates an embodiment of a first process for optimizing an audio request processing queue in accordance with the present invention.
Figure 46:
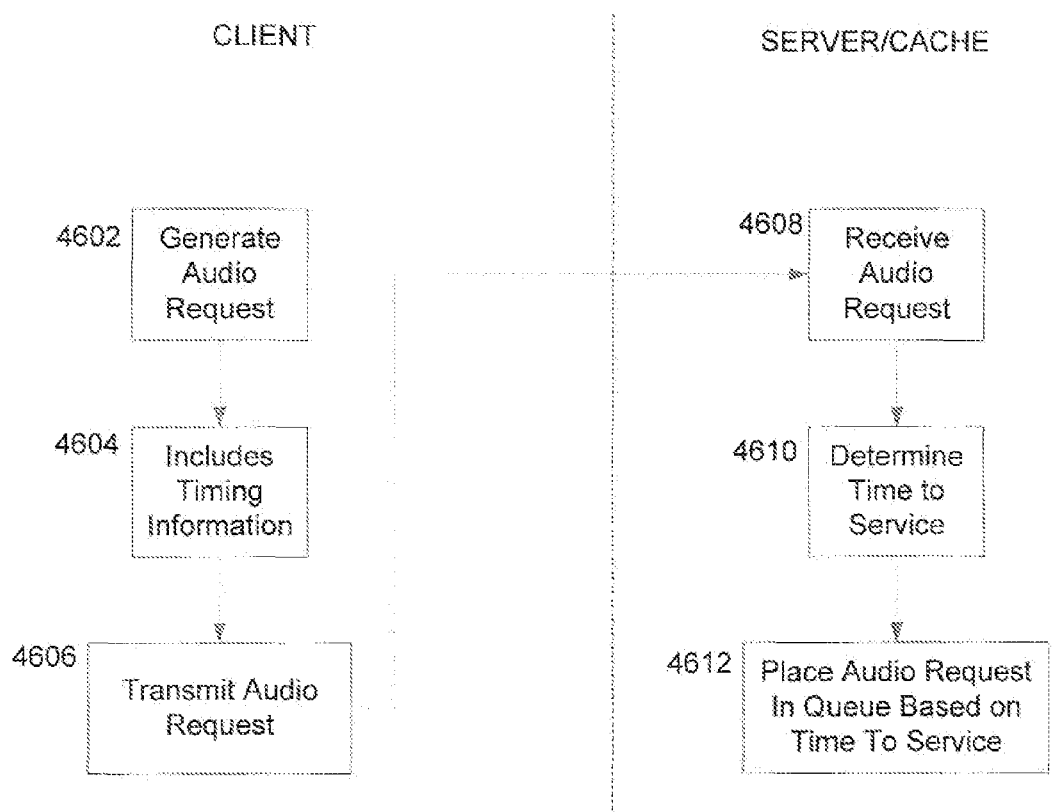
FIG. 46 illustrates an embodiment of a second process for optimizing an audio request processing queue in accordance with the present invention.
Figure 47:
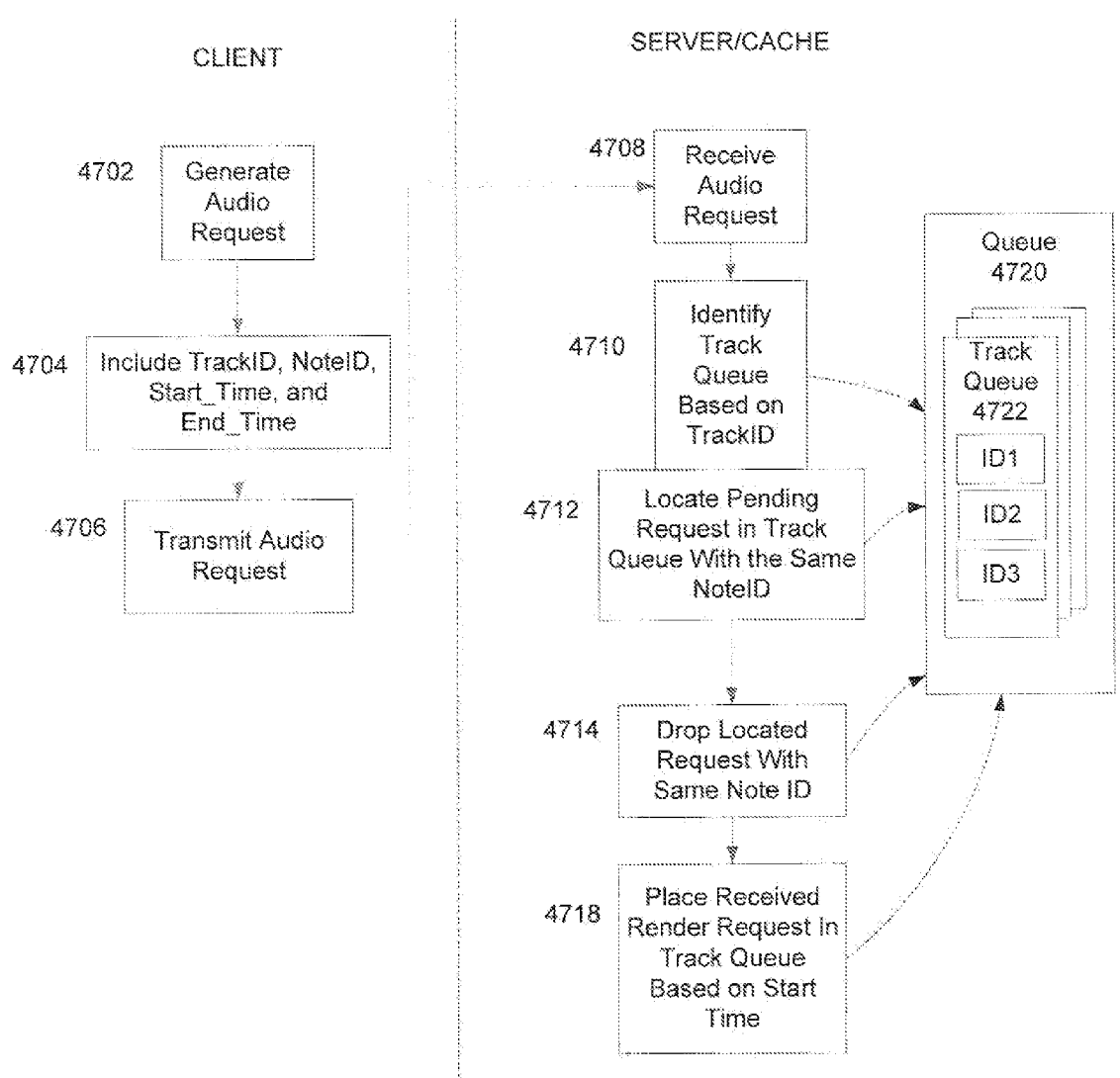
FIG. 47 illustrates one embodiment of a third process for optimizing an audio request processing queue in accordance with the present invention.

FIGS. 45-47 illustrate three techniques that may be used to optimize the processes used for requesting and retrieving audio in response to a request from a client. These techniques may be employed either at a server, an edge cache, or any other device that stores and provides audio content to the client in response to a requested note. These techniques may also each be applied individually, or in conjunction with one another.

Turning first to FIG. 45, one exemplary method is described to enable a client to quickly and efficiently identify when there is insufficient time for audio to be served from a remote server or cache. In block 4502, an audio request is generated at the client. The audio request may be either a request for cached audio or a request for audio to be rendered. A failure identification request, as well as a time by which the audio is required by the client (referred to as a "deadline time"), may also be included with the audio request in block 4504. The failure request may include an argument identifying whether to abort or continue with the audio request if the audio cannot be served to the client by the deadline time. The deadline time provided in the audio request is preferably a real time value. In this case, it is necessary for the client and the server/cache receiving the request to be synchronized in time. As would be understood by those of ordinary skill in the art having the present specification, drawings, and claims before them, other methods for identifying a deadline time may also be used. Preferably, the failure identification request and deadline time are included in the header of the audio request, although they may be transmitted in any other portion of the request, or as separate signals.

In block 4506, the audio request is transmitted from the client to the relevant server or cache. The server or cache receives the audio request in block 4508 and determines that the received audio request includes a failure request in block 4510 is received by the server or cache. In block 4512, the receiving server or cache determines whether the requested audio can be provided to the client by the deadline time. This is preferably determined based on projected or previously determined times for identifying and obtaining cached audio, rendering the note, and/or transmitting the note back to the client. The time required to transmit the note back to the client may also be based on a latency time identified between the transmission time of the audio request and the time it was received.

If it is determined that the audio can be provided before the deadline time, the audio is place in a queue in block 4514, and the method for identifying, locating and/or rendering the audio proceeds as described above. If it is determined that the audio cannot be provided before the deadline time, a message is sent back to the client in block 4516 notifying the client that the audio will not be available by the deadline time. In one embodiment, the notification may be transmitted as an http 412 error message, although any other format can also be used. The client can then take any necessary actions in block 4518 to obtain and provide substitute audio. This may be accomplished by the client identifying an audio that is similar to the one required for the requested note from a local cache, and/or applying processing to previously stored or cached audio to approximate the requested note.

In block 4520, the server/cache checks whether the failure request had identified whether to abort or continue in the event audio could not be provided by the deadline time. If the failure request was set to abort, the audio request is discarded in block 4522 and no further actions are taken. If the failure request was set to continue, the audio request is placed into the queue for processing in block 4514. In this case, the audio can then be provided to the client once completed and used to replace the substitute audio that had been obtained by the client.

Figure 48:
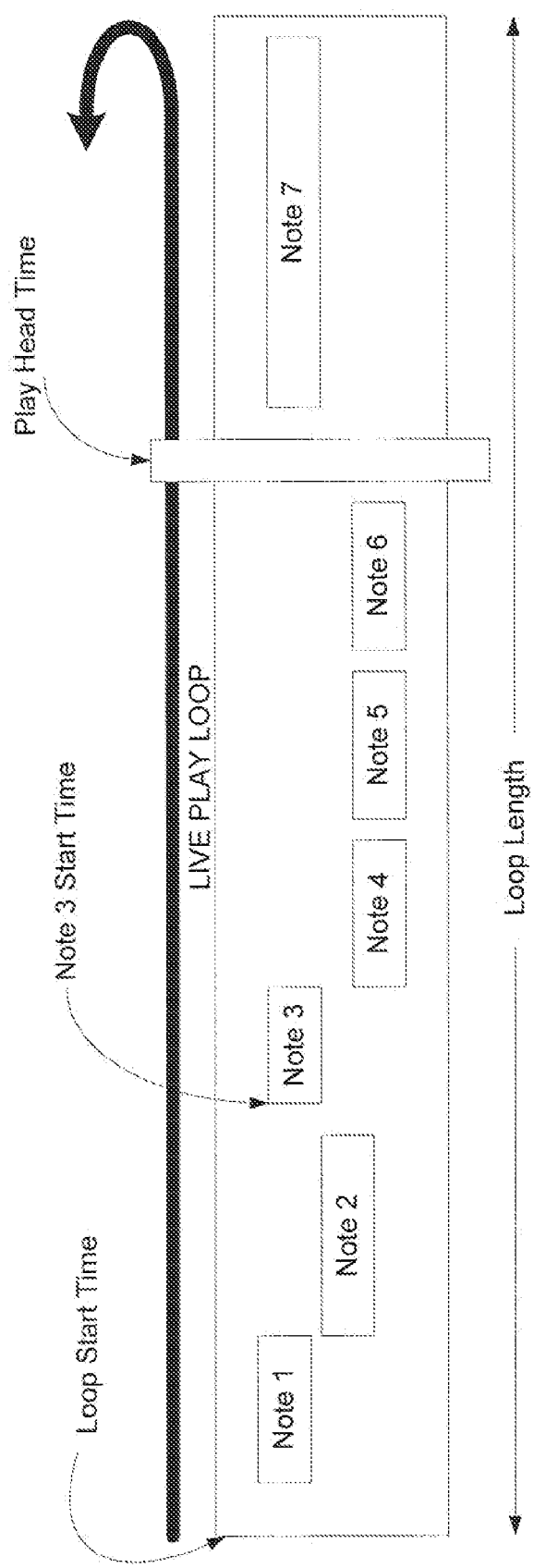
FIG. 48 illustrates one exemplary embodiment of a live play loop in accordance with one embodiment of the present invention.

FIG. 46 illustrates an exemplary processes for prioritizing audio requests in a queue. This process is particularly useful in conjunction with the recording session live looping implementation described above, as it is beneficial for any changes made by a user to a note in a live loop session which is desired to be implemented before that note is played back during the next playback pass of the live loop. In block 4602, an audio request is generated by a client for a note to be used within a current live loop. Timing information relating to the live loop is the included in the audio request in block 4604. In one embodiment, the timing information may identify the duration of the loop (referred to as the loop length). In another embodiment, the timing information may also include information identifying the position of the note within the loop (referred to as the note start time) as well as the current portion of the loop being played back, as may be identified by the position of a playback bar or play head in the interface described above (referred to as the play head time). (An exemplary embodiment of a live loop, and relative timing information described in this paragraph is illustrated in FIG. 48.)

Returning to FIG. 46, the audio request, along with the timing information is sent to the server or cache in block 4606. In one embodiment, a time stamp indicating when the message was sent may also be included with the message.

The audio request is received in block 4608 and a time to service is determined is block 4610. For example in one embodiment, if the audio request only includes information regarding the duration of the loop, the time to service may be "calculated" by merely dividing the loop duration in half. This provides a statistical approximation of the length of time that is likely required before playback of the live loop at the client will reach the location of the note for which the audio requested.

In another embodiment, if the note start time and play head time information is included in the audio request, the time to service can be calculated with more precision. For example, in this case, it may be first determined whether the note start time is greater than the play head time (i.e. the note was at a later position in the loop than the playback bar at the time the audio request was made). If the note start time is greater, the time to service may be calculated as follows: time_to_service=note_start_time−play_head_time. If the play head time is greater than the note start time (i.e. the note was at an earlier position in the loop than the playback bar at the time the audio request was made), the time to service may be calculated as follows: time_to_service=(loop_length−play_head_time)+note_start_time. In another embodiment, the calculation of the time to service may also include the addition of the projected latency time required for transmission of the audio data back to the client. The latency time may be determined by identifying the time stamp of when the audio request was sent, and calculating an elapsed time identified between the time stamp and the time the audio request was received by the server or cache.

After the time to service value is determined, the audio request is placed in a queue based on its time to service. As a result, audio requests with a shorter time to service are processed before those with a longer time to service, thus increasing the likelihood that audio requests will be processed before the next playback of the associated note in the live loop.

FIG. 47 illustrates an exemplary process for aggregating repeated audio requests relating to the same note. In block 4702, an audio request is generated by a client. In block 4704, a track ID, a note ID, a start time and an end time are included with the audio request. The track ID is identifies the music track for which the audio request is being made, and the note ID identifies the note. Preferably, the track ID is a globally unique ID while the noteID is unique for each note within a track. The start time and end time identify the start and end positions of the note relative to the start of the track, respectively. In block 4706, the audio request and associated track ID, note ID, start time, and end time, are transmitted to a server and/or cache.

As shown in FIG. 47, in this embodiment, the server and/or cache has a queue 4720, which includes a plurality of track queues 4722. Each track queue 4722 includes a separate queue for processing the audio requests for an individual track. In block 4708, the server or cache receives the audio request and, in block 4710 identifies a track queue 4722 in the queue 4720 based on the track ID associated with the audio request. In block 4712, the track queue is searched to identify any previously queued audio request having the same note ID. If an audio request with the same ID is located, that request is removed from the track queue 4722 in block 4714.

The new audio request is then positioned into the respective one of the plurality of the track queues 4722. This may be accomplished in one of several ways. Preferably, if an previous audio request with the same note ID had been located and dropped, the new audio request may replace the dropped request in the track queue 4720. Alternatively, in another embodiment, the new audio request may be position in the track queue based on the start time of the audio request. More specifically, notes with an earlier start time are placed earlier in the queue than notes with a later start time.

As a result of the method described in FIG. 47, audio requests that are outdated or superseded are eliminated from the queue, thus conserving processing power. This is particularly useful when one or more users are making numerous and successive changes to the individual notes during a live loop session, as it increases the ability of the system to quickly and efficiently process and provide the most recently requested notes and avoid the processing of notes that are no longer needed or otherwise desired.

Effects Chain Processing

FIGS. 49-52 illustrate processes that may be used to apply a series of multiple effects to one or more music tracks based on the virtual musicians, instruments, and producer selected by a user to be associated with those music tracks, in particular, for the gaming environment described above. As will be understood from the descriptions below, by virtue of these processes, user-created tracks may be processed to better represent or mimic the styles, nuances, and tendencies of the available musicians, instruments, and producers that are represented in the gaming environments. As a result, a single track could have a significantly different sound based on the musicians, instruments, and producers selected to be associated with the track.

Figure 49:
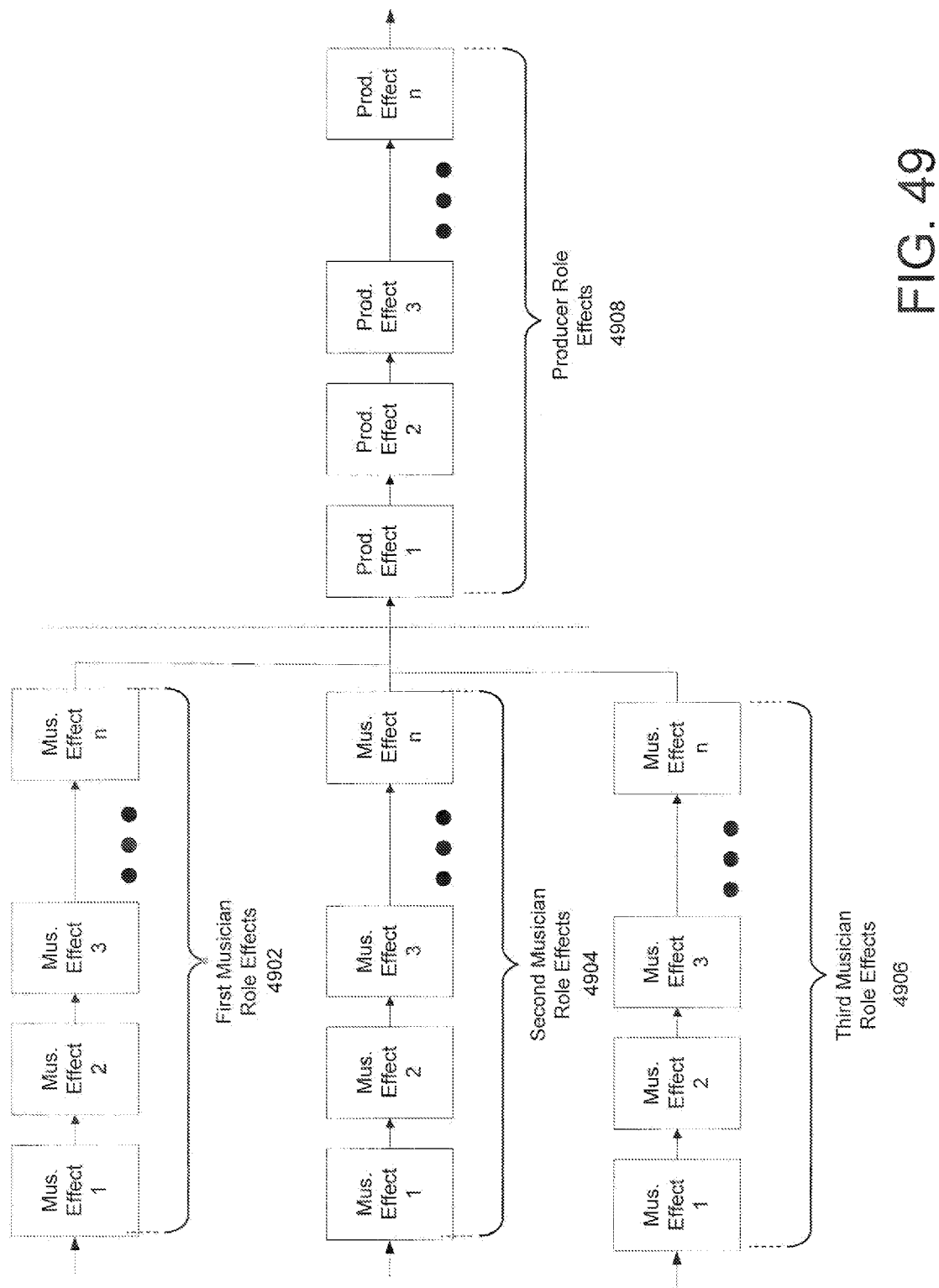
FIG. 49 illustrates one embodiment of a series of effects that may be applied to a music compilation in accordance with the present invention.

Turning first to FIG. 49, an exemplary effects chain is illustrated for applying effects to one or more music tracks for a musical compilation. As shown, for each instrument track, a first series of effects 4902, 4904, and 4906 may be applied based on the selected musician avatar associated with that track. These effects are referred to herein as musician role effects. A second series of effects 4904 may then be applied to each of the instrument tracks based on the selected producer avatar. These are referred to herein as producer role effects. Although specific examples of the applied effects will now be described below, it should be understood that various effects may be used, and the number and order of effects that may be applied for each of the musician and producer roles may be altered.

Figure 50:
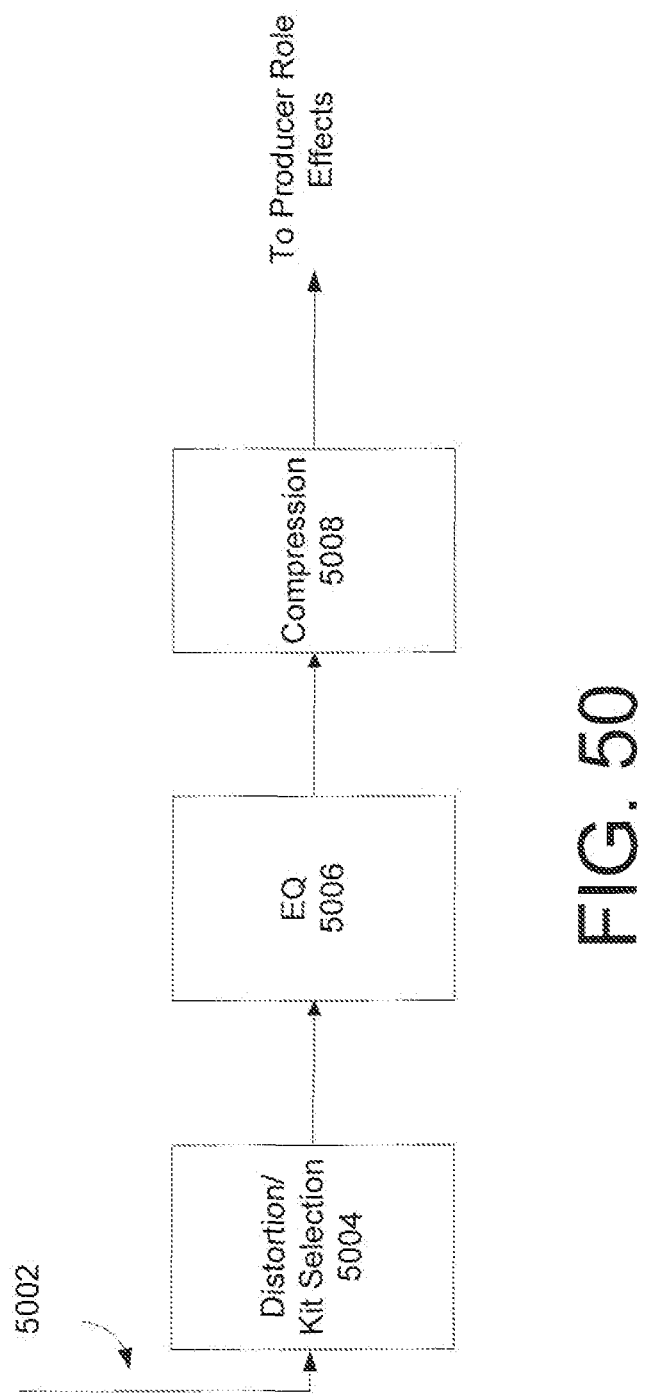
FIG. 50 illustrates one embodiment of a series of musician role effects that may applied to an instrument track in accordance with the present invention.

FIG. 50 shows one exemplary embodiment of the musician role effects that may be applied to a track. In this embodiment, a track 5002 is input to a distortion/kit selection module 5004 which applies the relevant digital signal processing to the musical track in order to substantially recreate the type of sound that may be associated with the real life instrument represented by virtual instrument selected through the gaming interface. For example if the track 5002 is a guitar track, one or more effects can be applied to the basic electronic or acoustic guitar track 5002 in order to mimic and recreate the sound style of a particular guitar including, for example, bypass, chorus, distortion, echo, envelopes, reverb, wah, and even complex combinations of effects resulting in retro, metal, blue, or grunge "feels". In another example, effects may be automatically applied to a basic electric keyboard track 5002 to mimic keyboard types such a Rhodes Piano or Wurlitzer Electric Organ. If the track 5002 is a basic drum track, a preconfigured drum sound kit may be applied via the effects chain based on the selected set of drums. Accordingly, the effects chain 5004 may be controlled by a user desired addition or modification of one or more effects, by the system applying a kit to a basic track, or a combination thereof.

After the distortion effects and/or kit selection is applied, the track is preferably transmitted to equalizer module 5006, which applies a set of equalizer settings to the track. The track is then preferably transmitted to compression module 5008 where a set of compression effects are applied. The equalizer and compression settings to be applied are preferably preconfigured for each musician avatar, although they may also be set or adjusted manually. By applying the above effects, the music track can be processed in order to be representatives of the style, sound, and musical tendencies of the virtual musician and instrument selected by the user.

Figure 51:
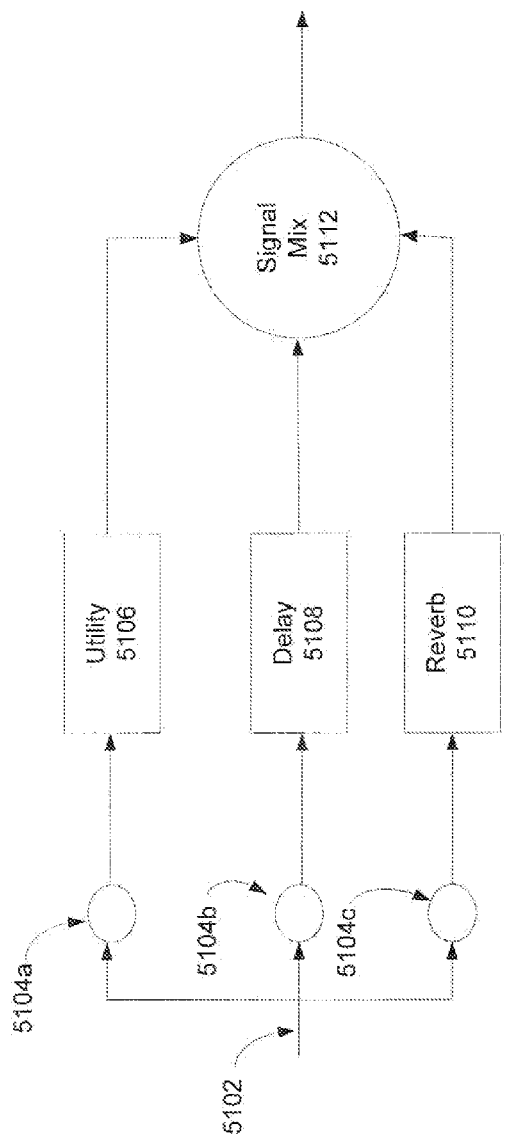
FIG. 51 illustrates one embodiment of a series of producer role effects that may be applied to an instrument track in accordance with the present invention.
Figure 52:
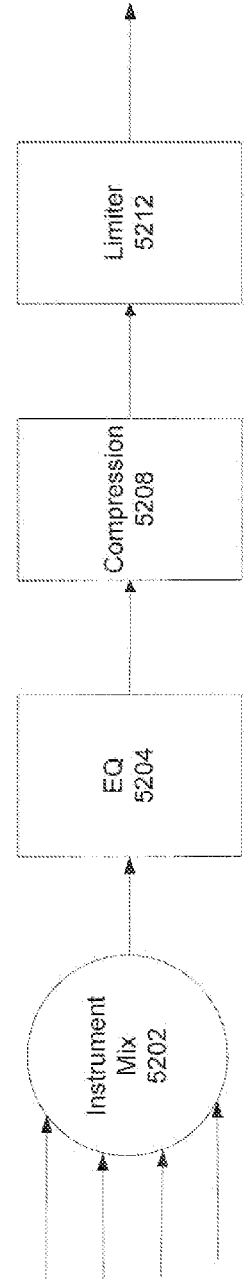
FIG. 52 illustrates one embodiment of a series of producer role effects that may be applied to a compilation track in accordance with the present invention.

Once the musician role effects have been applied, a series of producer role effects are applied, as illustrated in FIGS. 51 and 52. Turning first to FIG. 51, a track 5102 is split among three parallel signal paths, with a separate level control 5104a-c being applied to each path. Isolated level controls for each path is desirable because each path may have different dynamics. Applying the effects in parallel minimizes compounding and unwanted or inappropriate effects in the chain. For instruments such as drums, which may include a kick drum, a snare drum, hats, cymbal, etc., the audio associated with each drum, hat, cymbal, etc. be considered a separate track, where each of those tracks is split into three signal paths for processing.

As shown in FIG. 51, a separate effect is then applied to each of the three signal paths. The first path is provided to utility effect module 5106, which applies one or more utility settings to the track. Examples of utility settings include but are not limited to effects such as equalizer settings and compression settings. The second path is sent to a delay effects module 5108 which applies one or more delay settings to the track in order to shift the timing of various notes. The third path is sent to a reverb effects module 5110 which applies a set of reverb settings to the track. Although not illustrated, multiple reverb or delay settings may also be applied. The settings for each of the utility, delay, and reverb effects are preferably preconfigured for each virtual producer selectable via the gaming interface, although they may also be manually adjustable. Once the utility, delay, and reverb effects are applied, the three signal paths are mixed back together into a single path by mixer 5112.

As shown in FIG. 52, the tracks corresponding to each instrument in a single musical composition are fed to mixer 5202 where they are mixed into a single compilation track. In this way the user can configure the relative volume of the various components (i.e. instruments) can be adjusted to one another to highlight one instrument over another. Each producer may also be associated with and unique mix settings. For example, a hip hop style producer may be associated with mix settings that result in a louder bass while a rock producer may be associated with mix settings that result louder guitars. Once mixed, the compilation track is sent to equalizer module 5204, compression module 5206, and limiter module 4708 where equalizer settings, compression settings, and limiter settings, respectively, are applied to the compilation track. These settings are preferably preconfigured for each virtual producer selectable by a user avatar selectable by a user, although the they may also be set or adjusted manually.

In one embodiment, each virtual musician and producer may also be assigned a "influence" value indicative of their ability to influence a musical composition. These values may then be used to determine the manner in which the above described effects are applied. For instance, the stronger a musician's or producer's "influence" value, the greater the impact their settings can have on the music. A similar scenario may then also be applied for the producer role effects." For effects that are applied both in the musician and producer roles, such as equalizer and compression settings, the "influence" value may also be used to determine how to reconcile differences between the effects settings. For example, in one embodiment a weighted average of the effect settings may be applied based on differences in the "influence" values. As an example, let us assume the "influence" value can be a number from 1 to 10. If a selected musician has an "influence" value of 10 is working with a producer with an "influence" value of 1, all of the effects associated with that selected musician may be applied in their entirety. If the selected musician has an "influence" value of 5 and is working with a producer with an "influence value of 5, the effect of any applied musician settings may be combined with the settings of the producer in a manner that may be random, but would preferably be predetermined. If the selected musician has a "influence" value of 1, only a very minimal effect may be applied. If the selected musician has a "influence" value of 1, only a very minimal effect may be applied. In another embodiment, the effect settings associated may be chosen based solely on which of the virtual musician and producer has a greater "influence" value.

The effects described in FIGS. 49-52 may also be applied on any device in the system. For instance, in a server-client configuration as described, the effect settings may be processed at either the server or the client. In one embodiment, identification of where to process the effects may also be determined dynamically based on the capabilities of the client. For instance, if the client is determined to be a smartphone, the majority of the effects may be preferably processed at the server, whereas if the client is a desktop computer, the majority of effects may be preferably processed at the client.

The foregoing description and drawings merely explain and illustrate the invention and the invention is not limited thereto. While the specification is described in relation to certain implementation or embodiments, many details are set forth for the purpose of illustration. Thus, the foregoing merely illustrates the principles of the invention. For example, the invention may have other specific forms without departing from its spirit or essential characteristic. The described arrangements are illustrative and not restrictive. To those skilled in the art, the invention is susceptible to additional implementations or embodiments and certain of these details described in this application may be varied considerably without departing from the basic principles of the invention. It will thus be appreciated that those skilled in the art will be able to devise various arrangements which, although not explicitly described or shown herein, embody the principles of the invention and, thus, within its scope and spirit.

What is claimed is:

1. A method for providing audio data corresponding to a requested musical note, the method comprising:
   receiving a request including a first note from a client;
   determining, via one or more processors, a first cache entry in a render cache that includes a plurality of entries, the first cache entry corresponding to the first note;
   determining, via the one or more processors, that a first audio segment corresponding to the first cache entry is absent;
   in response to the determination that the first audio segment is absent, determining, via the one or more processors, that a near-hit cache entry is available in the render cache;

in response the determination that the near-hit cache entry is available, retrieving a second audio segment corresponding to the near-hit cache entry in the render cache; and generating a third audio segment from the second audio segment, the third audio segment being substantially similar to the first audio segment.

2. The method of claim 1 further including providing the third audio segment to the client as a response to the request including the first note.

3. The method of claim 1, wherein generating the third audio segment from the second audio segment occurs at the client.

4. The method of claim 1, wherein the first note is identified using one or more attributes selected from the group of instrument, pitch, duration, and velocity.

5. The method of claim 1, wherein the render cache is structured as an n-dimensional array.

6. The method of claim 1, wherein the render cache is structured as a 4 dimensional array, with a first dimension identifying an instrument, a second dimension identifying a duration, a third dimension identifying a pitch, and a fourth dimension identifying a velocity.

7. The method of claim 5, wherein retrieving the second audio segment includes determining that the second audio segment is the shortest distance from the first audio segment within the n-dimensional array.

8. The method of claim 1, wherein retrieving the second audio segment includes determining that the second audio segment includes a hash value that is closest to a hash value of the first audio segment.

9. The method of claim 1 further including generating a hash value based on one or more attributes associated with each of the plurality of render cache entries.

10. The method of claim 1 wherein retrieving the second audio segment includes determining that the second audio segment has a duration that differs from a duration of the first audio segment by less than a predetermined amount.

11. The method of claim 1, wherein retrieving the second audio segment includes determining that the second audio segment has a pitch that differs from a pitch of the first audio segment by less than a predetermined amount.

12. The method of claim 1, wherein retrieving the second audio segment includes determining that the second audio segment is within a predetermined number of semitones from the first audio segment.

13. The method of claim 1, wherein retrieving the second audio segment includes determining that the second audio segment has a velocity that differs from a velocity of the first audio segment by less than a predetermined amount.

14. The method of claim 1, wherein generating the third audio segment from the second audio segment includes applying a shorter envelope to the second audio segment.

15. The method of claim 1, wherein generating the third audio segment from the second audio segment includes stretching a sustain portion of the second audio segment.

16. The method of claim 1, wherein generating the third audio segment from the second audio segment includes looping a sustain portion of the second audio segment.

17. The method of claim 1, wherein generating the third audio segment from the second audio segment includes altering a length of the second audio segment in a time domain.

18. The method of claim 1, wherein generating the third audio segment from the second audio segment includes altering an amplitude of the second audio segment.

19. The method of claim 1 wherein the render cache is located on the same device as the client.

20. The method of claim 1 wherein the render cache is located on a remote server.

21. The method of claim 1 wherein the render cache is located on an edge server that is in a geographical area associated with the client.

22. The method of claim 1 further including causing to display to a user, that a response to the request for the first note includes audio generated from a near-hit cache entry in the render cache.

23. The method of claim 1 further including rendering the first audio segment after the third audio segment has been provided to the client, and providing the first audio segment to the client.

24. The method of claim 1 further including determining that there is insufficient time to render the first audio segment from a sample library, and, based on the determination that there is insufficient time, performing the steps of retrieving the second audio segment corresponding to the near-hit cache entry and generating the third audio segment from the second audio segment.

25. The method of claim 1, wherein the second audio segment is encrypted, and wherein generating the third audio segment from the second audio segment includes decrypting the second audio segment using a key provided to the client from a remote server.

26. The method of claim 1, wherein at least two instances of the second audio segment are included in the render cache, and wherein each of the at least two instances of the second audio segment are encrypted using a different encryption key.

27. A method for providing audio for a requested note, the method comprising:

receiving a first audio request including a first note from a first client, the first audio request including information identifying a unique note ID of the first note, a unique track ID of a track associated with the first note, and a start time of the first note within the track associated with the first note;

determining, via one or more processors, a first track queue based on the unique track ID, the first track queue being one of a plurality of track queues;

determining, via the one or more processors, that the first track queue includes a previously received audio request that includes the unique note ID;

in response to the determination that the first track queue includes the previously received audio request that includes the unique note ID, removing the previously received audio request from the track queue;

based on the start time of the first note, determining, via the one or more processors, a first position of the first audio request within the first track queue with respect to at least one additional previously received audio request; and adding the first audio request to the first track queue for processing at the first position.

28. A process for providing audio for a requested not; the process comprising:

receiving a first audio request from a client, the first audio request including a first note in an audio track; the client being configured to repeatedly play back a live loop that includes at least a portion of the audio track; the first audio request including timing information relating to the live loop;

determining, via one or more processors, a first time to service for the first audio request, the first time to service being indicative of a time until a next instance in which the first note will be played within the live loop;

comparing, via the one or more processors, the first time to service to previous times to service associated with at least one previous audio request;

in response to the comparison between the first time to service and the previous times to service, determining, a first position of the first audio request within a queue; and adding the first audio request to the queue for processing at the first position.

29. The process of claim 28 wherein the timing information includes a duration of the live loop.

30. The process of claim 29 wherein the first time to service is determined based on the duration of the live loop.

31. The process of claim 30 wherein the first time to service is approximately equal to half of the duration of the live loop.

32. The process of claim 28 wherein the timing information includes a first note start time indicative of a start time of the first note relative to a beginning of the live loop; a play head time indicative of a location of a playback bar relative to the beginning of the live loop; and a duration of the live loop.

33. The process of claim 32 wherein the first time to service is determined based on the first note start time, the play head time, and the duration of the live loop.

34. The process of claim 33 wherein the first time to service is determined:

if the first note start time is greater than the play head time; subtracting the play head time from the note start time;

if the play head time is greater than the first note start time; subtracting the play head time from the duration of the live loop to get a first result, and adding the first result to the first note start time.

\* \* \* \* \*